(12) United States Patent
Griffiths

(10) Patent No.: US 9,998,692 B1
(45) Date of Patent: Jun. 12, 2018

(54) MOTION PICTURE HIGH DYNAMIC RANGE IMAGING

(71) Applicant: David J. Griffiths, Charlton, NY (US)

(72) Inventor: David J. Griffiths, Charlton, NY (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days. days.

(21) Appl. No.: 15/192,550

(22) Filed: Jun. 24, 2016

Related U.S. Application Data

(60) Provisional application No. 62/185,531, filed on Jun. 26, 2015.

(51) Int. Cl.
*H04N 5/235* (2006.01)
*H04N 9/07* (2006.01)
(Continued)

(52) U.S. Cl.
CPC ....... *H04N 5/35563* (2013.01); *G02B 27/106* (2013.01); *H04N 5/238* (2013.01);
(Continued)

(58) Field of Classification Search
CPC .. H04N 5/2355; H04N 5/23293; H04N 5/238; H04N 5/247; H04N 5/3572;
(Continued)

(56) References Cited

U.S. PATENT DOCUMENTS

| | | | |
|---|---|---|---|
| 6,278,521 B1 * | 8/2001 | Jablonski | G01J 3/02 356/318 |
| 2005/0275747 A1 * | 12/2005 | Nayar | H04N 5/2351 348/362 |

(Continued)

OTHER PUBLICATIONS

P. O. Debevec et al.: "Recovering High Dynamic Range Maps from Photographs", *ACM Trans. on Graphics*, (1997), 369-378. http://www.pauldebevec.com/Research/HDR/debevec-siggraph97.pdf.
(Continued)

*Primary Examiner* — Lin Ye
*Assistant Examiner* — John H Morehead, III
(74) *Attorney, Agent, or Firm* — Gerhard W. Thielman, Esq.

(57) ABSTRACT

A process is provided for providing high contrast motion picture imagery. The camera system includes a physical architecture that enables multiple sensors to simultaneously acquire a visual scene without parallax or dissimilar exposures. The system architecture enables current off the shelf components to be used to develop the architecture or a specific sensor array to be developed. The architecture includes optical components that split an incident light ray into multiple beams of varying intensity. Each respective split light ray is then attenuated further with neutral density filters for the wavelengths to be observed before the light ray impacts the respective pixel sights. A process has been developed to use the camera system architecture to stochastically recombine the acquired energy and estimate what the original energy was before attenuation. The process involves the development of an optimal non recursive weighting function that can be used and constructed into a lookup table. The weighting function is used to minimize the error associated with symmetrically distributed error sources. A second filtering routine then takes place to remove the nonsymmetrical sources of error such as intraocular flare. This is accomplished by estimating the symmetric errors prior to acquisition and detecting when a sensors radiant exitance estimate does not fall within this symmetrical error bounds. The final reconstructed HDR image is formed once a pool of cameras is determined and a weighting average of the viable guesses is used to estimate the actual scene radiant exitance, or in a non-unitary sense, a photometric radiance. The HDR image can be saved as a high bit depth image or
(Continued)

tone-mapped either by the method introduced or by other means and stored to memory via convention 8-bit encoding methods for storage.

8 Claims, 56 Drawing Sheets

(51) Int. Cl.
      *H04N 5/355*      (2011.01)
      *H04N 5/247*      (2006.01)
      *H04N 5/238*      (2006.01)
      *G02B 27/10*      (2006.01)
      *H04N 5/359*      (2011.01)
      *H04N 5/357*      (2011.01)
      *H04N 5/232*      (2006.01)
      *G02B 5/20*       (2006.01)

(52) U.S. Cl.
      CPC ........... *H04N 5/2355* (2013.01); *H04N 5/247* (2013.01); *G02B 5/205* (2013.01); *H04N 5/23293* (2013.01); *H04N 5/3572* (2013.01); *H04N 5/3591* (2013.01)

(58) Field of Classification Search
      CPC ............. H04N 5/3591; H04N 5/35563; G02B 27/106; G02B 5/205
      See application file for complete search history.

(56) References Cited

U.S. PATENT DOCUMENTS

2006/0221209 A1* 10/2006 McGuire ........... H01L 27/14625 348/239
2009/0244717 A1* 10/2009 Tocci ....................... G02B 5/04 359/636
2011/0211077 A1* 9/2011 Nayar ................... G02B 26/06 348/207.1
2016/0248987 A1* 8/2016 Zilly .................. G02B 27/0075
2017/0331990 A1* 11/2017 Heshmat Dehkordi .................. H04N 5/2254

OTHER PUBLICATIONS

M. D. Tocci et al.: "A Versatile HDR Video Production System", ACM Trans. on Graphics, *ACM TOG*, (2011). http://www.ece.ucsb.edu/~psen/Papers/SIGGRAPH11_HDRVideoCamera.pdf.
L. L. Holladay: "The Fundamentals of Glare and Visibility", *J. of the Opt. Soc. of Am. (JOSA)* 12 (4), 271-319 (1926).
B. H. Crawford: "The Dependence of Pupil Size upon External Light Stimulus under Static and Variable Conditions", *Proc. of the Royal Society of London*, 121 (823) 376-395 (1936).
P. Moon et al.: "On the Stiles-Crawford Effect", *JOSA*, 34 (6) 319-329 (1944).
S. G. de Groot et al.: "Pupil Size as Determined by Adaptive Luminance", *JOSA*, 42 (7) 492-495 (1952).
J. M. Valeton et al.: "Light adaptation of Primate Cones", *Vision Research*, 23 (12), 1539-1547 (1983). http://ac.els-cdn.com/0042698983901670/1-s2.0-0042698983901670-main.pdf.
D. H. Hubel et al.: *Brain and Visual Perception*, ch. 12, 193-230 (2005).
D. Marr: *Vision: A Computational Investigation*, §2.2, 54-79 (2010).
D.J. Griffiths: "Development of High Speed High Dynamic Range Videography", dissertation, Virginia Polytechnic, Institute, Dec. 2016. https://vtechworks.lib.vt.edu/handle/10919/74990.

* cited by examiner

400

410

TABLE I
NOMENCLATURE AND UNITS

Fig. 4A

| Symbol | Parameter | Value/Units[a] |
|---|---|---|
| w | weighting function | dimensionless |
| z | digital value | analog digital units (ADU) |
| s | charge accumulation | $e^-$ |
| h | Planck's constant | $6.626 \cdot 10^{-34}$ $m^2 kg/s$ |
| c | speed of light | $3.0 \cdot 10^8$ m/s |
| C | capacitance | coulombs |
| $\lambda$ | wavelength | m |
| L | scene spectral radiance | $W/m^2 \times m$ |
| $\Phi$ | radiant exitance | $W/m^2$ |
| $\eta$ | quantum efficiency | $e^-/s/m^2/\gamma/s/m^2$ |
| $A_{phy}$ | system attenuation | dimensionless |
| $\Delta t$ | exposure time | s |
| k | Boltzmann constant | 1.38 J/K |
| $N_{well}$ | deep well capacity | $e^-$ |
| $q_s$ | quantization steps | 2^bit depth, (ADU) |
| i, j | pixel and camera, indices | dimensionless |
| A | pixel area | $m^2$ |
| T | temperature | K |
| $f^1(z)$ | camera response function | $J/m^2/ADU$ |
| $f'(z)$ | $d (f^{-1}(z)) / dz$ | dimensionless |
| g | sensor gain | $e^-$out / $e^-$in |
| $\tau_{optics}$ | optical transmittance | dimensionless |
| $\gamma$ | number of photons | dimensionless |
| $\varphi$ | photon flux | $\gamma/s/m^2$ |
| $\mu_{rd}$ | measured read noise | ADU |
| $\mu_{dc}$ | measured dark current noise | ADU |
| $\sigma_s$ | shot noise | W/m |
| $\sigma_{dc}$ | dark current noise | W/m |
| $\sigma_q$ | quantization noise | W/m |
| $\sigma_{rst}$ | reset noise | W/m |
| $\sigma_{rd}$ | read noise | W/m |

[a] W=watt, m=meter, C=coloumb, s=second, K=kelvin, J=joule, kg=kilogram, $e^-$=electron TABLE II
VARIOUS WEIGHTING FUNCTIONS[b]

| Author | Weighting Function |
| --- | --- |
| Mann and Picard | $w(z) = \dfrac{1}{f'[\log'(z)]}$ |
| Debevec and Malik | $w(z) = \begin{cases} z - z_{min}, & \text{for } z \geq \tfrac{1}{2}(z_{min}+z_{max}) \\ z_{max} - z, & \text{for } z \geq \tfrac{1}{2}(z_{min}+z_{max}) \end{cases}$ |
| Robertson et al. | $w(z) = e^{-16 \frac{z^2}{q_s^2} + \frac{1}{q_s} + \frac{1}{4}}$ |
| Mitsunaga and Nayar | $w(z) = \dfrac{f^{-1}(z)}{f'(z)}$ |
| Tsin et al. | $w(z) = \dfrac{\Delta t}{\sqrt{g\varphi \sigma_s^2 + \sigma_{dc}^2 + f'(z)^2 \sigma_q^2}}$ |
| Ward et al. | $w(z) = f^{-1}(z) f'(z)\left[1 - \left(\tfrac{2z}{q_s} - 1\right)^{12}\right]$ |
| Kirk and Anderson | $w(z) = \dfrac{\Delta t^2}{f'(z)^2 (\sigma_r + \sigma_q)^2}$ |
| Akyüz and Reinhold | $w(z) = f^{-1}(z) f'(z)\left[1 - \left(\tfrac{2\varphi}{q_s} - 1\right)^{12}\right]$ |
| Hasinoff et al. | $w(z) = \dfrac{\Delta t_j^2}{\varphi \Delta t_j + \sigma_r^2 + g_j^2 \varphi_q^2}$ |
| Granados et al. | $w(z) = \dfrac{\Delta t_j^2 g^2 a_i^2}{g^2 \Delta t_j(a_i \varphi_i + 2\overline{\mu_D}) + 2\sigma_r^2}$ |

[b] nomenclatures changed from original sources for consistency

TABLE III

COMMON RANGES OF RELEVANT TERMS AND UNITS

| Term | Range of Values | Units |
|---|---|---|
| $g$ | $1 \rightarrow 10$ | $e^-$out/ $e^-$in |
| $q$ | $1.602 \times 10^{-19}$ | C/ $e^-$ |
| C | $10^{-13} \rightarrow 10^{-15}$ | farads |
| $q_s$ | $2^8, 2^{10}, 2^{12}, 2^{14}, 2^{16}$ | ADU |
| Z | $0 \rightarrow q_s$ | ADU |
| $\eta$ | $0.1 \rightarrow 0.6$ | $e^-$/s / $\gamma$/s |
| $\lambda$ | $300 \times 10^{-9} \rightarrow 700 \times 10^{-9}$ | m |
| A | $4 \times 10^{-12} \rightarrow 9 \times 10^{-10}$ | $m^2$ |
| $N_{well}$ | $10{,}000 \rightarrow 150{,}000$ | $e^-$ |
| hc | $1.9864 \times 10^{-25}$ | J×m |
| k | $1.3806 \times 10^{-23}$ | J/K |
| t | $273 \rightarrow 330$ | K |
| $A_{phy}$ | $1 \times 10^{-6} \rightarrow 1$ | — |
| $\mu dc$ | $0 \rightarrow 0.0008 \times q_s$ | ADU |
| $\mu rd$ | $0 \rightarrow 0.0012 \times q_s$ | ADU |

Fig. 4C

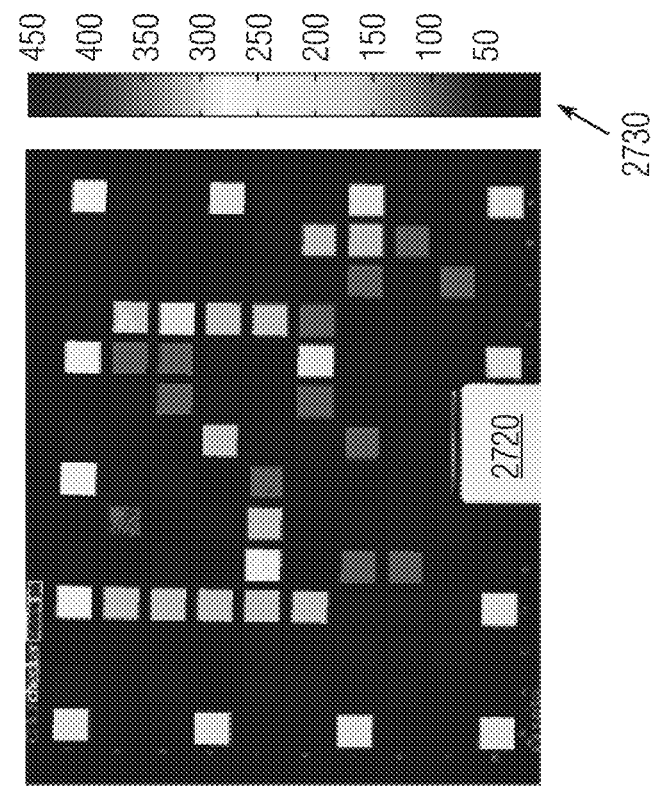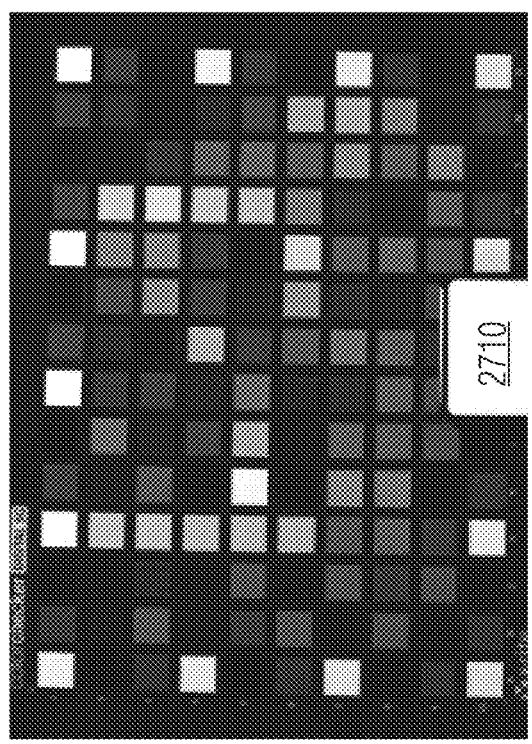
Fig. 27

| 2800 | $A_{bs}$ | F-Stop | $\Delta t$ (s) | $A_{Nd}$ | Gain |
|---|---|---|---|---|---|
| Cam 1 | 0.45 | 4 | 2.5e-5 | 0 | 0 |
| Cam 2 | 0.2025 | 5.6 | 2.5e-5 | 0.8 | 0 |
| Cam 3 | 0.0911 | 16 | 2.5e-5 | 0.8 | 0 |
| Cam 4 | 0.0911 | 11 | 2.5e-5 | 2.4 | 0 |

2820

2810 ⇒

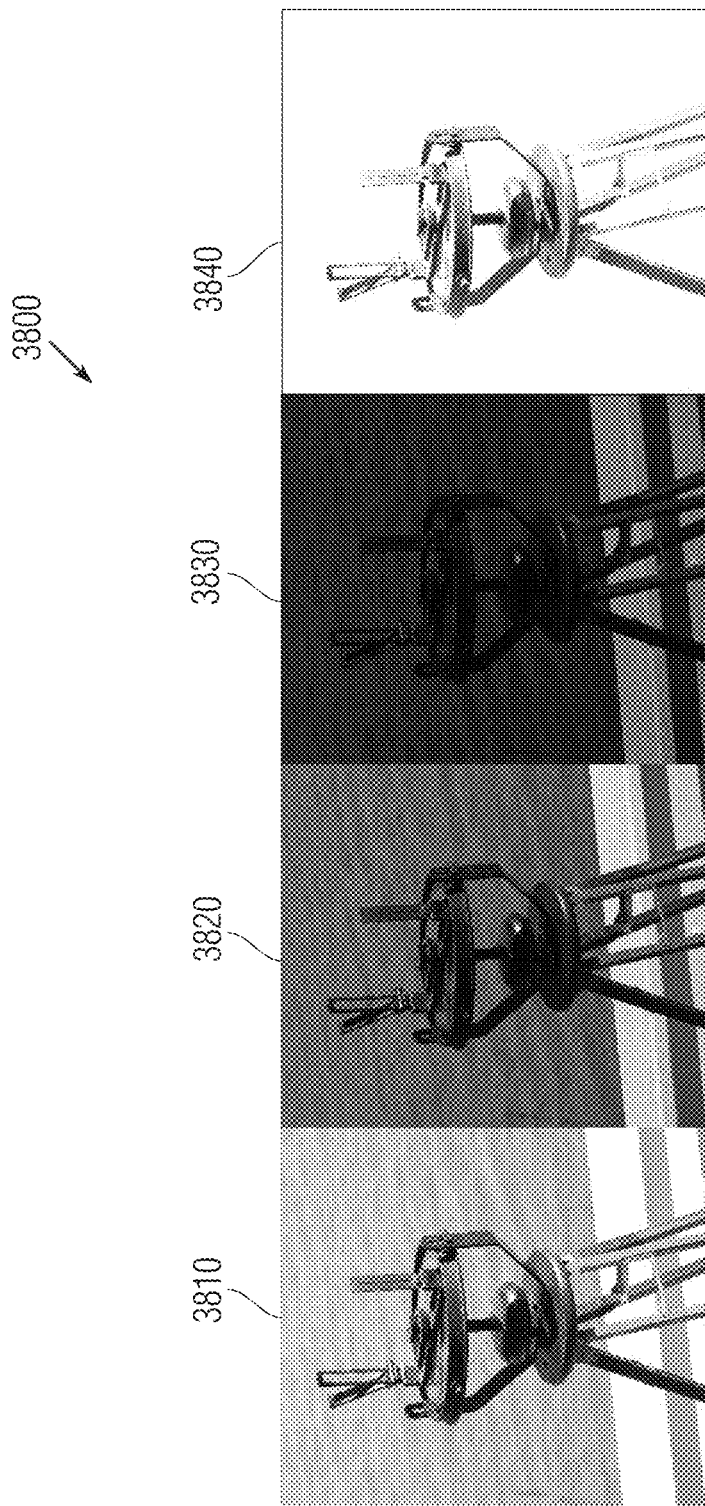

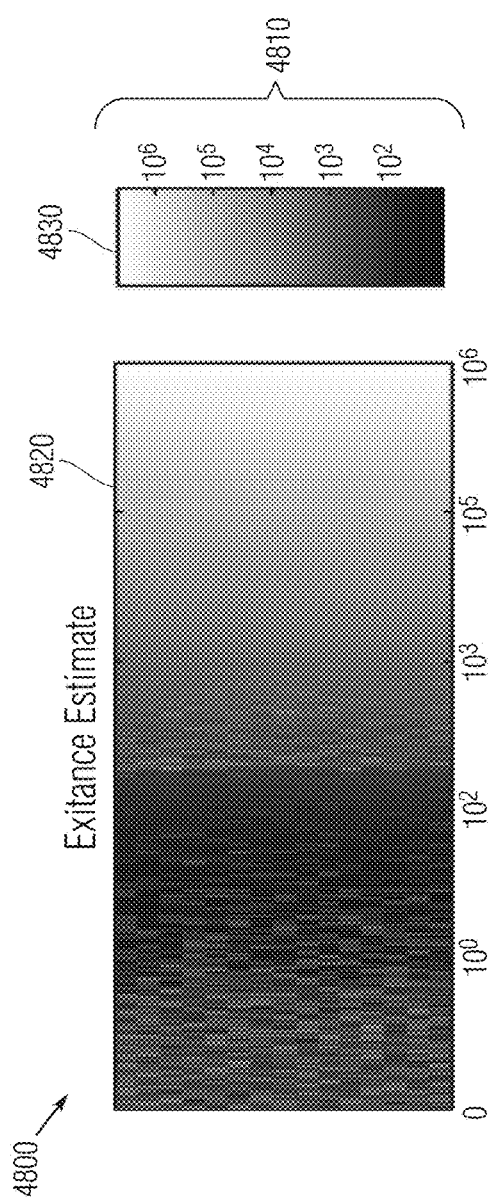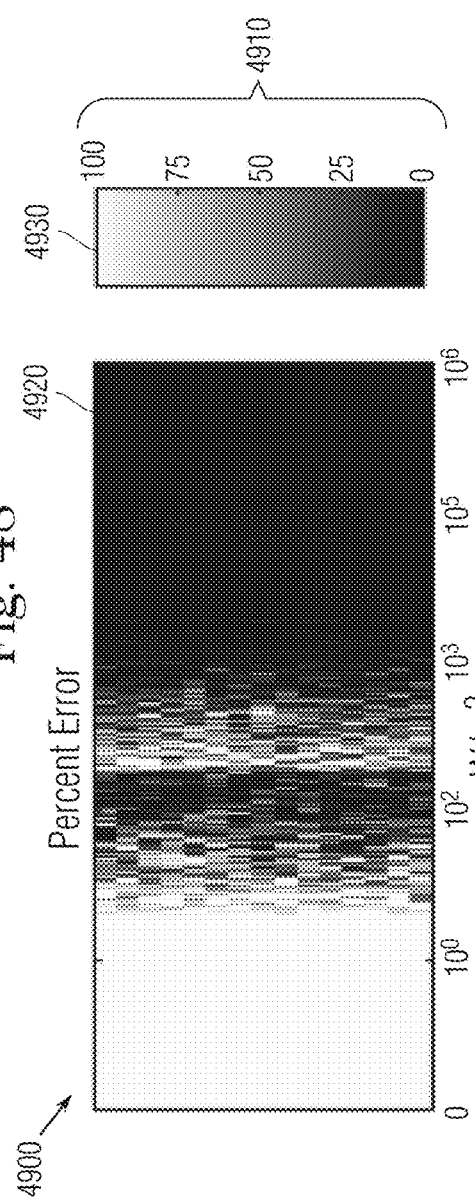

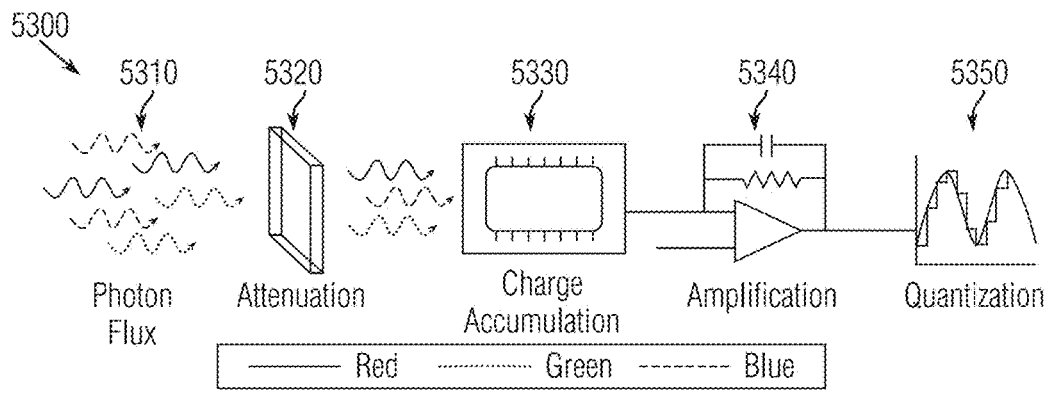
Fig. 53
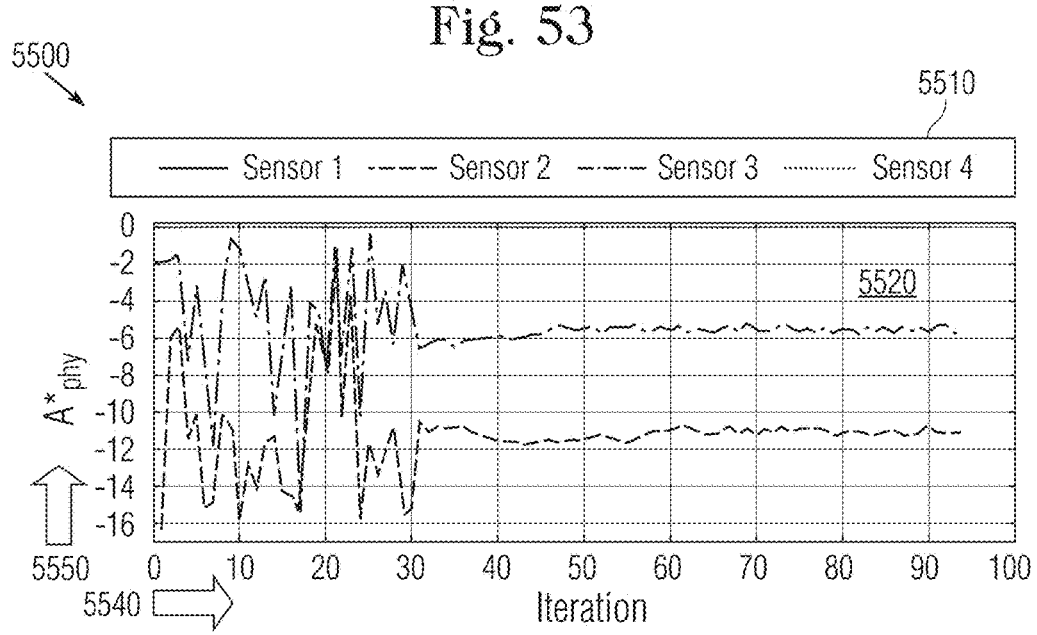
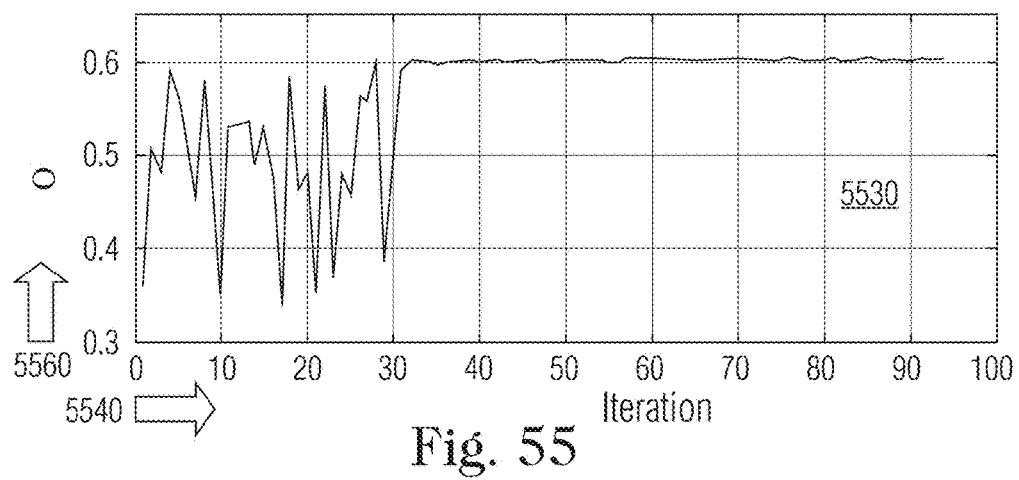
Fig. 55

TABLE IV — 5400
NON-DIMENSIONAL PARAMETERS AND DESCRIPTIONS

| Equation — 5410 | Description — 5420 |
|---|---|
| $t^* = \dfrac{\min(\Delta t)}{\Delta t}$ | exposure time relative to the minimum |
| $g^* = \dfrac{\min(g)}{g}$ | sensor gain relative to the minimum |
| $A^*_{phy} = \dfrac{\min(A_{phy})}{A_{phy}}$ | physical attenuation relative to the minimu |
| $\mu^*_{rd} = \dfrac{\mu_{rd}}{q_s}$ | ratio of read noise relative to the signal maximum |
| $\mu^*_{dc} = \dfrac{\mu_{dc}}{q_s}$ | ratio of dark current noise relative to signal maximum |
| $Z^* = \dfrac{Z}{q_s}$ | digital value relative to the number of quantization steps |
| $\eta^* = \dfrac{N_{well}}{\eta}$ | number of photons required to saturate the sensor |
| $\Phi^* = \dfrac{\Phi}{\Phi_{max}}$ | radiant exitance relative to the system maximum |
| $w^* = \dfrac{w}{\Phi^2_{max}}$ | weighting function relative to the maximum radiant exitance |
| $\sigma^*_{ADU} = \dfrac{\sigma_{ADU}}{\Phi_{max}}$ | and dark current noises relative to the read maximum resolvable radiant exitance |
| $\sigma^*_{ss} = \dfrac{\sigma_{ss}}{\Phi_{max}}$ | sensor level shot noise relative to the maximum resolable radiant exitance |
| $\sigma^*_{sw} = \dfrac{\sigma_{sw}}{\Phi_{max}}$ | radiant exitance shot noise relative to the maximum resolable radiant exitance |
| $S^* = \dfrac{S}{N_{well}}$ | charge accumulation relative to the deep well capacity of the sensor |
| $e^* = \dfrac{e}{N_{well}}$ | total charge accumulation per sensor relative to the deep well capacity |

Note: superscript asterisk signifies the non-dimensional parameter

Fig. 54

System Design:                                                                    6100

1) Define desired dynamic range
    a. Example: DR=170 dB
2) Define how many sensors can be used
    a. Example: three sensors
3) Define max[ $A_{phy}\Delta tg$ ]: (This is the least amount of attenuation seen by camera 1)

$$\max[A_{phy}\Delta tg] = \frac{\pi}{4\min[f/\#]^2} R_1 10^{-ND_1} \max[\Delta t] \max[g]$$ this assumes g and $\Delta t$ do not change, so this terms can be dropped. This is done for the high speed system because the gain cannot be altered, and one desires to keep $\Delta t$ at a constant. However, a different camera system can change the gain so the term is included for other configurations.
Example: $\min[f/\#]=2.8$, $R_1=0.45$
$ND_1=0$;
$\max[\Delta t]=0.033s$
$\max[g]=1$;

therefore $\max[A_{phy}] = 0.04508$ or $\log_2(0.04508) = 4.47$ stops of attenuation 4) Solve for $\min[A_{phy}]$ (equation 18 in IEEE)

a. $\min[A_{phy}] = \dfrac{q_s \max[A_{phy}]}{10^{\frac{DR}{20}}}$

Example: $q_s = 12$ (for a 12-bit system)

$\min[A_{phy}] = \dfrac{4096 * 0.04508}{10^{\frac{170}{20}}} = 5.84 * 10^{-7}$ or $\log^2(1.926 \times 10^{-8}) = -25.62$ stops attenuation 5) Solve for Aopt eqn. (108) to find the attenuation for the second camera $$A_{opt} = \frac{1}{n-1} \log_2\left[\frac{q_s}{10^{\frac{DR}{20}}}\right] = \frac{1}{3-1} \log_2\left[\frac{4096}{10^{\frac{170}{20}}}\right] = -8.11 \text{ stops spacing}$$

From step 3, 4 and 5

| Cam 1 | Cam 2 | Cam 3 |
|---|---|---|
| -4.47 stops attenuation | -4.47 =(-8.11)=-12.58 stops attenuation | -4.47 =(-8.11)+(-8.11)= -20.70 stops attenuation |

6) Use eqn. (54) to find what optics are needed a. $A_{phy,j} = \begin{cases} \dfrac{\pi}{4(f/\#_j)^2 \left(\dfrac{s_2}{s_1}-1\right)^2} 10^{-ND,j} R_j \prod_{j=1}^{j-1} T_{j-1} & j < J \\ \dfrac{\pi}{4(f/\#_j)^2 \left(\dfrac{s_2}{s_1}-1\right)^2} 10^{-ND,j} R \prod_{j=1}^{j-1} T_{j-1} & j = J \end{cases}$ Example for camera 2 (since 1 and 3 are bound by min($A_{phy}$) and max($A_{phy}$))

$$\dfrac{\pi}{4(f/\#_j)^2 \left(\dfrac{s_2}{s_1}-1\right)^2} 10^{-ND,2} R_2 \prod_{j=1}^{j-1} T_{j-1}$$

Where $T_1=0.45$ and $R_2=0.45$ we want to find a value for ND that will get $A_{phy}$ close to -12.58 stops attenuation or 0.000163 so $$\dfrac{\pi}{4(f/\#_j)^2} 10^{-ND,2} *0.45*0.45 = 0.000163 \rightarrow \dfrac{0.1^{ND}}{(f/\#_j)^2} = 0.0032$$

This is where some creativity comes in, ideally an $f/\#$ of 2.8 would be used and exact ND value can be found and made or purchased. However to ensure it's a COTS system one typically assumes an $f/\#$ same as min($f/\#$) and find the value of ND that can be purchased or that is on hand that yields a value as close as possible.
Example: ND ideal would be 1.6 they come COTS at 1.2 and 1.5 so 1.2 would be selected then an adjusted $f/\#$ would be calculated to compensate.

$$\dfrac{0.1^{1.2}}{0.0032} = (f/\#_j)^2 = 4.44$$

So the $f/\#$ is adjusted as close to 4.44 instead of 2.8 due to the limits COTS filters.

Fig. 61B

The same process is done on camera 3 to find what optics can be used to get the required attenuation level of -20.7 stops. In an ideal world a system would be designed with a single lens and single aperture, and specific ND created for each sensor for a range and ND filters constructed for each sensor 7) Once the system is setup and sensors aligned as close as possible (alignment process described in IEEE) take an image of a checkerboard and find the affine transform needed to further align the cameras through software <u>Algorithm execution:</u>

1) From the system design get the value for the bit depth, $A_{phy}$ for each camera, and physical properties of the camera such as active pixel active pixel area, and quantum effiency.
2) Calculate the astimated exitance and varience for each camera's pixel values
   a. Calculate the image responce function from JOAO paper equation 18:
      i. $f^{-1}(Z_{ij}) = \dfrac{hcN_{well,j}}{A_i \eta_{ij} q_s \lambda_i}$
      ii. Or use a method such as Debevec to find $f^{-1}(Z_{ij})$
      iii. Build exitance table using (JOAO paper equation 17)
      $$\phi = \dfrac{f^{-1}(Z_{ij})}{\Delta t A_{phy} g}$$
      iv. Build Variance Table
         1. Estimate shot noise, 740
         2. Estimate read and dark current noise, 750
         3. Estimate quantization error, 760
3) Calculate the waiting given to each pixel estimate
   a. If memery is not an issue use Griffiths full (JOAO equation 26)
      i. $W^*_{ij} = \left( \dfrac{\Delta t A_{phy,j} g_j}{\sup[\Delta t A_{phy,j} g_j]} \right) \left( 1 + \dfrac{1}{\dfrac{Z_{ij} q_s \eta g_j}{N_{well}(\mu_{rd,j}^2 + \mu_{dc,j}^2)}} \right)$
   b. If memery is an issueor camera parameters are unknown(common) use the simplified version (JOAO equation 28)
      i. $W^*_{ij} = \left( \dfrac{\Delta t A_{phy,j} g_j}{\sup[\Delta t A_{phy,j} g_j]} \right)$

Fig. 61C

4) If post processing load in the first image, if real time acquire the first image from all sensors synchronously.
5) Use spacial alignment (affine transform) previously found to do the very small adjustment not possible in the hardware setup. (ideally this step can be removed with precision, machining)
6) Estimate the exitance using the exitance table from each sensors acquired digital value.
7) Find the probability of the aligned pixels being from the same set
    a. Read the exitance values for all cameras at pixel location i
    b. Read in associated varience from varience table for all pixels
    c. From the varience table, calculate the set of exitance values that the acquired exitance estimate could have stemmed from. (gray range in 874 and 878)
    d. If there is no probability of intersection camera rejection will occur
        i. If camera 1 (little attenuation) is a value greater then camera 2 and camera 2 is greater then its noise floor, flaring is present and camera 1 data should be discarded
        ii. If camera 1 is less then camera 2 then camera 2 is acquiring only its base noise and data should be rejected.
    e. Repeat the process for camera 1 and 2 camera 2 and 3 camera 1 and 3 camera 1, 2 and 3 to find the sensor values that can be used for the final recombination.
    f. Calculate cost vs reward for each of the cameras (1340)
    g. Choose the camera combination that has the smallest error
    h. Combine the data using (JOAO equation 31)
        i. $$\phi_{HDR,i} = \sum_{j=a}^{b} W_{ij} = \frac{f^{-1}(Z_{ij})}{\Delta t_j A_{phy,j} g_j} \left( \sum_{j=a}^{b} W_{ij} \right)^{-1}$$
        Where a and b represent a list of the cameras from the camera pool 8) Tone map the HDR data into an 8-bit color space to save and/or save the HDR information
9) Append tone mapped frame to video sequence file
10) Acquire or load the next frame and repeat the process from step 4 (also step 4 in the specification)

MOTION PICTURE HIGH DYNAMIC RANGE IMAGING

CROSS REFERENCE TO RELATED APPLICATION

Pursuant to 35 U.S.C. § 119, the benefit of priority from provisional application 62/185,531, with a filing date of Jun. 26, 2015, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to capture of visual detail over a high dynamic range. In particular, the invention relates to sensing accurate tonal distinction for real-time high-speed video conditions. In present configuration, real-time implementation is not included, but conceivably could be. Also the inventive concept is not limited to high-speed video, but can be used on any imaging system for example a point-and-shoot camera, a cell phone, X-ray, infrared, security cameras etc.

Conventionally, the US Navy utilizes high-speed videography to capture energetic testing events for quantitative and qualitative assessment Frequently the optical acquisition of these events leads to the oversaturation of the camera sensor. Conventional manufacturers are aware of this problem and several systems are in place to mitigate the effects. Vision research utilizes an extended dynamic range mode, and Photron utilizes a dual slope mode. Both methods involve monitoring the pixel saturation over the course of some percentage of the integration time. If the sensor site is saturate the accumulated charge is sent to ground the cell acquires the scene for the remainder of the total integration time. These methods can help extend the dynamic range about 20 dB or a factor of ten. This provides most high-speed cameras a dynamic range of 80 dB or 10000:1.

The first use of high-speed photography dates back to 1851 when William Henry Fox Talbot exposed a portion of the *London Times* to a wet plate camera via spark illumination from Leyden jars. The first use of high-speed video was created by Eadweard Muybridge on Jul. 15, 1878 with twelve frames of a galloping horse exposed at $\frac{1}{1000}^{th}$ second to prove whether or not all four hooves were off the ground at any given time. From that time onward high-speed videography has been used to capture, and in many cases quantify event information that happened too fast for humans to readily observe. In the 1980's, the development of the charge coupled device (CCD) marked the beginning of digital high-speed videography which advanced with the development of active pixel sensors. As memory capacity, speed, sensitivity, and noise suppression continue to advance, high-speed digital cameras are rapidly replacing the use of film due to their ease of use and satisfactory imagining ability throughout the defense, automotive, industrial, and research applications.

One of the challenges high-speed camera manufacturers face when compared to film is dynamic range. The dynamic range a digital camera is capable of acquiring is defined as the ratio of the deep well capacity to the noise floor of the camera. High-speed cameras must have high sensor gains, large fill factors, and large pixels to account for the very short exposure times required in high-speed videography otherwise they succumb to shot noise, read noise and dark current noise limitations. The high-speed operational requirements limit the total dynamic range that most high-speed digital cameras can operate within, typically close to 60 dB.

One assumption of this type of process is the scene is invariant to change such as movement of objects within the frame during all exposures. Such scene change leads to ghosting within the image due to the differences in the image series. With enough exposures to statistically define the static objects, the objects in motion can be statistically removed. This method fails if the object in motion needs to be recorded or there are not enough samples to remove ghost objects. This has led to significant challenges in the development of high dynamic range (HDR) video. Several researchers have formed different solutions such as rapid bracketing, split aperture imaging, and a Fresnel based imaging systems with multiple imagers used to correct the underlying problem. Frame bracketing is an effective method to capture HDR video; however the method requires that a camera runs significantly faster than the desired output videos playback, limiting the low light sensitivity. The camera must also be able to modify the integration time rapidly to capture every sequence. This method also assumes that objects in motion do not create a significant amount of blurring over the course of any of the bursts. Therefore this method only works for objects that move slowly relative to the longest integration time.

The Fresnel based system utilizes multiple images through the use of a Fresnel beam-splitter that parses the light to the various sensors. This system showed significant promise but does not work if the source of light to be viewed is polarized or in a harsh environment. In 2011, Tocci et al. showed how a system comprised of a field programmable gate array (FPGA) and a pair of cameras could be used for the creation of real time tone-mapped HDR video. By having the cameras observe the same field and selecting which related pixels from the camera pairs had the most accurate information, an aggregate of the selections could be used to display a welding process. This method enabled the direct visualization of the weld, melt pool, and materials being welded in their demonstration.

In 2011, NASA used six high-speed cameras to video the STS-134 launch and five high-speed cameras and one thermal camera to visualize the STS-135 launch. NASA had a camera shelter with six high-speed cameras running at 200 fps set at six different exposure times. The cameras were oriented to form a 3×2 grid. The subjects being filmed were sufficiently far relative to the camera spacing that parallax error was not a problem, and the first high-speed HDR video known to the author was formed. However, NASA's system would be subject to parallax errors if it were to be used to film something closer to the lens.

High dynamic range (HDR) imaging was developed in response to the frequent breach of the upper limit of a single optical sensor's acquisition range. Through photo bleaching and pupil dilation, the human eye adapts to a scene's range of light to compensate for its own limitations. The adaptation mechanism extends the human vision systems functional range to about 12 orders of magnitude spanning about a 10,000:1 range for a given background radiance. A solution to the image acquisition problem was first presented in 1962 when Wyckoff proposed the use of a composite film composed of layers of varying speed photosensitive material with similar spectral sensitivity in order to capture a high dynamic range scene. Each layer of film would be printed to a different color and superimposed to form a pseudo color image that would represent how bright the various regions were. In the 1980's the invention of the charged coupled device created a wave of interest in digital imaging which suffered from an even smaller dynamic range than traditional film. In 1995, Mann and Picard introduced the concept of combining digital images of different exposures. They call each exposure a Wyckoff layer and is analogous to images taken using exposure bracketing. Mann and Picard begin their image formation process by generating a camera sensitivity curve from a comparison of differently exposed spatially aligned pixel values that were scaled by an unknown amount. The amalgamation of the unknown values' scaling parameters into a lookup table is known as the camera response function and can be used for the linearization of the acquired data. Mann and Picard introduced the concept of fitting the data to a power curve via parametric regression to complete the lookup table for all potential digital values. Mann and Picard also introduced the concept of using a weighted average as a method to reform an HDR image from the series of images.

In 1997 Debevec and Malik expounded upon Mann and Picard's multi image fusion ideology to form a robust method to fit the image response function to a smoothed logarithmic curve. Debevec and Malik introduced a weighted average as the maximum likelihood estimator that can be used to form the various images with their image response curve into one double precision representation of the linearly related sensor irradiance values. A weighted average is used because most forms of noise were assumed to be symmetrically distributed. The matrix of scaled irradiance values is referred to as an HDR image. In order to display the HDR image, the data must be tone-mapped into the display space of the output media, typically an 8-bit-per-color channel image. In the subsequent years several other methods, reviewed and compared by Akyüz, are developed to find the image response function that can be used in conjunction with the maximum likelihood estimator to form the HDR image.

Over the past two decades there have been several proposed weighting functions that will reduce the overall error on HDR image formation. They can be grouped into three categories; proportional to the acquired digital value, proportional to the slope of the camera response function for the given digital value, or proportional to a noise estimate on the estimated radiant exitance, which is the radiant flux emitted by a surface measured in watts-per-square-meter ($W/m^2$). The first weighting function was introduced in 1995 by Mann and Picard, who defined a weighting function that would weigh the digital values proportional to the rate of change of the logarithm of the camera response function. This was done to reduce the effect of quantization and make the error appear uniform. In 1997, Debevec and Malik introduced the first weighting function that was proportional to the acquired digital value and takes the form of a hat (^) or caret function centered on the middle of the analog to digital conversion range. In 1999, Robertson et al. introduced a weighting function that was similar to a Gaussian curve assuming the sensor sensitivity would be highest around the center of the camera response curve and the extremes would present little to no usable information. Also in 1999, Mitsunaga first introduced the concept of incorporating a camera error model by creating a weighting function that is a first order approximation of the signal to noise ratio.

In 2001 Tsin et al. created the first statistical characterization to form a weighting function. In general there were three error terms. The first term modeled the thermal noise, the second term incorporated quantization error and amplifier noise, and the third term modeled the contribution from shot noise. In 2005 Ward proposed a modification to Mitsunaga's weighting function by multiplying it with a broad hat model to reduce the relative importance of the pixel values at the extremes of the acquisition range. In 2006 Kirk introduced the first weighting method that is exactly the reciprocal of the square of the error as the weighting function that minimizes the error on formation. In 2007 Akyüz proposed a modification to Ward's weighting function. Instead of the weighting function being a function of the digital value, the weighting function should be a function of the estimated radiant exitance. In 2010 Granados and Hasinoff introduced weighting functions designed to minimize the error on formation by accurately modeling the variance in the system. To accomplish this, a recursive scheme was developed to accurately model the shot noise. Granados takes into account fixed pattern noise, read noise, shot noise, and dark current noise. Hasinoff's weighting method includes shot noise, read noise, and quantization error.

SUMMARY

Conventional dynamic photographic techniques yield disadvantages addressed by various exemplary embodiments of the present invention. Specifically for an HDR image, the light beam from a scene is divided by beam-splitters and attenuated by neutral density filters. After acquisition by separate cameras, the radiant exitance from each beam division is combined from which to estimate original scene exitance. Weighting functions are employed to minimize symmetrical errors. The final HDR image is constructed from the weighting averages of the original scene exitance.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 4 is a nomenclature list for parameters identified in the disclosure; components;

FIG. 27 is a grayscale comparison view of a pair of Macbeth color chart and the measured luminance;

FIG. 34A is the graphic representation of the Y channel from the XYZ color coordinate system of a flash bulb;

FIG. 34B is an example of an image of a flash bulb;

FIG. 35 is a chart view of luminosity, hue and saturation;

FIGS. 38A, 38B, 38C, 38D, 38E and 38F are comparative image views of an antique pelorus;

FIG. 48 is a diagram view of exitance estimate;

FIG. 49 is a diagram view of error variation;

FIG. 53 is a diagram view of signal processing in the exemplary system;

FIG. 54 is a tabular view of non-dimensional parameters;

FIG. 55 is a set of graphical views of attenuation and order variation with number of iterations;

FIGS. 61A, 61B, 61C and 61D are list views of exemplary instructions.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC), a field programmable gate array (FPGA), a digital signal processor (DSP) or other related component.

Various exemplary embodiments provide an apparatus and a process in which commercial-off-the-shelf (COTS) components for assembly to create a camera system that can acquire the full range of light for viewing any given scene. The disclosure details the physical setup, a custom algorithm to process the acquired information, and a custom procedure to rescale the acquired information in a viewable image on common display media such a monitor, television, or other display or printed media forms. COTS parts can be employed in either a piece-wise manner or as a permanent embodiment as a standalone unit to create the camera system. This is an important contribution so modern high-speed cameras and specific wavelength cameras can be used without redesigning the entire system. This technology has been demonstrated using standard cameras, high-speed cameras, and common point-and-shoot cameras.

Figure 1A:
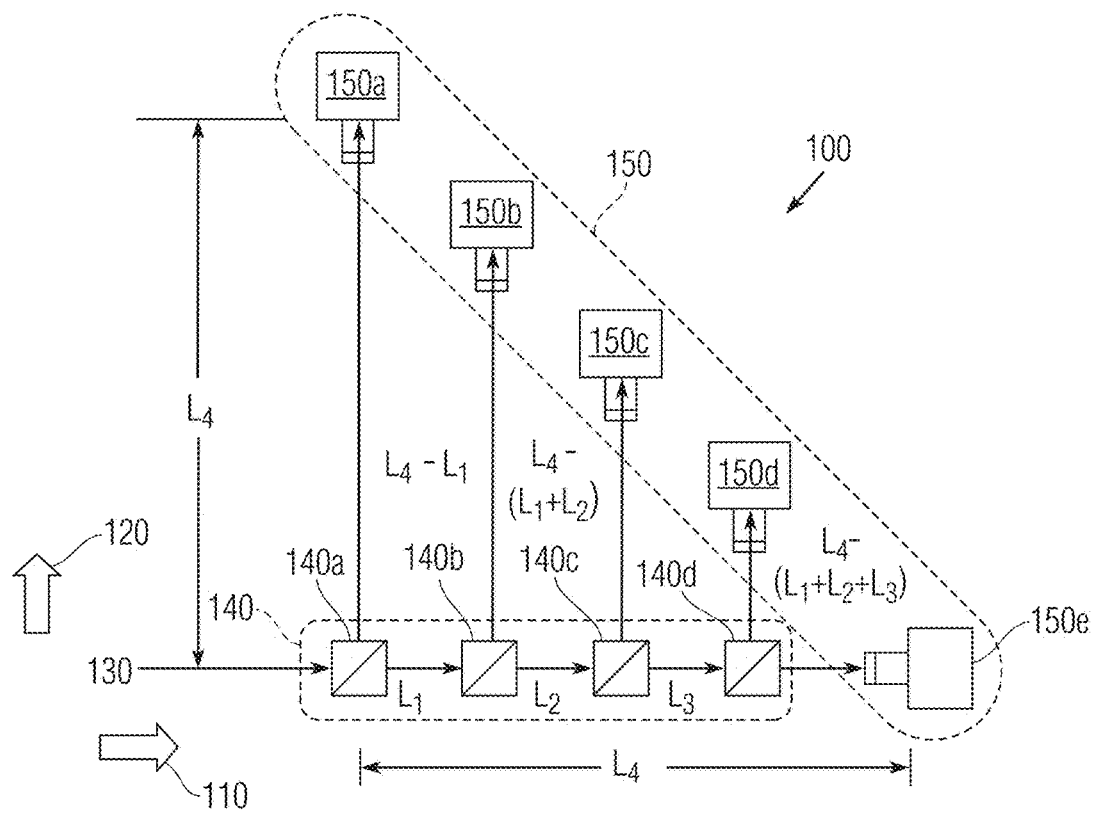
FIGS. 1A and 1B are schematic views of cascade imaging systems.
Figure 1B:
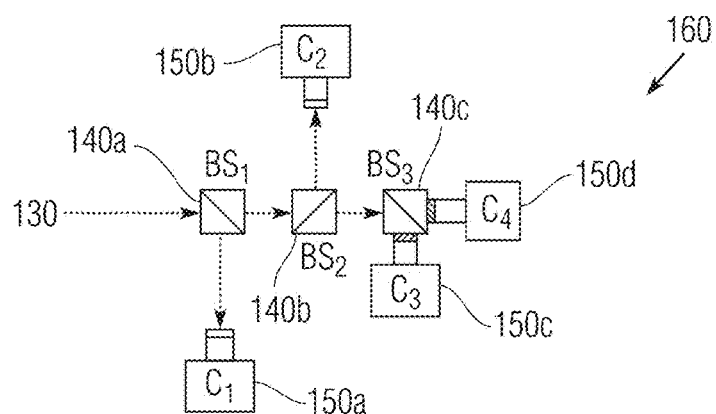

FIG. 1A shows a plan schematic view of a cascading photo imager 100 featuring a viewing plane of axial 110 and transverse 120 directions. A photon source projects incident light 130 in the axial direction 110 to encounter a series of beam-splitters 140, sequentially labeled 140a, 140b, 140c and 140d. The beam-splitters 140 direct the light 130 to either proceed in the axial direction 110 or reflect to the transverse direction 120 to be received by a series of cameras 150, sequentially labeled 150a, 150b, 150c and 150d for the transversely reflected light 130 and 150e for the axially proceeding light 130. The distances between the beam-splitters 140a to 140b, 140b to 140c, and 140c to 140d are respectively designated $L_1$, $L_2$ and $L_3$. The overall distance between the beam-splitter 140a and the focal planes of the cameras 150e and 150a is designated $L_4$. Similarly, the distances between cascading beam-splitters 140 and cameras 150 can be determined. For example, the distances between the beam-splitters 140b, 140c and 140d to their corresponding cameras 150b, 150c and 150d are respectively denoted $L_4-L_1$, $L_4-(L_1+L_2)$, and $L_4-(L_1+L_2+L_3)$. An alternative configuration would consist of a single lens located at the plan of 140a with relay optics to adjust the focal distance to the new imager location, 150a through 150e. FIG. 1B shows an alternate schematic view 160 of the HDR video system. Cameras are labeled C1-C4, and beam-splitters are labeled BS1-BS3 similarly to view 100. Each camera's optical path is equidistant to the leading surface of the first beam splitter. The required neutral density filter is placed on the end of the lens to achieve the desired attenuation.

Formation Error Reduction by Weighting Functions: An exemplary weighting function that can be used to minimize the formation error introduced from a weighted average has been shown to be $\sigma^{-2}$, where $\sigma$ is the standard deviation of the error associated with the formation of the individual images. Subsequent weighting functions have been developed by Tsin, Krik, Hasinoff and Granados to define error deviation $\sigma$ in a manner such that the weighting function is able to accurately reduce the error on the formation of the final HDR image. The four most significant sources of error that affect the signal are reviewed by Healey. They are defined as shot noise, dark current, read noise, and quantization error. The errors on the image formation can be considered independent; the total variance $\sigma_t^2$ can be found by adding the various contributors in quadrature:

$$\sigma_t^2 = \sigma_s^2 + \sigma_{rst}^2 + \sigma_{dc}^2 + \sigma_{rd}^2 + \sigma_q^2, \tag{1}$$

where $\sigma_t^2$ is total variance, $\sigma_s^2$ is shot noise variance, $\sigma_{rst}^2$ is reset noise variance, $\sigma_{dc}^2$ is dark current noise variance, $\sigma_{rd}^2$ is read noise variance, $\sigma_q^2$ is quantization noise variance. Each noise term natively has different units. The units associated with shot noise is typically in photons, read noise in electrons or volts, dark current in electrons or ADU, quantization noise in ADU and read noise in ADU. In order to have a meaningful comparison all the noise terms must have consistent units. Their respective units can be converted to their equivalent radiant exitance values.

First a simplified model of the image sensor must be defined. Starting from a Lambertian source, the photon flux $\varphi$ can be defined as:

$$\varphi = \frac{1}{hc} \int_{\lambda_2}^{\lambda_1} L(\lambda) d\lambda, \tag{2}$$

where h is Planck's constant, c is speed of light and $L(\lambda)$ is the spectral radiance for wavelength $\lambda$. Following the derivation by Fiete, the contribution from the optics and integration time must now be considered. The total attenuation from the aperture is proportional to $\pi/4(f/\#)^2$ and the integration time is multiplicative. Multiplying eqn. (2) by the quantum efficiency $\eta$ for an exposure value setting j, at pixel location i, the total charge accumulation, $s_{ij}$ can be defined as:

$$s_{ij} = \frac{\pi g_j A_j \Delta t_j}{4(f/\#)^2 \left(\frac{s_2}{s_1}\right)^2 hc} \int_{\lambda_{i,min}}^{\lambda_{i,max}} \eta(\lambda_i) \tau_{optics}(\lambda_i)[h_{sys}(\lambda_i) * L_{scene}(\lambda_i)] \lambda_i d\lambda_i, \tag{3}$$

where for each exposure setting g is sensor gain, $A_j$ is active area of the pixel, $\Delta t_j$ is exposure time, $f/\#$ is the f-stop number for the lens, $s_2$ is the distance to the imager, $s_1$ is the distance to the object, $\eta$ is the wavelength-dependent quantum efficiency of the sensor, $\tau_{optics}$ is the transmission of the optics and filters, $h_{sys}$ is the point spread function, * indicates convolution and $L_{scene}$ is the spectral radiance of the scene. Because the objective is to compare the relative effects of the different sources of noise on the final image formation, eqn. (3) can be simplified with several assumptions.

Assuming the lens and associated filters in use were designed to mitigate any wavelength variations over the passband, $\tau_{optics}$ is extracted from the integral as a value from zero to unity for the system optical attenuation. Assuming there is little distortion geometrically due to the lens, the point spread function will be unitary, therefore the scene's spectral radiance will be equal to the imager spectral radiance at all locations on the imager. The quantum efficiency of the sensor can be estimated by the mean of the quantum efficiency for a camera if non-linear over the passband, and the incident light is assumed monochromatic. Finally, assuming the object being imaged is much further from the lens than the sensor is, the distance ratio $s_2/s_1$ approaches zero and can be neglected. Also the radiant exitance can be assumed to be sufficiently low to only produce enough charge to barely saturate the sensor. The charge accumulation at the sensor can be reduced to the relation:

$$s_{ij} = \frac{\pi g_j \tau_{optics} A_j \Delta t_j \eta_j}{4(f/\#)^2 hc} \lambda_i \Phi_i, \tag{4}$$

where $\angle_i$ is the radiant exitance at the corresponding pixel i. For convenience, select numerator terms can be combined as the system physical attenuation:

$$A_{phy,j} = \frac{\pi \tau_{optics}}{4(f/\#)_j^2}. \quad (5)$$

The estimated scene radiant exitance can be determined from a reported digital value $Z_{ij}$ using the relation:

$$\Phi_{ij} = \frac{Z_{ij} N_{well,j} hc}{q_s A_j \Delta t_j A_{phy,j} \eta_j \lambda_i g_j}, \quad (6)$$

where $N_{well}$ is the deep well capacity of the sensor and $q_s$ is the number of discretization steps from the camera's analog-to-digital (A/D) converter. The mean number of photons $\gamma_j$ collected by the sensor over the integration time can be expressed as:

$$\gamma_j = \frac{A_{phy,j} \Delta t_j A_j \lambda_j \Phi_j}{hc}. \quad (7)$$

Shot noise arises from the quantum nature of light. The energy arrives at the sensor site in packets with a mean value and some fluctuation that is proportional to the number of events, and can be modeled as a Poisson distribution. The variance of the shot noise is equal to the mean therefore the standard deviation is equal to the root of the mean value. When using eqn. (6) in conjunction with eqn. (7) the shot noise $\sigma_s$ in units of W/m² becomes:

$$\sigma_s = \sqrt{\frac{hc\Phi_j}{A_{phy,j} \Delta t_j A_j \lambda_j}}. \quad (8)$$

Reset noise $\sigma_{rst}$ can be a limiting factor on the sensors effectiveness. A charge amplifier is typically used to convert the acquired charge to a voltage. The sense capacitor must be reset before each packet is measured to a reference voltage. There will be thermal noise on the reference voltage and will cause an error on the determination of the exact charge collected by the sensor site. The standard deviation of the reset noise is:

$$\sigma_{rst} = \frac{\sqrt{kTC}}{q}, \quad (9)$$

where k is Boltzmann constant, T is temperature in kelvins, C is photodetector capacitance in coulombs, and q is the number of electrons per coulomb or $1.602 \cdot 10^{-19}$. The total number of electrons must be converted to units of W/m² to see how the reset noise affects the overall estimate of the scene radiance. The reset noise in W/m² is redefined as:

$$\sigma_{rst} = \frac{\sqrt{kTC}}{q A_j \Delta t_j} \left[ \frac{g_j hc}{\eta_j \lambda_i} \right]. \quad (10)$$

Typically modern sensors use electronics such as a correlated double sampler (CDS) to mitigate reset noise due to being very high relative to the measurement signal. A CDS takes two samples and reports the difference. The first sample is taken from the reference voltage after reset and again after integration with the difference being the acquired signal, nearly eliminating this kind of error. Dark current is the current generation due to the temperature of the silicon lattice of the imager without the presence of any irradiance. An empirical relationship for dark current D in electrons/pixel/s, can be defined as:

$$D_c = 2.5 \cdot 10^{15} \cdot A I_d T^{1.5} \exp\left(-\frac{E_g}{2kT}\right), \quad (11)$$

where $I_d$ is the dark current measured at 300K, $E_g$ is the bandgap at the operational temperature T. It can be difficult to find these specifications or to obtain a physical measurement in nano-amperes (nA) of the dark current. Therefore a direct measurement of the dark current in units of ADU is used herein. This can be accomplished by taking several measurements of a dark frame, an acquisition with the lens cap on. There are two components to dark current; a mean value defined by eqn. (11) and the photon shot noise which is proportional to the square root of the dark current signal. The total dark current noise $\sigma_{dc}$ represented in W/m² can be expressed as:

$$\sigma_{dc} = \frac{N_{well,j} hc}{q_s A_j \Delta t_j A_{phy,j} \eta_j \lambda_i g_j} [\bar{\mu}_{dc,j} + \mu_{dc,j}], \quad (12)$$

where $\bar{\mu}_{dc}$ is the offset cause by the dark current and $\mu_{dc}$ is the dark current noise in ADU. Performing a dark frame subtraction before acquiring an image is common practice. This is sometimes referred to as a session reference and subtracts the charge accumulation caused by dark current offset. However, there remains shot noise associated by the dark current from the flow of charge.

Read noise comprises of Johnson-Nyquist noise and flicker noise. Johnson-Nyquist noise $\sigma_{JN}$ is caused by the thermal agitation of the charge carries on the source follower and is broadband in spectrum. Flicker noise has a power spectrum that is equal to the reciprocal of the frequency and is caused by the pixel readout rate. The faster the rate the lower the noise, until ultimately the flicker noise is below the thermal noise. The Johnson-Nyquist noise can be defined as:

$$\sigma_{JN} = \sqrt{4kT \Delta f R}, \quad (13)$$

where $\Delta f$ is the bandwidth and R is resistance. The operational frequency and the follower resistance is not readily available information on most cameras. However, it is possible to measure the read noise in ADU per Healy's guidance. The read noise can then be converted into W/m² in a similar manner as the dark current utilizing:

$$\sigma_{rd} = \frac{N_{well,j} hc \mu_{rd,j}}{q_s A_j \Delta t_j A_{phy,j} \eta_j \lambda_i g_j}, \quad (14)$$

where $\mu_{rd,j}$ is the measured standard deviation in ADU. The final form of error is quantization error. The radiant energy estimate associated with the quantization error is typically treated as an error with constant variance. However, the quantization error will only have a constant variance if the physical attenuation is held constant for all Wyckoff layers. The quantization of a given signal is a uniform distribution therefore its standard deviation can be defined by:

$$\sigma_q = \frac{\Phi_{max,j}}{\sqrt{12}}, \quad (15)$$

where $\Phi_{max,j}$ is the maximum radiant exitance that can be acquired for the particular exposure value setting. Utilizing eqn. (7) where digital value $Z_{ij}$ is equal to $q_s$, the standard deviation of the quantization error in units of $W/m^2$ can be expressed as:

$$\sigma_q = \frac{1}{\sqrt{12}} \left( \frac{N_{well,j} hc}{A_j \Delta t_j A_{phy,j} \eta_j \lambda_i g_j} \right). \quad (16)$$

Thus, eqns. (8), (10), (12), (14) and (16) can be substituted into eqn. (1) to find the total magnitude of the error introduced by the read noise, shot noise, reset noise, dark current noise, and quantization error in units of $W/m^2$. Each error component has some dependency on one or more of the variables listed in Table III (in FIG. 4). There are a total of ten parameters that can modify what the ideal weighting function should be. In the formation of HDR images or video, several methods have been proposed in the literature to capture the images or form a video stream while maintaining one or more of these variables. All of these parameters must be considered when forming the simplified weighting function. The simplified weighting function assumes a CDS or similar method is used to remove the reset noise. The dark current and read noise terms can be combined to yield:

$$\sigma_{ADU} = \frac{N_{well,j} hc}{q_s A_j \Delta t_j A_{phy,j} \eta_j \lambda_i g_j} [\mu_{rd,j}^2 + \mu_{dc,j}^2]^{1/2}. \quad (17)$$

Comparing the remaining error terms to one another enables determination of which term is the dominant factor, and under what circumstances. There are a total of three error terms remaining. The first comparison occurs between the standard deviation arising from the read noise and dark current noise combination $\sigma_{ADU}$ and the quantization error. Also, the read and dark current noise is going to be a fixed percentage P of the number of quantization levels being much less than $(2\sqrt{3})^{-1} \approx \frac{1}{5}$. For the assumption that the quantization error yields larger errors on the estimate than the read and dark current noise, the percentage must be less than 28.8% as threshold value.

Inferring from the values of $\mu_{dc}$ and $\mu_{rd}$ in Table III, the percentage is typically under 0.2% or two orders of magnitude lower than the threshold value. Hence, the read noise and dark current noise terms can be omitted without significant degradation. If the error from the read and dark current noises is significantly larger than the quantization error, then:

$$\sigma_q \ll \sigma_{ADU}. \quad (18)$$

Substituting eqns. (15) and (16) into eqn. (18) yields the condition that read and dark current noise terms contribute significantly more to the final image formation when:

$$12(\mu_{rd,j}^2 + \mu_{dc,j}^2) \gg 1 \quad (19)$$

is valid. Utilizing Table II and eqn. (19), the sum of the variance becomes a percentage P of the number of quantization levels as:

$$P \gg \frac{1}{12 q_s}, \quad (20)$$

which indicates that the percentage must be significantly greater than 0.03% or an 8-bit system and 0.002% for a 12-bit system for the quantization error to be ignored. This situation occurs when the camera has a native dynamic range over 70 dB for an 8-bit system or 93 dB for a 12-bit system, an uncommon condition outside of specialized cameras.

The second comparison is between the shot noise and the quantization error based on eqns. (8) and (16):

$$\frac{\sigma_s^2}{\sigma_q^2} = \frac{\frac{1}{12} \left( \frac{N_{well,j} hc}{A_j \Delta t_j A_{phy,j} \eta_j \lambda_i g_j} \right)^2}{\frac{hc\Phi_j}{A_{phy,j} \Delta t_j A_j \lambda_j}} = \quad (21)$$

$$\frac{(N_{well,j} hc)^2 A_{phy,j} \Delta t_j A_j \lambda_j}{12 (A_j \Delta t_j A_{phy,j} \eta_j \lambda_i g_j)^2 hc\Phi_j}$$

$$= \frac{N_{well}^2 hc}{12 A_j \Delta t_j A_{phys,j} \lambda_i g_j^2 \Phi_j} \gg 1.$$

This yields a percentage P of the discretized range where the shot noise dominates:

$$P \gg \frac{100 N_{well}}{12 g \eta q_s^2}. \quad (22)$$

Referring to Table II (FIG. 4), the general range of the right-hand-side of eqn. (22) has order O[0.001%-10%]. This indicates there are conditions when the quantization error can contribute to the total error, but only for a very small percentage of the acquirable range.

The quantization error contribution has been shown to be small for most cases relative to shot noise, read noise and dark current noise. The exemplary weighting function can be formed where total noise $\sigma_t$ can be approximated by:

$$\sigma_t^2 \approx \sigma_s^2 + \sigma_{ADU}^2, \quad (23)$$

from the shot noise and the combined dark current and read noises. Therefore, knowing the optimal weighting function $w_{ij}$ as the reciprocal of the total variance, the full simplified weighting function can be defined as:

$$w_{ij} = \frac{(\Delta t A_{phy,j} g_j)^2 N_{well}}{f^{-1}(Z_{ij})^2 [Z_{ij} q_s \eta g_j + N_{well}(\mu_{rd,j}^2 + \mu_{dc,j}^2)]}. \quad (24)$$

The full simplified weighting function can be reformed into a non-dimensional form by normalizing the weighting function by the maximum value it would assume, scaling all weights from zero to unity (0-1). The maximum value corresponds to the digital value being at minimum, e.g., zero, the physical attenuators are at maximum, the gain set to maximum, and the exposure time at maximum, and the supreme of the set $\Delta t$ $A_{phy}$, g. The exemplary non-dimensional weighting function $w_{ij}^*$ can be defined as:

$$w_{ij}^* = \left(\frac{\Delta t A_{phy,j} g_j}{\sup[\Delta t A_{phy,j} g_j]}\right) \frac{1}{\left(1 + \frac{Z_{ij} q_s \eta g_j}{N_{well}(\mu_{rd,j}^2 + \mu_{dc,j}^2)}\right)}, \quad (25)$$

where sup[•] indicates the supremum of the bracketed set. The first multiplying factor scales the weighting function by the magnitude of the attenuation and gain parameters. The second multiplying factor scales the magnitude based on the ratio of the shot noise contribution and the read noise ratio to the camera's sensitivity. The second multiplying factor approaches a value of unity if:

$$\frac{N_{well}}{q_s \eta g_j} > \frac{Z_{ij}}{\mu_{rd,j}^2 + \mu_{dc,j}^2}. \quad (26)$$

The exemplary simplified non-dimensional weighting function is thus defined as:

$$w_{ij}^* = \left(\frac{\Delta t A_{phy,j} g_j}{\sup[\Delta t A_{phy,j} g_j]}\right), \quad (27)$$

as the second factor in eqn. (25) approaches unity.

Generating Synthetic Images:

In order to evaluate the various weighting functions for a reconstructed HDR scene, simulated images must be generated so a ground truth can be known. A multi imager system is assumed to record the HDR video. The cameras are looking at the same field of view through a succession of optics such as a beam-splitter with some level of transmittance and to achieve the desired Wyckoff layers. The exposure time is held constant for each camera and only the optical train is used to attenuate the incident light. The process of creating the images is graphically depicted in FIG. 47 described subsequently. These operations include (a) creating a simulated radiant exitance field, and (b) forming the HDR image. A simulated radiant exitance field of monochrome light must be created. A succession of vertical bars, each being ten pixels wide and twenty pixels high was chosen. Each bar will contain two-hundred pixels at a given radiant exitance level for the respective processing method to estimate the actual value. The radiant exitance field spans from 0 W/m² to the maximum resolvable radiant exitance $\Phi_{max,j}$ defined as:

$$\Phi_{max,j} = \frac{N_{well,j} hc}{A_j \Delta t_j A_{phy,j} \eta_j \lambda_i g_j}. \quad (28)$$

Once the radiant exitance field is created, the shot noise associated with each pixel can be calculated. The shot noise is estimated by first calculating the mean number of photons at the given wavelength governed by eqn. (7). Assuming the signal level will be more than ten photons, a normal distribution will be used to generate the shot noise image since a Gaussian and Poisson distribution are nearly identical for large sample sets. The shot noise at each pixel is then generated utilizing a normally distributed random number generator. The new shot noise image $\Phi_{s,i}$ is found by:

$$\Phi_{s,j} = \sqrt{\frac{hc\Phi_i}{\Delta t A \lambda}} \cdot randn(\cdot) + \Phi_i. \quad (29)$$

where randn is a normally distributed random number scaled from −1 through 1.

The radiant exitance image with added shot noise then needs to be synthetically acquired by the virtual cameras. The charge accumulation from a given scene for a radiant exitance level is modeled in eqn. (28) and yields a value for the charge accumulation. The read and dark current noise must then be added by:

$$e_{tot}^- = S(\Phi_{s,i}) + \frac{N_{well,j}}{q_s}(\mu_{d,j} + \mu_{d,j})randn(\cdot). \quad (30)$$

If the dark current noise and read noise were found empirically, then the standard deviation values must be divided by the sensor gain as an added step. The data are discretized into bins depending on the quantum step equivalent value. If the charge accumulation is greater than $N_{well}$, the simulated digital value is clamped to the maximum value permitted by the A/D to simulate saturation. The images are quantized into their respective images. The exposures 4520, 4540, 4560 and 4580 described subsequently in FIG. 45 were created using four Vision Research Phantom 711 cameras with a four-stop spacing utilizing neutral density filters and a lens with an f-stop (f/#) of 5.7. The Phantom 711 cameras have a 12-bit A/D, 23,300 e⁻ deep well capacity, and nearly linear quantum efficiency of 0.32 per the manufacture's data sheets. The measured read noise variance was 28 ADU and the measured dark current noise variance was 11 ADU.

In forming the HDR image from the generated frames the methodology and nomenclature utilized by Debevec is maintained. The reciprocity equation Z can be defined as:

$$Z_{ij} = f(\Phi_i \Delta_j A_{phy,j} g_j), \quad (31)$$

where $f$ is a function that relates the digital values Z to the radiant exitance, exposure time, and attenuation factors. Using the same principles as Debevec, the function $f$ can be assumed to be monotonic and invertible, thus the camera response function can be defined as:

$$f^{-1}(Z_{ij}) = \Phi_i \Delta t_j A_{phy,j} g_j, \quad (32)$$

where $f^{-1}(Z_{ij})$ for a linearly mapped camera can be defined as:

$$f^{-1}(Z_{ij}) = \frac{hcN_{well,j}}{q_s A_j \eta \lambda_i}. \quad (33)$$

For a non-linear camera response function, which is common in consumer level cameras, the camera response function can be found utilizing methods such as the ones introduced by Debevec or Mitsunaga. The final radiant exitance estimate $\Phi_{HDR,i}$ from the series of acquired Wyckoff layers can be defined as:

$$\Phi_{HDR,i} = \sum_{j=1}^{cams} w_{ij} \frac{f^{-1}(Z_{ij})}{\Delta t_j A_{phy,j} g_j} \left(\sum_{j=1}^{cams} w_{ij}\right)^{-1}. \quad (34)$$

A sample result from the formation expressed in eqn. (34) generated from the discretized images seen in FIG. 47 can be seen in FIG. 48 that demonstrates $\Phi_{HDR,i}$. FIG. 49 shows the percent error with respect to the actual synthetically created radiant exitance field.

Comparison of the weighting methods can be described next. Each weighting method previously introduced was utilized in the formation of an HDR image from a synthetically created scene. Prior authors assumed either a change in exposure time or a change in sensor gain in order to generate the various images. The idealized video system uses varying optical attenuation; therefore, the weighting functions were slightly modified to accommodate this change. In order to account for the change in acquisition methods, for all weighting functions included in Table II (in FIG. 4) that are a function of the exposure time, the quantity $\Delta t_j$ was replaced with $\Delta t_j A_{phy,j}$. If the change is not made, then the weighting function will remain the same for each attenuation level. The exposure time was held constant for all cases at 15 µs, chosen as a realistic exposure time used in high speed videography. The architecture of the high speed camera system utilizes four high speed cameras each with their own lens. Each camera would be placed with the appropriate optics train such that they are all equidistant to the source being viewed so there is no parallax or spatial misalignment. A constant aperture setting at 5.7 is assumed for each camera lens. The ƒ/# can be modified to enact the attenuation. However to negate the effect of a varying depth of field in a physical system, the ƒ/# should be held constant if possible. The attenuation required for the development of the Wyckoff layers will be produced from the use of neutral density filters and attenuation from beam-splitters such as the system proposed by Tocci. Several scenarios were tested ranging from an attenuation equivalent of two, four, six, and eight stops where one stop is defined as $(\frac{1}{2})^s$ times the incident energy, where s is the number of stops. In all test cases the saturation value was given a weighting function of zero. In order to compare the different weighting sets the mean error was found for each bin of identical mean radiant exitance levels. The mean error ME is the standard deviation for each radiant exitance level, as the error sources have a zero bias. Any dark current offset would be assumed to be subtracted out before the recombination takes place in an actual system. The mean error is found by taking the square root of the mean square error, defined as:

$$ME = \sqrt{\frac{1}{n}\sum_{i=1}^{n}(\Phi_{HDR,i} - \Phi_i)^2}. \quad (35)$$

where n is the number of points in each vertical strip. The mean error for each weighting function for each camera configuration can be seen in FIG. 50.

Discussion of Results:

Twelve different weighting functions were utilized in the recreation of the mean radiant exitance field. Each HDR image was segmented into bins containing the same mean radiant exitance field. The mean error was calculated from each of the bins to measure the mean error on formation at each radiant exitance level for each weighting method. Although there is no single weighting function that performs the best for each simulation throughout the entire radiance range, a few observations can be made. The weighting methods that introduced the least amount of error were proportional to the error inherent in the acquisition of the imaging system and not a function of the acquired pixel value. In the low radiant exitance range, the images or frames with the greatest amount of attenuation severely degrade the estimate on the final image formation. When the weighting function is only proportional to the digital value from the camera or the slope of the camera response function, such as in Ward, Robertson, Mitsunaga, and Debevec, the magnification of error becomes more significant as the attenuation level increases and the error becomes orders of magnitude greater in the lower exitance ranges.

The simplified weighting function proposed was shown to reduce the error in the overall image formation without the need of a recursively adjusting system, only requiring simple knowledge of the camera settings. All of the weighting functions that were proportional to the image acquisition system's error performed similarly. When the camera attenuation levels are made equal, the varying weighting functions perform in a nearly identical way, seen in FIG. 51. The equal attenuation level performs as expected since the error on formation when averaging several samples with equal variance will be reduced by $n^{-1/2}$ where n is the number of samples. The difference in weighting functions becomes more apparent as the attenuation increases from image to image and changes the variance associated with each estimate.

Multiple weighting methods were compared utilizing synthetically created images that simulate the output from a series of Vision Research Phantom 711 high speed video cameras. The images were created from a simplified camera model with additive noise. The noise parameters that were included consist of shot noise, read noise, dark current noise, and quantization error. No fixed pattern noise is assumed in the synthetic camera, and reset noise is mitigated in the electronics at the sensor level. The shot noise and signal level were assumed to be from a monochrome source at logarithmically varying predefined radiant exitance levels that would span the total range of the designed acquisition system. The mean error was calculated and compared utilizing a variety of different weighting functions and different attenuation level spacings. The most effective weighting methods were found to be proportional to the error introduced in the acquisition of the system. Shot noise, while clearly a source of noise in the system, was found unnecessary to include in the weighting function to achieve a low noise HDR video frame or image.

At the $24^{th}$ SIGGRAPH '97 Conference on Computer Graphics, P. E. Debevec and J. Malik provided the framework for "Recovering high dynamic range radiance maps from photographs", *ACM Trans.*, 369-378 (1997). Debevec constitutes a method where several images are taken with a point-and-shoot camera separated by one or two stops of integration time, sensor exposure, with a single stop being double speed or $2^1$ (also written $2^1=2$), and a double-stop being quadruple speed or $2^2$ (or $2^2=4$). The varying exposures are formed by modifying the exposure time, which is the time that the shutter is open and collecting photons. The series of images are then formed into a high dynamic range (HDR) image by using a weighted averaging method.

The HDR image constitutes a mathematical matrix linearly representing the relative brightness between first and second pixel regions. For a color camera, this is performed for a given acquired color channel, commonly called the radiance map. This term is distinguishable from radiance in the radiometric usage, because the wavelength is weighted and non-dimensional. The radiance map can then be compressed with a preserving method that employs tone, hue or contrast to rescale the full scene radiance information into a low dynamic range image for display. This compression is commonly referred to as tone-mapping and operates satisfactorily for static scenes.

Figure 2:
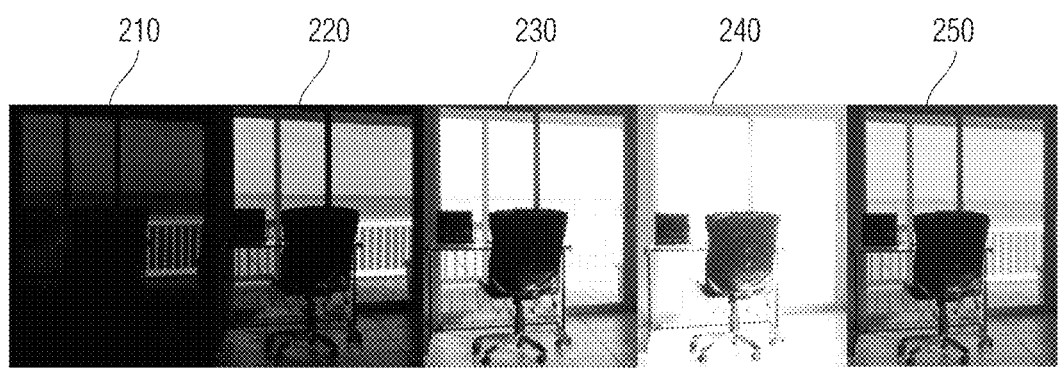
FIG. 2 is a series of image views of a background window with a chair.

An example such static scene can be described. FIG. 2 shows a series 200 of four different exposures 210, 220, 230 and 240 of an HDR scene featuring a background window with a foreground chair. The exposures are reformed into a tone-mapped image, evident in preserving external detail outside of the window and texture of the back of the chair. Both background and texture details cannot be conventionally captured in any single image. The series 200 includes severe underexposure 210, nominal underexposure 220, nominal exposure 230, overexposure 240 and exemplary balanced exposure 250. Severe underexposure view 210 enables visibility only to reflective portions of the outside railing. Underexposure view 220 enables background in the window to be visible. Nominal exposure view 230 reveals details of the chair while washing out the background in the window. Overexposure view 240 shows some chair details not available in the nominal exposure 230. Balanced exposure 250 enables details from both the background window and the fore-ground chair to be viewable. The balanced exposure reduces the effect of high and low levels of light that expose and illuminate the camera to produce the photographs.

For video purposes, three primary ways are available for capturing an HDR scene. These include:

(1) capture images by an array of cameras, all at a constant frame rate but at different exposure times, then post-process the ghosted images out;

(2) develop an HDR sensor using alternating per pixel gains or neutral density (ND) filters in line with a Bayer filter; and (3) initiate a burst of images from a single camera at different exposure times where the sum of the burst of all the images is less than the desired playback rate.

The first process requires heavy post-processing methods that remove objects in motion, thereby negating the purpose of a video feed, assuming that the video is designed to show objects in motion. The second process is potentially very expensive and not commercially available or otherwise a commercial off-the-shelf (COTS) option. Further the second option reduces spatial resolution, and is complicated. The third process severely limits the dynamic range that can be captured, because all the exposures must be taken in less time than the desired playback rate. This third process thus renders high-speed high dynamic range videos ineffective, due to insufficient light and reduction of the buffer size in the cameras to being proportional to the burst for a significantly slower frame rate. These concerns are addressed by M. D. Tocci et al., "A Versatile HDR Video Production System", *ACM Trans.*, by using COTS imagers and Fresnel beam-splitters to produce a camera capable of recording up to a demonstrated 17-stops of dynamic range by maintaining a constant exposure time while enabling the beam-splitter to reflect on a small fraction of the incident light to two imagers. An algorithm would search for oversaturated pixels and replace their value with the darker images based on the ratio of the reflected light onto the other imagers to produce the HDR image.

Contrast Optical Design and Engineering (CODE) in Albuquerque, N. Mex. produces the AMP camera, the first commercially available HDR video camera. There are a few manufacturers that have HDR camera capability, such as SpheronVR, typically employing the second method. The AMP camera has some shortcomings, such as inability for acquisition of high-speed events. The camera works by using COTS imagers then three separate image capture boards on a personal computer (PC). CODE has projected future versions with onboard FPGA processing capabilities; however the frame rate is severely limited due to this architecture. There is also no pre-established version that would enable recreation of this system without purchasing the item directly.

The objective of the disclosure is to describe a methodology in which COTS parts can be used to capture full scene radiance information and form a viewable video from the data. A typical camera has a 60 dB dynamic range, about 10-stops, and scales the recorded information using a gamma of 2.2 for personal computer (PC) displays or 1.8 on Apple displays. The proposed system has been demonstrated to capture a scene in excess of 160 dB or 27-stops dynamic range, limited only by the COTS parts that were readily available, and then displayed on a screen.

Figure 3A:
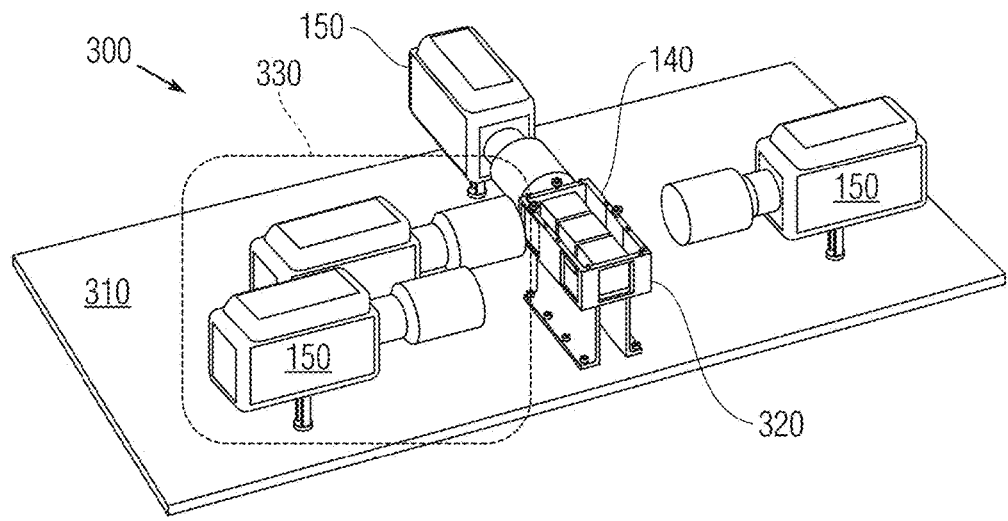
FIG. 3A is an isometric view of the cascade imaging system.
Figure 3D:
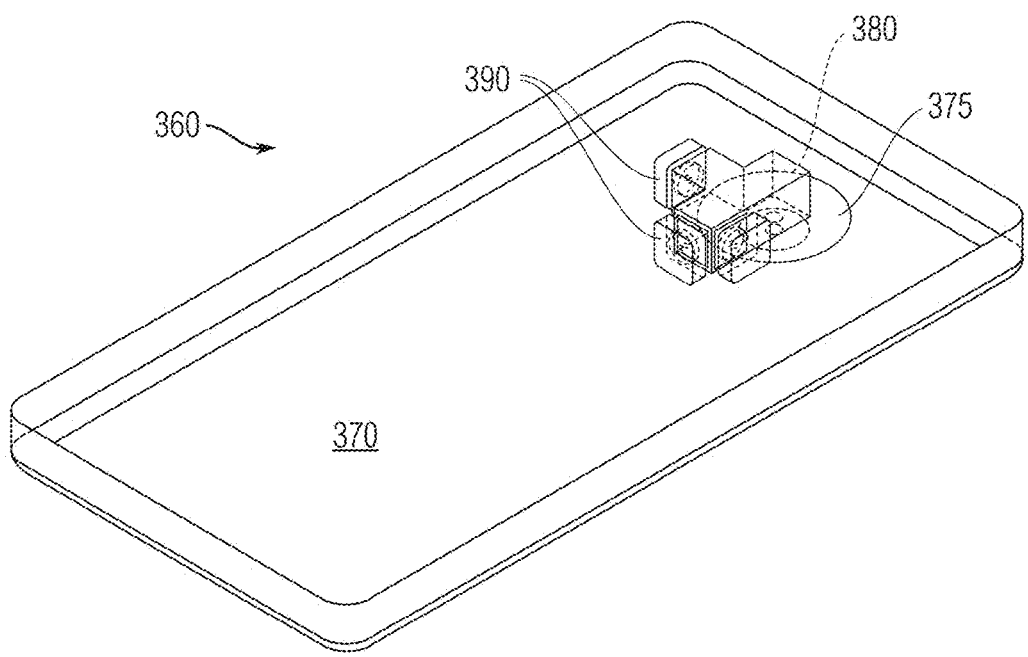
FIG. 3D is an isometric view of the exemplary embodiment scaled to fit inside the width of a modern smart phone using conventionally available COTS.
Figure 3B:
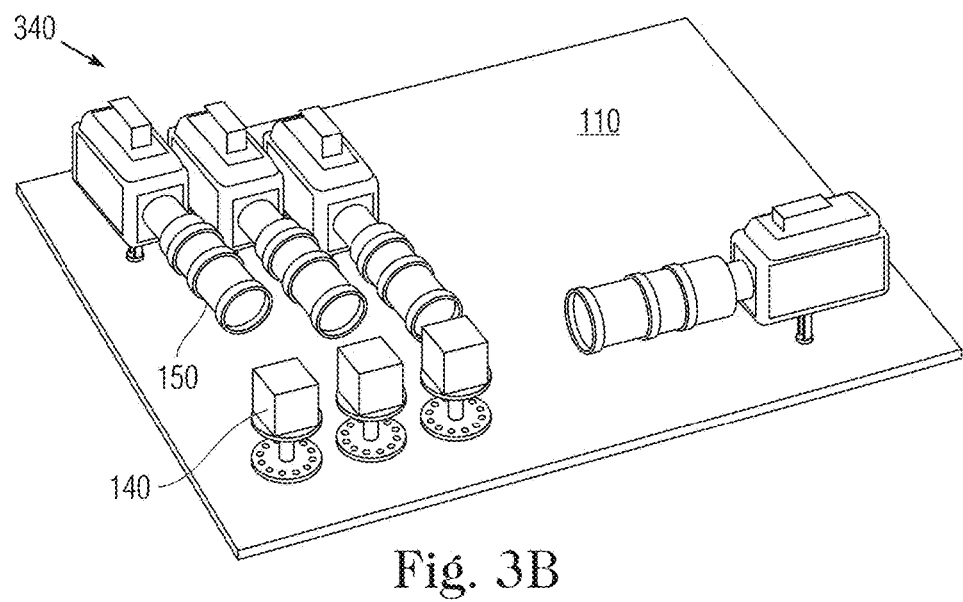
FIGS. 3B and 3C are perspective views of the cascade imaging system.
Figure 3C:
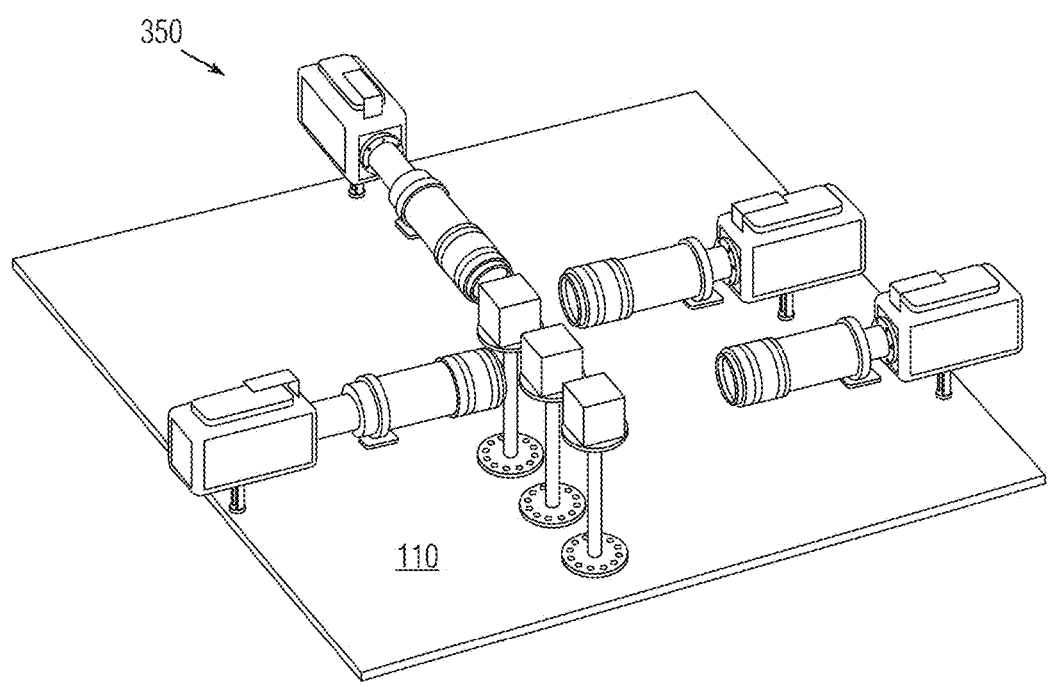

The exemplary embodiments model the optical path to enable the integration time to be held constant. To explain this, the physical setup can be described. FIG. 3A shows an isometric view 300 of the cascade imaging system. A platform 310 provides a mounting surface for a housing 320 for beam-splitters 140 and an arrangement 330 of cameras 150. The physical setup includes COTS cameras, lenses, filters and beam-splitters. Perspective views 340 and 350 of two setups can respectively be seen in FIGS. 3B and 3C. In particular, view 340 reveals Vision Research Phantom 7.1 cameras fit with 400 mm lenses and 45/45 non polarizing cube beam-splitters. Also, view 350 features four Vision Research Phantom 641 cameras with three 45/45 non-polarizing beam-splitters, 400 mm Cannon lens and neutral density filters. FIG. 3D shows an isometric view 360 of a typical smart phone body. A platform 370 provides a an enclosure 375 that is the houses the optical train 380 encompassing two beam-splits and one 45° mirror and imagers 390 at the distal ends and entrance lens 395 to enable the camera to focus the light on the imagers.

FIG. 4 shows three tables 400 for reference. The first listing 410 is a nomenclature Table I of parameters identified in the disclosure. The quantities are segregated into three columns: symbol, parameter name and value/or associated units. The second listing 420 is a weighting function Table II with two columns for author and function. The third listing 430 is a range Table III with three columns for parameter term, range and units. The weighting functions w(Z) depending on digital value Z of listing 420 in Table II include the following with nomenclatures changed from their sources for consistency herein:

$$w(Z) = \frac{1}{f'(\log(Z))}, \quad (36)$$

from Mann and Picard, where $f'$ represents the differential of the camera response function $f^{-1}$ with respect to the digital value $Z$;

$$w(Z) = \begin{cases} Z - Z_{min} & \text{for } Z \leq \frac{Z_{min} + Z_{max}}{2} \\ Z_{max} - Z & \text{for } Z \geq \frac{Z_{min} + Z_{max}}{2} \end{cases}, \quad (37)$$

from Debevec and Malik;

$$w(Z) = \exp\left[-16\left(\frac{Z^2}{q_s^2} + \frac{1}{q_s} + \frac{1}{4}\right)\right], \quad (38)$$

from Robertson et al., where $q_s$ is number of quantization steps;

$$w(Z) = \frac{f^{-1}(Z)}{f'(Z)}, \quad (39)$$

from Mitsunaga and Nayar;

$$w(Z) = \frac{\Delta t}{\sqrt{g\Phi\sigma_s^2 + \sigma_{dc}^2 + f'(Z)^2\sigma_q^2}}, \quad (40)$$

from Tsin et al., where $\Delta t$ is exposure time, g is sensor gain, $\Phi$ is radiant exitance;
$\sigma_s$ is shot noise, $\sigma_{dc}$ is dark current noise and $\sigma_q$ is quantization noise;

$$w(Z) = f^{-1}(Z)f'(Z)\left[1 - \left(\frac{2Z}{q_s} - 1\right)^{12}\right]. \quad (41)$$

from Ward et al.;

$$w(Z) = \frac{\Delta t^2}{f'(Z)^2(\sigma_r - \sigma_q)^2}, \quad (42)$$

from Kirk and Anderson where $\sigma_r$ is read noise;

$$w(Z) = f^{-1}(Z)f'(Z)\left[1 - \left(\frac{2\Phi}{q_s} - 1\right)^{12}\right], \quad (43)$$

from Akyüz and Reinhold;

$$w(Z) = \frac{\Delta t^2}{\Phi\Delta t + \sigma_r^2 + g_j^2\sigma_q^2}, \quad (44)$$

from Hasinoff et al., where $g_j$ is gain at index j; and $$w(Z) = \frac{\Delta t_j^2 g^2 a_i^2}{g^2\Delta t_j(a_i\Phi_i + 2\bar{\mu}_D) + 2\sigma_r^2 + \sigma_{dc}^2 + f'(Z)^2\sigma_q^2}, \quad (45)$$

from Granados et al., where $a_i$ is the active sensor area, and $\mu_D$ is average measured dark current noise.

Exemplary embodiments provide a revised form of Debevec's original equation as:

$$D_{xy} = E_{lens,i}\left(\frac{\pi}{4f(f/\#)^2}\right)\left(\frac{N}{N_0}\right)^2 10^{g/20 - A_{nd}} A_{phy}\Delta t, \quad (46)$$

where $E_{lens,i}$ is irradiance for each lens i, $f/\#$ is the aperture setting, N is the focal length $N_0$ is the calibration setups focal length, g is the sensor gain, $A_{nd}$ is the neutral density filter number, a is the percentage of the reflected light from the beam-splitter and $\Delta t$ is the integration time.

An alternative formulation from Debevec's publication includes a separate modification to his fundamental equation:

$$D_{xy} = E_{film}\Delta t, \quad (47)$$

where $D_{xy}$ is exposure, $E_{film}$ is sensor irradiance, and $\Delta t$ is integration time. This relation operates adequately for still images, but causes problems with videos. There are two ways that a video can be taken that utilize eqn. (47). The first would be to acquire multiple sequential frames within the time period that a single frame would be desired. For standard film this means the sum of the three or more exposure would have to happen in less than 1/30 of a second. While exposure superposition is not impossible to accomplish, this task imposes a severe restriction on expansion into high-speed video. For this, video recorded at 10,000 feet-per-second (fps) must run three or more times faster, which would significantly reduce the image size, quality and available light to the sensor. The second method operates multiple cameras all set with a different integration time. This second method again causes problems for high-speed photography as the objects in motion can go through the field of view very fast relative to the frame rate, producing motion blur in some of the exposures but not others that produce artifacts.

This revised eqn. (46) can be rearranged following Debevec's methods to solve for the lens irradiance by applying the natural logarithm and isolating the irradiance term:

$$\ln(E_{lens,i}) = \ln(D_{xy}) - \ln\left[\frac{\pi}{4(f/\#)^2}\left(\frac{N}{N_o}\right)^2 10^{g/20 - A_{nd}} A_{phy}\Delta t\right], \quad (48)$$

based on eqn. (46). From eqn. (48) the equivalent exposure constant, the subtracted bracketed portion, can be modified by altering any of the aperture, the neutral density filter, the gain and the beam-splitter values. Thus eqn. (48) represents the enabling equation to enable simultaneous acquisition of multiple cameras with a constant integration time. This addresses the problems previously stated for using Debevec's formulation for images.

This exemplary process has been described to solve for the scene radiance, because the exposure compensated for the adjustable factors should be equal to the lens irradiance, a process can be developed to display the image. The medical literature is consulted to model how the human eye scales the scene radiance. The acquisition method for the human vision system must be modeled to capture a human's ability to adapt to changes in varying lighting conditions. The first step involves modeling the pupil and its reaction to light. After light passes through the cornea and aqueous humor, light enters into the visual system through the pupil. The pupil responds to light by contracting and dilating. The diameter of the pupil can change from 2 mm to 8 mm on average. This can account for a change in the light intensity by about a factor of sixteen. Several references in the technical literature purposed relations for the luminance and pupil diameter, as further discussed herein. These pupil response references include:

L. L. Holladay, "The Fundamentals of Glare and Visibility", *J. of the Optical Society of America (JOSA)* 12 (4) 271-319 (1926);

B. H. Crawford, "The Dependence of Pupil Size upon External Light Stimulus under Static and Variable Conditions", *Proceedings of the Royal Society of London* 121 (823) 376-395 (1936);

P. Moon et al., "On the Stiles-Crawford Effect", *JOSA* 34 (6) 319-329 (1944); and S. G. de Groot et al., "Pupil Size as Determined by Adaptive Luminance", *JOSA* 42(7) 492-495 (1952).

Figure 5:
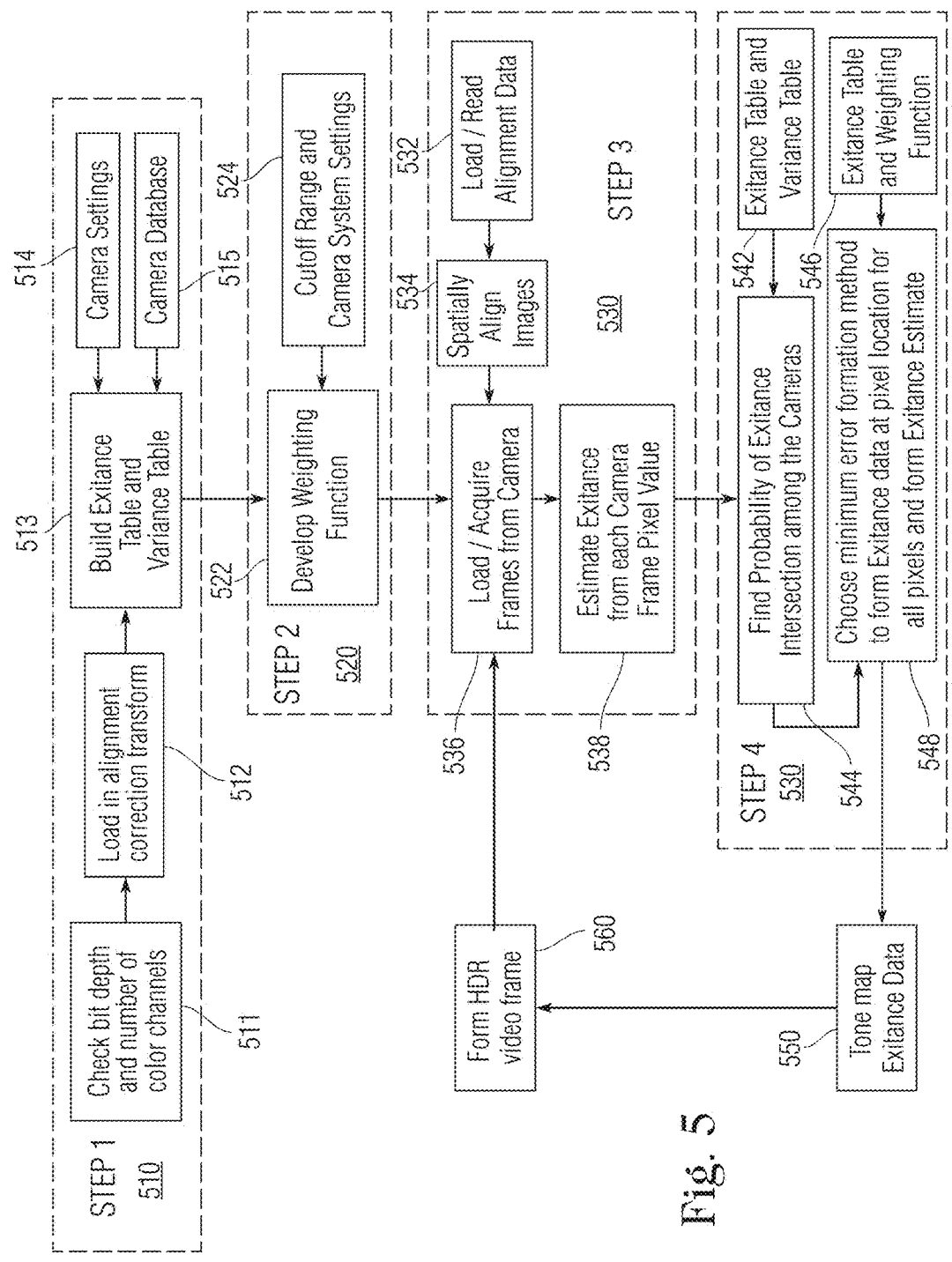
FIG. 5 is a flowchart view of an exemplary process diagram.

Process Procedure:

FIG. 5 shows a flowchart view 500 of an exemplary process operation for creation of the HDR video divided into four steps for obtaining and using tabular information for Exitance and Variance, both as power flux in watts-per-square-meter (W/m²). In Step 1 as 510, camera parameters are loaded into memory: parameters such as alignment information, attenuation settings, image response function, estimate Exitance for a given pixel value and associated variance. A first operation 511 specifies bit depth and the number of color channels. A second operation 512 loads an alignment correction transform. A third operation 513 builds Exitance and Variance tables based on camera settings 514 and the camera database 515.

In Step 2 as 520, the exemplary weighting function (or alternatively a simplified weighting function) is calculated based on the camera parameters. A fourth operation 522 develops a weighting function based on cutoff range 524 to mitigate flares and the tabular information for Exitance and Variance. In Step 3 as 530, the imagers information is aligned and the exitance estimate is found using tabular information from the third operation 513. A fifth operation 532 loads or acquires alignment data from each imager. Subsequently, the data are spatially aligned using the second operation 512. A sixth operation 534 spatially aligns the images. A seventh operation 536 loads and acquires the camera frames after alignment. An eighth operation 538 estimates exitance from each pixel value in the camera frame based on the tabular information. In Step 4 as 540, the data are acquired from the cameras in operation, and an estimate for radiant exitance is found for each of the individual cameras and their pixels. Based on the Exitance and Variance Tables 542 from the third operation 513, a ninth operation 544 finds probability of exitance intersection among the cameras. Based on the Exitance Table and Weighting Function 546, a tenth operation 548 selects minimum error formation method to provide exitance data at a pixel location for all pixels to form an exitance estimate. These results provide a Tone-map and Exitance data 550, which forms the HDR video frame 560 that feeds into the seventh operation 536.

The third operation 513 incorporates several relations. The first of these is world shot noise $\sigma_{sw}$ defined as:

$$\sigma_{sw,ij} = \sqrt{\frac{hc}{\Delta t_j A \lambda} \Phi_i} \,. \tag{49}$$

The second is quantization error, defined from eqn. (15) as:

$$\sigma_{q,j} = \frac{\Phi_{max,j}}{q_s \sqrt{12}}. \tag{50}$$

The third is combined read and dark current noise from eqn. (17) and rearranged:

$$\sigma_{ADU} = \frac{N_{well} hc}{g \Delta t A_{phy} \eta \lambda A q_s} \sqrt{\mu_{rd}^2 + \mu_{dc}^2} \,. \tag{51}$$

The total variance in the system can be defined as:

$$\sigma_T^2 = \sigma_{ADU}^2 + \sigma_q^2 + \sigma_{sw}^2. \tag{52}$$

The exitance Φ from a given digital value Z can be estimated by:

$$\Phi = \frac{Z N_{well} hc}{q_s A \Delta t A_{phy} \eta \lambda g}, \tag{53}$$

where $N_{well}$ sensor area, is the deep well capacity, q, is the number of quantization steps, A is the active sensor area, Δt is the exposure time, j is the quantum efficiency, g is the sensor gain, and camera system attenuation $A_{phy}$ can be defined as:

$$A_{phy,j} = \begin{cases} \dfrac{\pi}{4(f/\#_j)^2 \left(\frac{s_2}{s_1} - 1\right)^2} 10^{-ND,j} R_j \prod_{j=1}^{J-1} T_{j-1} & j < J \\ \dfrac{\pi}{4(f/\#_j)^2 \left(\frac{s_2}{s_1} - 1\right)^2} 10^{-ND,j} \prod_{j=1}^{J-1} T_{j-1} & j = J \end{cases}, \tag{54}$$

where f/# is the aperture (f-stop) number, s is the distance from the aperture, $s_2$ is the focal length, ND is the optical attenuation from a neutral density filter, R, is the reflectance value from the $j^{th}$ beam-splitter, and $T_{j-1}$ is the transmittance value of the $(j-1)^{th}$ beam-splitter, with T equaling unity always.

An alternative set of formulations for third operation 513 includes a shot noise estimate:

$$\sigma_s = \sqrt{E_n}, \tag{55}$$

where $E_n$ is noise energy, and quantization error is:

$$\sigma_{qa} = \frac{\max(E_n)^2 4^{bd}}{12}, \tag{56}$$

where bd superscript is data wordlength, and irradiance integral analogous to eqn. (6) is:

$$\int F(\lambda) d\lambda = \frac{Z_{ij} V_{max,j} hc}{A_{lens,i} g_i S_i \Delta t_i A_i 2^{bd}}, \tag{57}$$

where F(λ) is a spectral irradiance function of wavelength, $V_{max}$ is analog to digital converter voltage range, S is charge accumulation, and A is pixel area.

Figure 6:
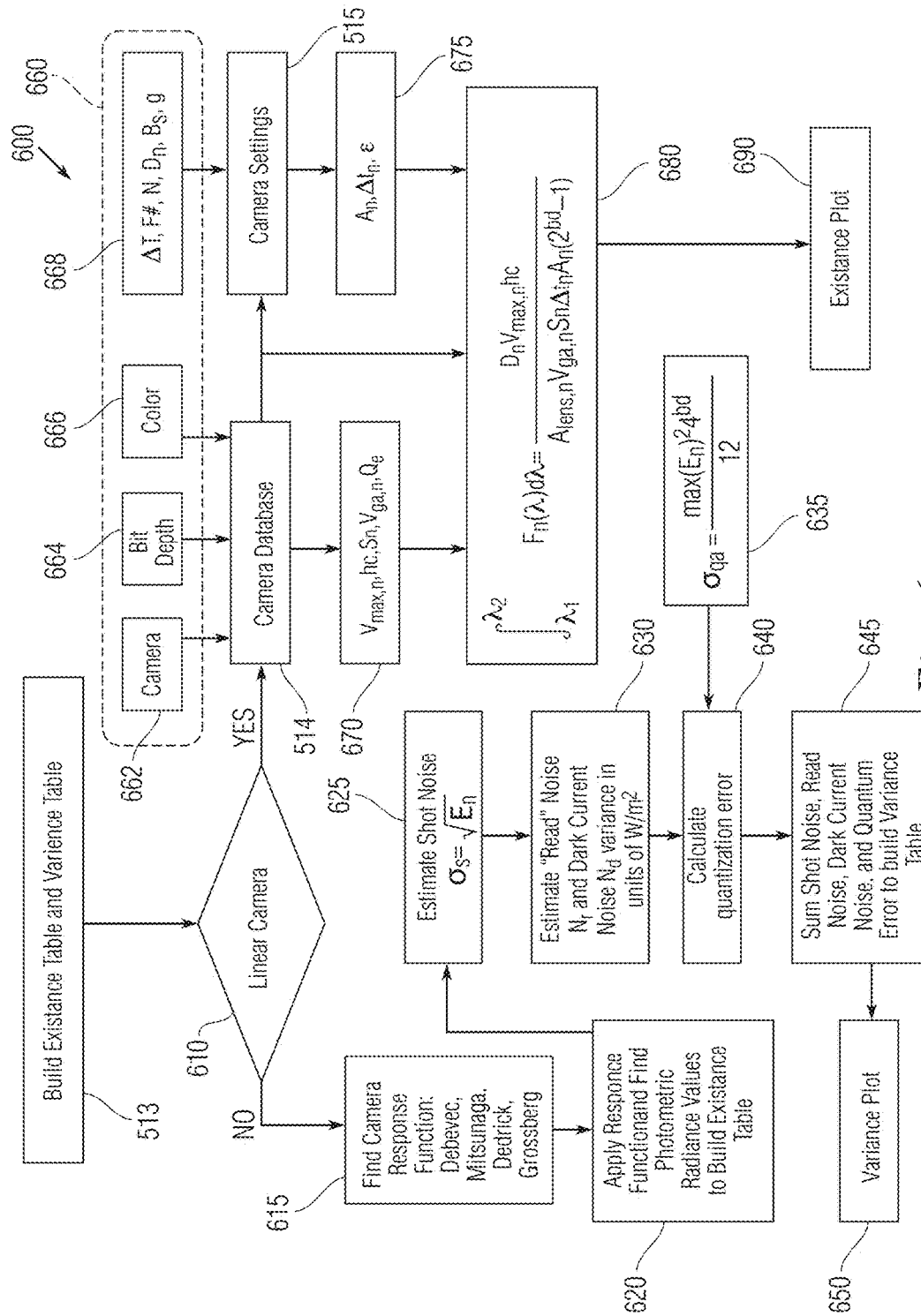
FIG. 6 is a flowchart view of a process diagram for exitance and variance.

FIG. 6 shows a flowchart view 600 of a first detail process for the third operation 513 from Step 1. A decision query 610 as to whether the camera is linear yields two responses. If not, the process finds a camera response function 615, which the process applies 620 to determine photometric radiance values. The response functions include relations from Debvec, Mitsunaga, Dedrick and Grossberg. The process proceeds to estimate shot noise 625 based on eqn. (55). The process continues to estimate "read" noise and dark current noise variance 630. A quantization error relation 635 from eqn. (56) and the estimate operation 630 are used to calculate quantization error 640. A summation 645 of noise contribution from shot, read, dark current and quantum error are used to produce a Variance plot 650. If the camera has a linear relation from the decision query 610, the process uses camera information 660, including camera number 662, bit depth 664, color 666 and parameter setting values 668, proceeding to the camera database 514 using number 662, depth 664 and color 666 values to provide camera parameters 670. The values 668 are incorporated into the camera settings 615 to provide setting values 675. Values from the database 514, settings 515, camera parameters 670 and setting values 675 produce a wavelength based integral function 680 expressed as eqn. (57) to yields an exitance plot 690.

Figure 7:
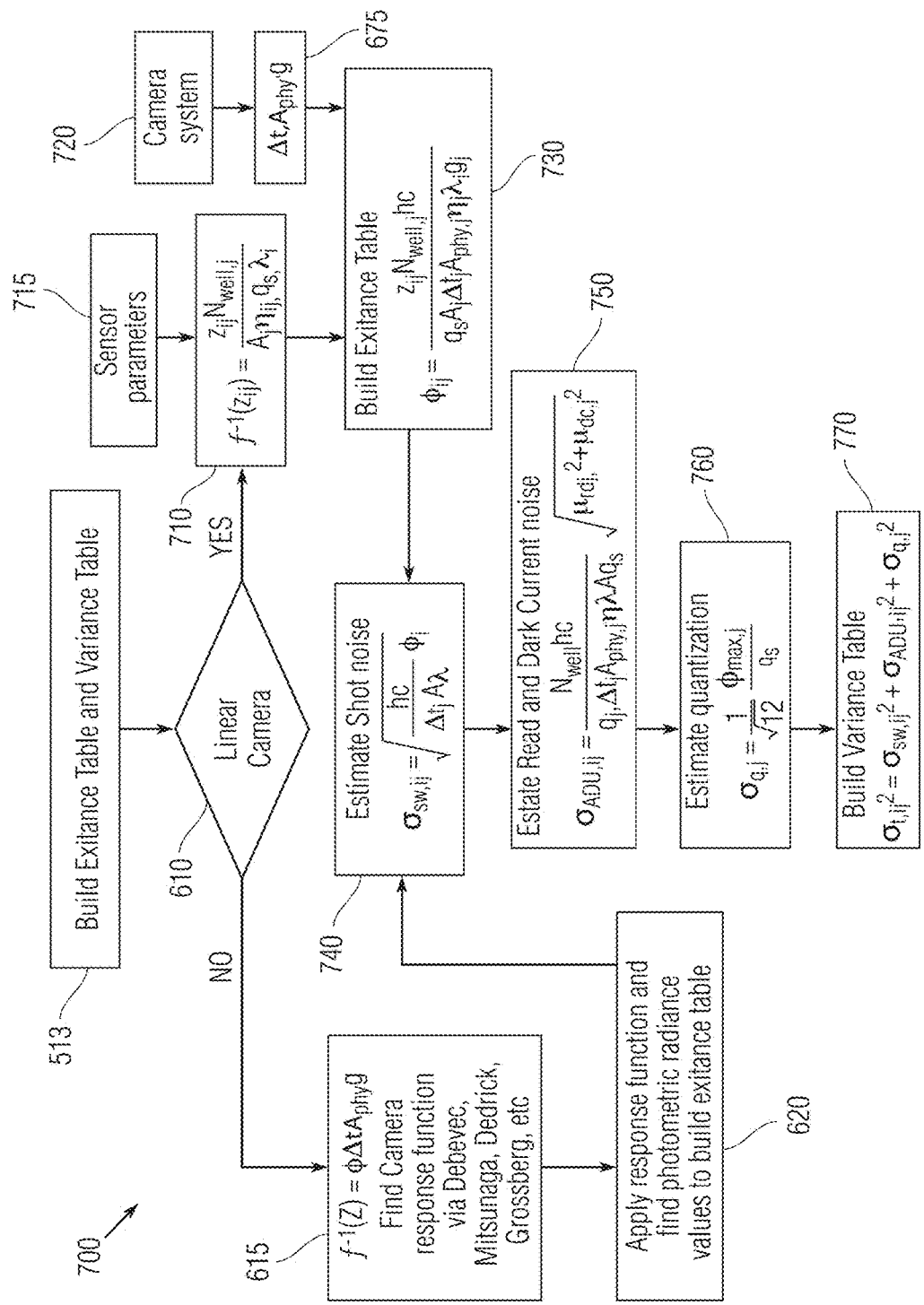
FIG. 7 is a flowchart view of a supplemental process diagram.

FIG. 7 shows a flowchart view 700 of a second detail process for the third operation 513 from Step 1 as a preferred alternative. A decision query 610 as to whether the camera is linear yields two responses. If not, the process finds a camera response function 615, which the process applies operation 620 to determine photometric radiance values. If linear, the process determines the inverse function 710 for digital values based on eqn. (33) and on sensor data 715. A camera system 720 also provides parameter information to build the Exitance Table 730 based on eqn. (53). The process proceeds to estimate world shot noise 740 based on eqn. (49). The process continues to estimate "read" noise and dark current noise variance 630, coupled with the operation 620. The process continues from the shot noise to estimating read and dark current noise 750 from eqn. (51). The process continues to estimating quantization 760 from eqn. (50). The process then builds the Variance table at operation 770 from eqn. (52).

Figure 8A:
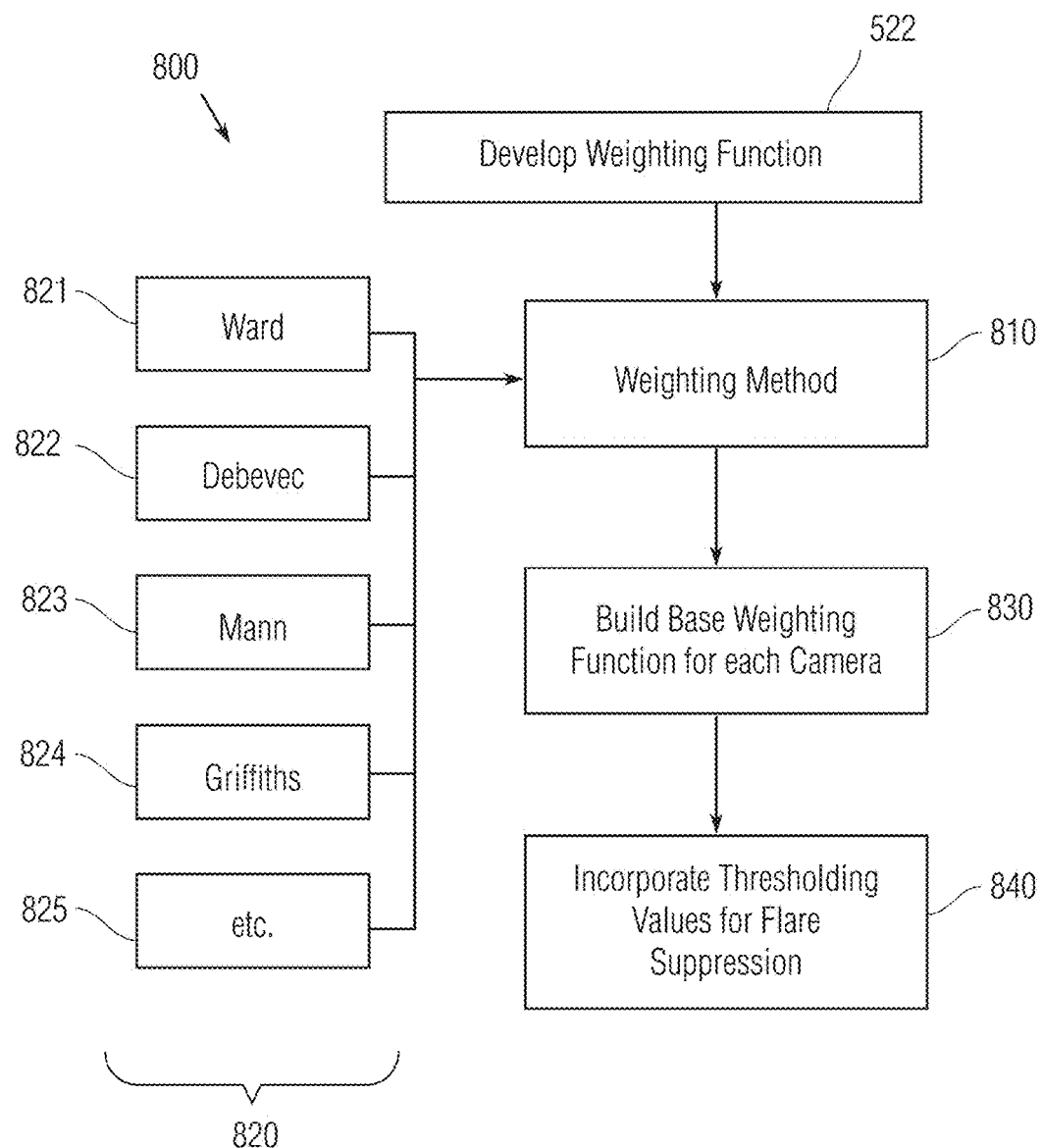
FIGS. 8A, 8B and 8C are flowchart views weighting function, for flare detection and misalignment error.
Figure 8B:
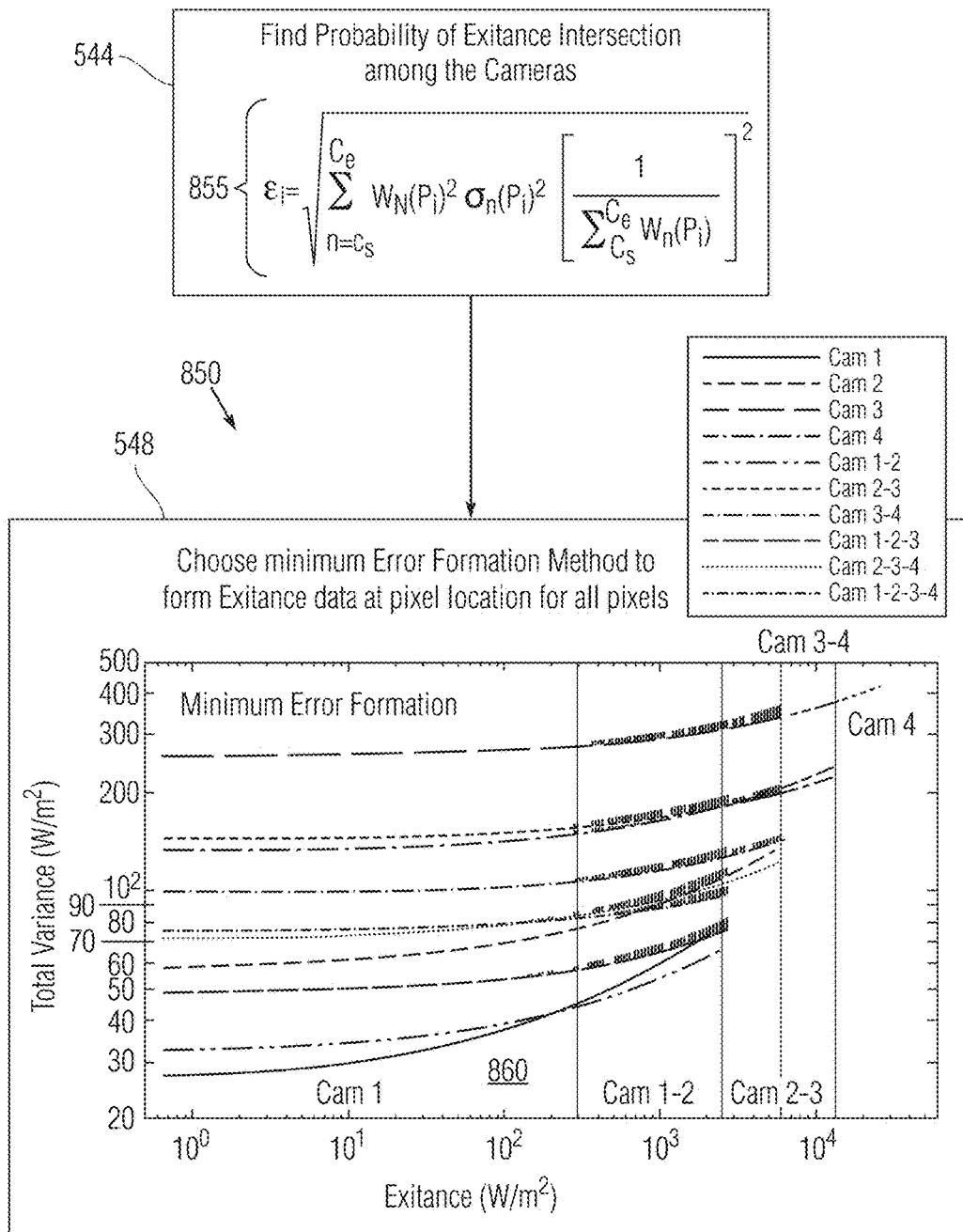
Figure 8C:
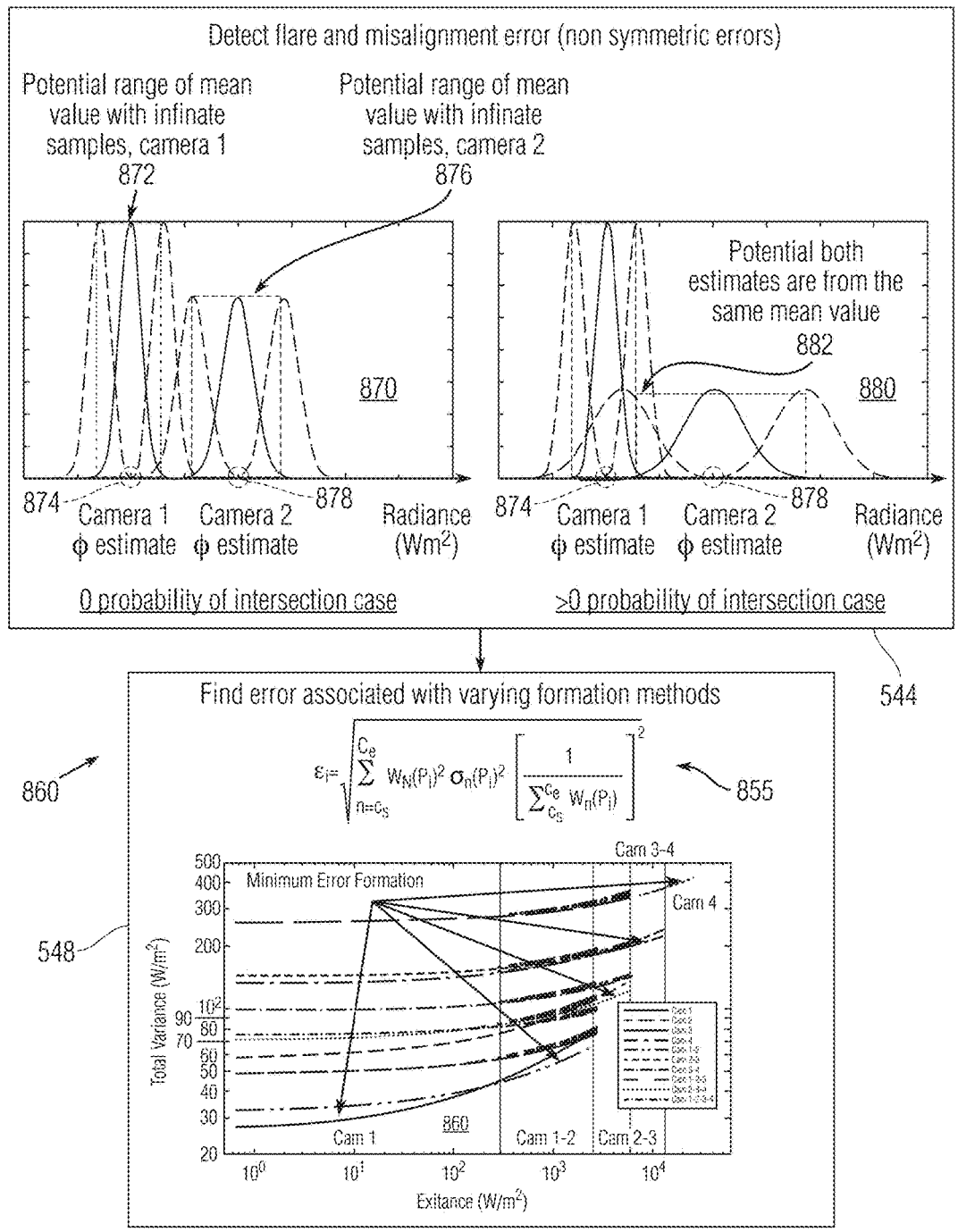

FIG. 8A shows a flowchart view 800 of a weighting operation. The process begins with the fourth operation 522 for windowing function development from Step 2. The process uses a weighting method 810 based on a selection of available algorithms 820. These weighting contributions include Ward 821, Debevec 822, Mann 823, Griffiths 824 and others 825. The weights are used to build a base weighting function 830 for each camera. The resulting functions are used to incorporate thresholding values 840 for flare suppression. FIG. 8B shows a flowchart view 850 of an error formation operation. From Step 4, the process includes the ninth operation 544 for finding intersection probability 855 and the tenth operation 548 for choosing the minimum error formation method yielding a relationship plot 860. FIG. 8C shows a graphical view 860 of intersections for detecting flare and misalignment errors for ninth operation 544 and the tenth operation 548.

Figure 9:
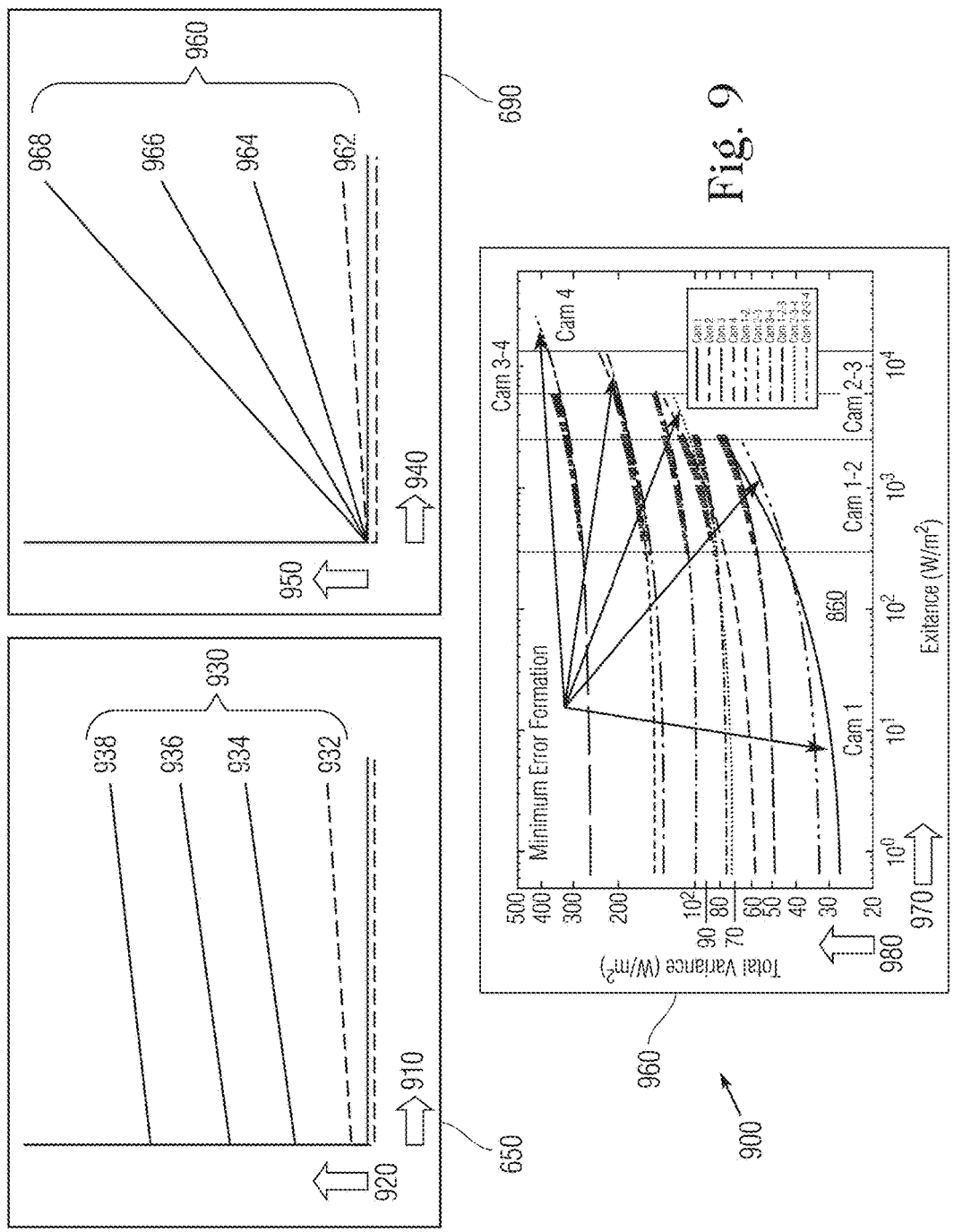
FIG. 9 is a graphical view of plots for variance, exitance and error.

FIG. 9 shows a graphical view 900 of Variance, Exitance and Error Formation plots. The Variance plot 650 includes digital value 910 for the abscissa and Variance 920 for the ordinate with values distinguished by responses for the respective cameras 930. These include Camera one as 932, Camera two as 934, Camera three as 936 and Camera four as 938 with values ascending as camera number. The Exitance plot 690 includes digital value 940 for the abscissa and exitance 950 for the ordinate with values distinguished by responses for the respective cameras 960. The digital value Z constitutes the discretization level used to indicate the charge accumulation at the sensor site. These include Camera one as 962, Camera two as 964, Camera three as 966 and Camera four as 968, with slopes increasing with camera number. The Minimum Error Formation plot 810 includes exitance 970 for the abscissa and total Variance 980 for the ordinate. The curve relations are distinguished by a legend 990. The exitance abscissa 970 is divided by threshold intervals 995 for the camera combination that yields the lowest error, resulting in Camera one, Cameras one and two, Cameras two and three, Cameras three and four, and Camera four.

Figure 10:
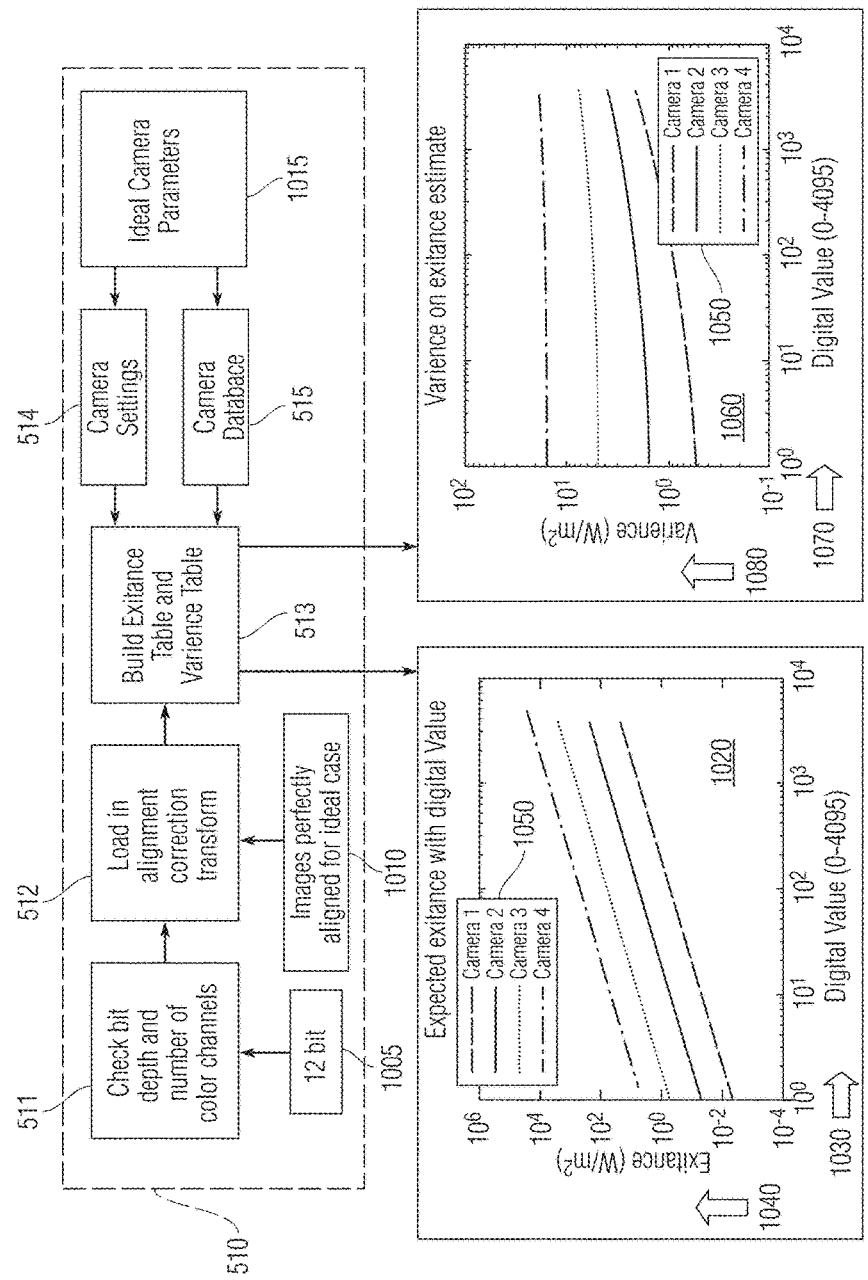
FIG. 10 is a flowchart view of a process diagram for exitance and variance.

FIG. 10 shows a flowchart view 1000 with example data necessary for the third operation 513 to construct the Exitance Table and Variance Table 542 from Step 1. The first operation 511 receives 12-bit information 1005. The second operation 512 receives an image alignment transform 1010, although in this case the sensors are aligned. Ideal camera parameters 1015 provide information for the camera settings 514 and camera database 515. The Exitance plot 1020 includes digital value 1030 for the abscissa and exitance 1040 for the ordinate. A legend 1050 identifies the relationships for each camera with values ascending as camera number. The third operation 513 produces Exitance and Variance tables 542 graphically depicted as Variance plot 1060, which includes digital value 1070 for the abscissa and variance 1080 for the ordinate. A legend 1090 the relationships for each camera with values ascending as camera number.

Figure 11:
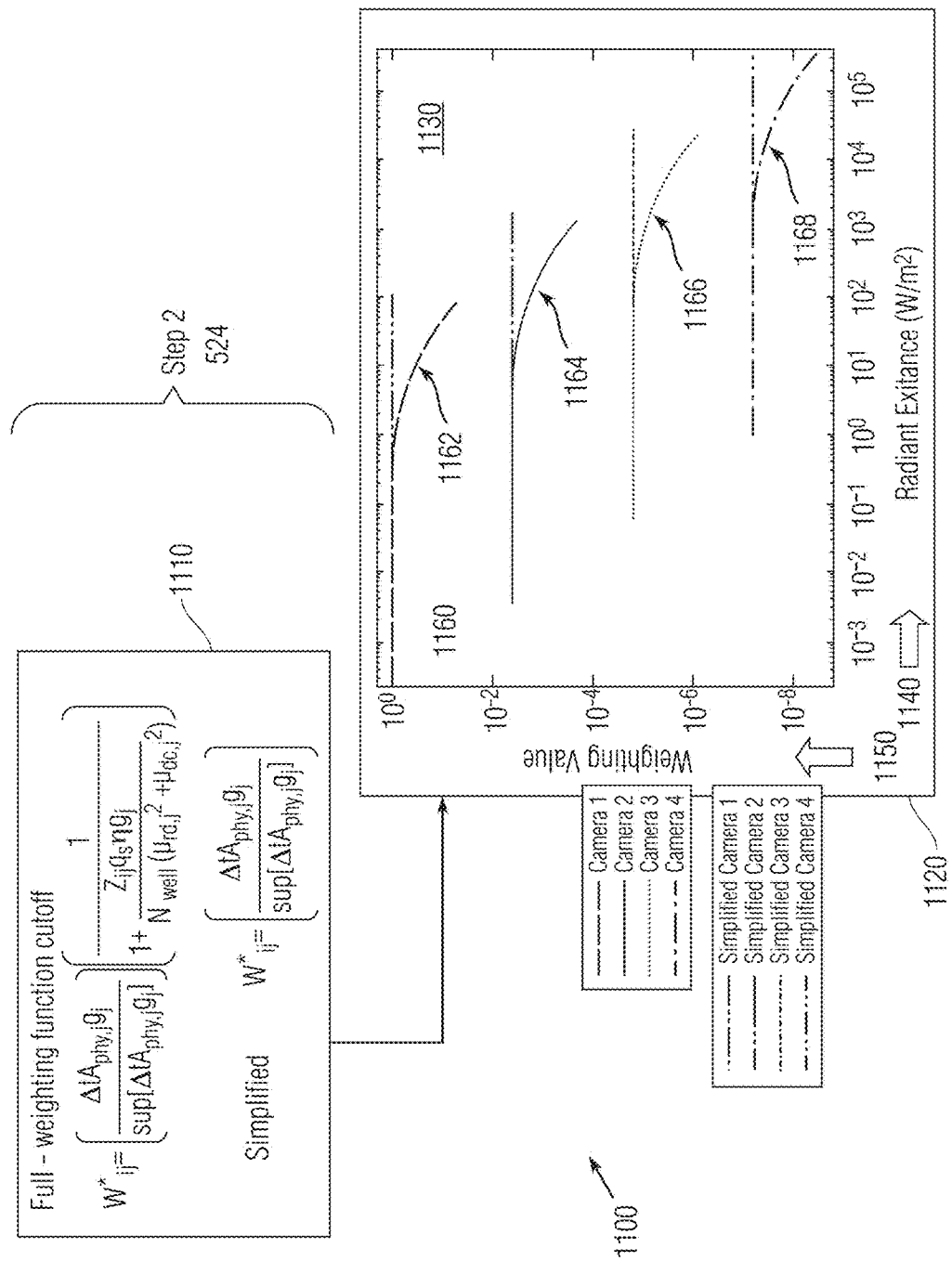
FIG. 11 is a flowchart view of a process diagram for the weighting function reducible to one equation.

FIG. 11 shows a flowchart view 1100 for the weighting function 1110 in the fourth operation from Step 2 in relation to the cutoff range 524. The cutoff is set to 97% of full-scale range using the exemplary weighting function in eqns. (25) and (27), which graphical yield an exitance relationship to weighting function 1120, as shown by a response plot 1130 in which exitance 1140 constitutes the abscissa and weighting function 1150 presents the ordinate. A legend 1160 identifies variations for each camera. These include Camera one as 1162, Camera two as 1164, Camera three as 1166 and Camera four as 1168, with weights decreasing by camera number and to a lesser degree by an increase in exitance.

Figure 12:
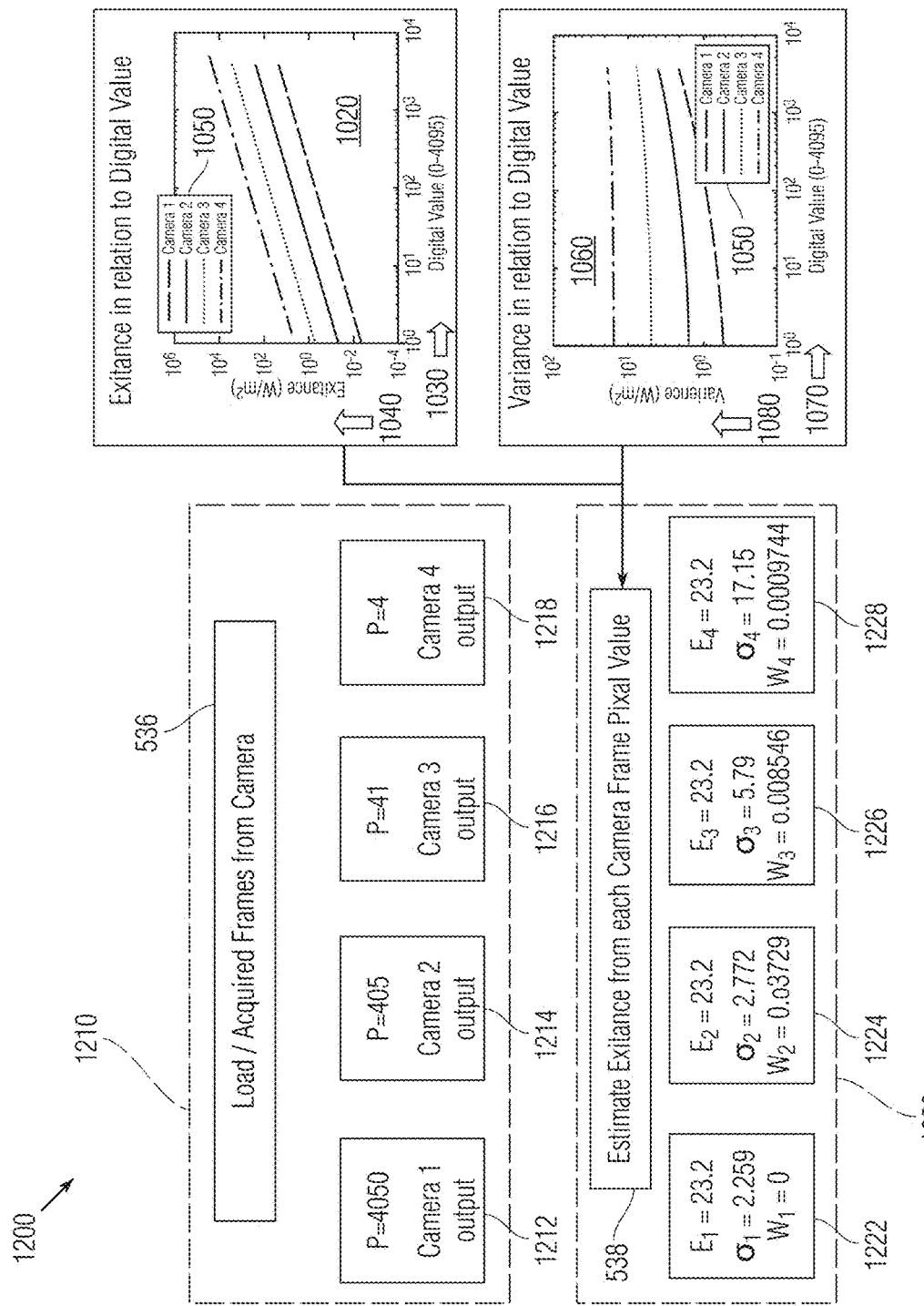
FIG. 12 is a flowchart view of a process diagram for camera output weighting.

FIG. 12 shows a flowchart view 1200 of frame acquisition from Step 3. A camera output operation 1210 receives frames from the fifth operation 532. For each camera the digital value for each spatially aligned pixel is distinct for each camera output: "4050" for output 1212 from Camera one, "405" for output 1214 from Camera two, "41" for output 1216 from Camera three and "4" for output 1218 from Camera four. An exitance estimation operation 1220 for each pixel is formed from the Exitance Table formed from integral function 680 as for Exitance plot 1020. The digital values from weighting function 1210 are transformed into their respective exitance estimates from integral function 680 or response function 620 and an associated variance on the estimate is searched from the Variance Table formed from noise summation 645.

Figure 13:
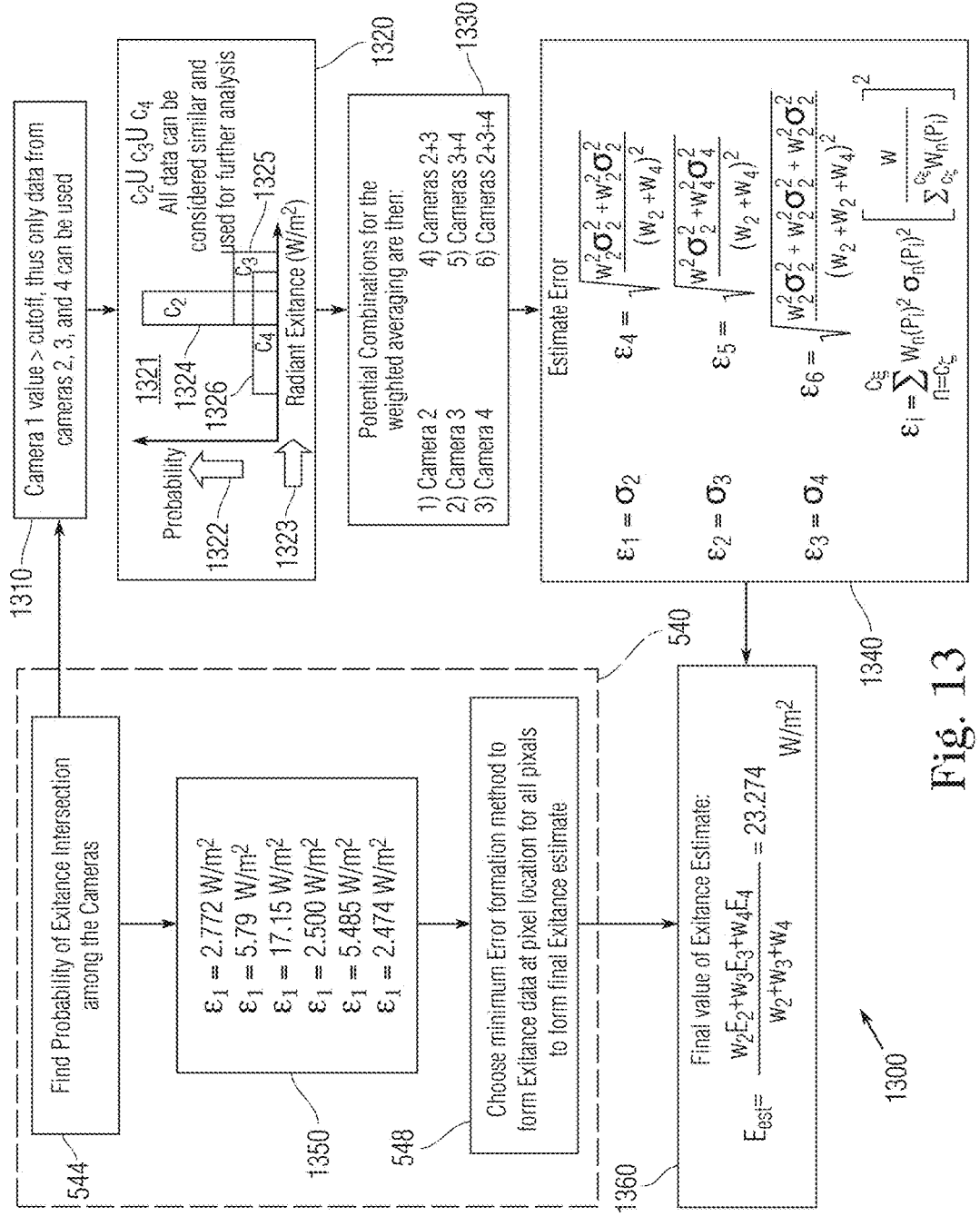
FIG. 13 is a flowchart view of a process diagram for error estimating.

FIG. 13 shows a flowchart view 1300 of an exitance estimation operation from Step 4 540. The tenth operation 548 yields a threshold selection result 1310 based on Camera one cutoff so as to limit usage to Cameras two, three and four. This can be illustrated by a union plot 1321 showing union intersections from Cameras two ($c_2$), three ($c_3$) and four ($c_4$). Radiant exitance represents the abscissa 1322, while probability constitutes the ordinate 1323. The radiance range values and magnitudes with their standard deviations are shown as shaded bars for Cameras two 1324, three 1325 and four 1326. This determination was made by comparing the pixel values to the cutoff value in process 1310. The process 1320 compares the probability that the data from each camera originate from the same potential set of radiance exitance values. This yields potential camera combinations 1330 for weighted averaging, to produce an equation list 1340 for estimate error based on noise values and weights in eqns. (58) through (64). These relations for error estimate $\varepsilon_i$ of index i can be expressed in terms of noise component $\sigma_j$ of index j and associated weighting function $w_j$:

$$\varepsilon_1 = \sigma_2, \quad (58)$$

$$\varepsilon_2 = \sigma_3, \quad (59)$$

$$\varepsilon_3 = \sigma_4, \quad (60)$$

$$\varepsilon_4 = \sqrt{\frac{w_2^2 + \sigma_2^2 + w_3^2 \sigma_3^2}{(w_2 + w_3)^2}}, \quad (61)$$

$$\varepsilon_5 = \sqrt{\frac{w_3^2 + \sigma_3^2 + w_4^2 \sigma_4^2}{(w_3 + w_4)^2}}, \quad (62)$$

$$\varepsilon_6 = \sqrt{\frac{w_2^2 + \sigma_2^2 + w_3^2 + \sigma_3^2 + w_4^2 \sigma_4^2}{(w_2 + w_3 + w_4)^2}}, \quad (63)$$

$$\varepsilon_{ij} = \sum_{j=c_\zeta}^{c_\xi} w_j(Z_{ij})^2 \sigma_j(Z_{ij})^2 \left[\frac{w}{\sum_{c_\zeta}^{c_\xi} w_j(Z_{ij})}\right]^2, \quad (64)$$

where $c_\zeta$ and $c_\xi$ are the set of cameras to be used from summation limits 1320 and $Z_{ij}$ is digital value for pixel i and camera j. The tenth operation 584 selects from a list 1350 of error estimate values in watts-per-square-meter (based on the equation list) and yields a final value 1360 for exitance estimate.

Figure 14:
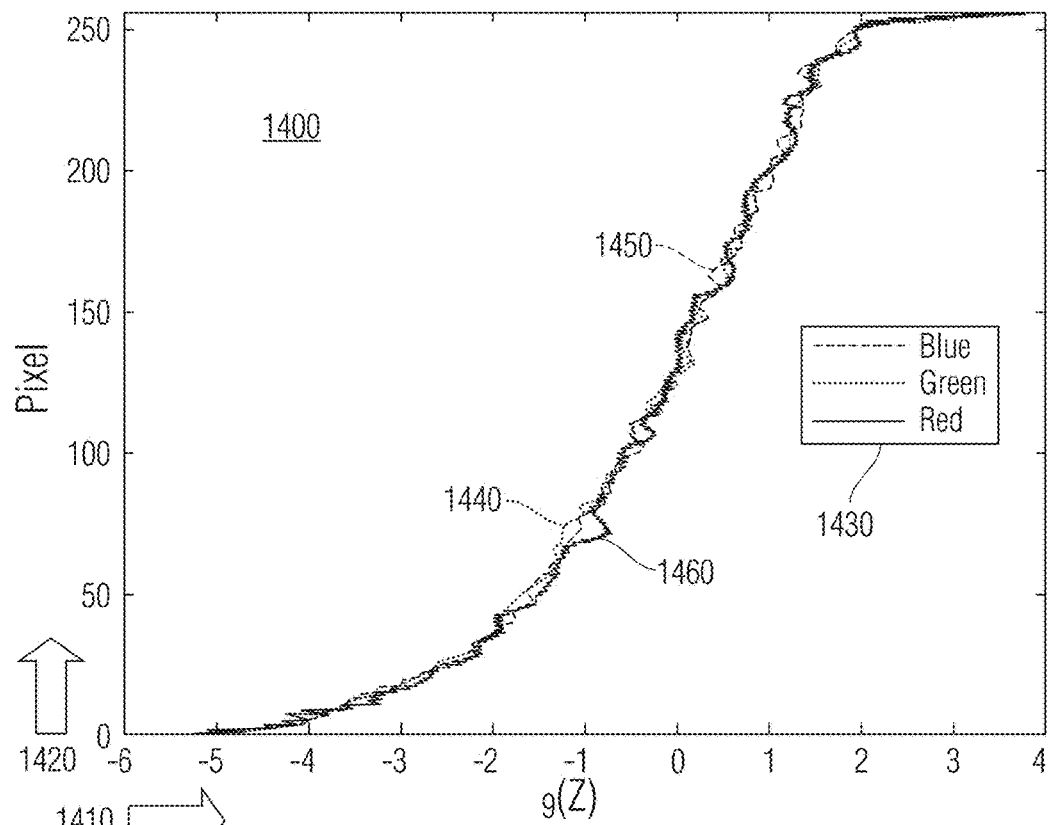
FIG. 14 is a graphical view of a pixel image response function.

FIG. 14 shows a graphical view 1400 of an image response function derived for a Sony RX-100 camera. Using thirty-two exposures, a 20% plateau weighting function and a smoothing value of unity with predicted pupil dilation with the response function 1410 representing the abscissa and pixel digital value 1420 representing the ordinate. A legend 1430 identifies the color channels with blue 1440, green 1450 and red 1460.

Figure 15:
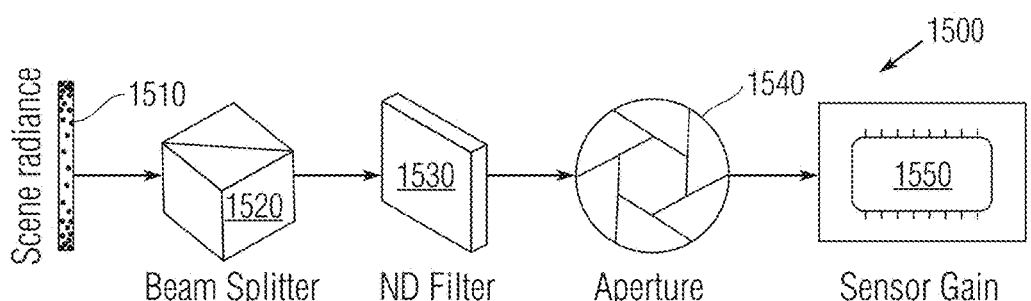
FIG. 15 is a diagram view of light path travel in the exemplary system.

From the physical setup, there are five components to be modeled. FIG. 15 shows a diagram view 1500 of the optical path includes polychromatic light 1510 from a radiation source entering a beam-splitter 1520 where some light will be reflected and some will be transmitted. Next the light optionally passes through a neutral density filter 1530 to uniformly reduce the amount of energy passing on to the camera lens. When the light enters the camera lens, the light can be further attenuated by an aperture 1540 to further restrict the quantity of light that enters the camera. The aperture 1540 acts as a physical block to non-collinear light and its attenuation is proportional to the area of the opening. Next the light reaches the imager 1550 to provide a sensor gain. The imager 1550 collects the energy from the light via the photo capacitors and convert the light to charge via the quantum efficiency of the scene at the associated wavelength. Next, the accumulated charge is shifted, provided a gain by the imager 1550 and converted to a voltage for the analog-to-digital converter to parse out the analog data into digital divisions.

Figure 16:
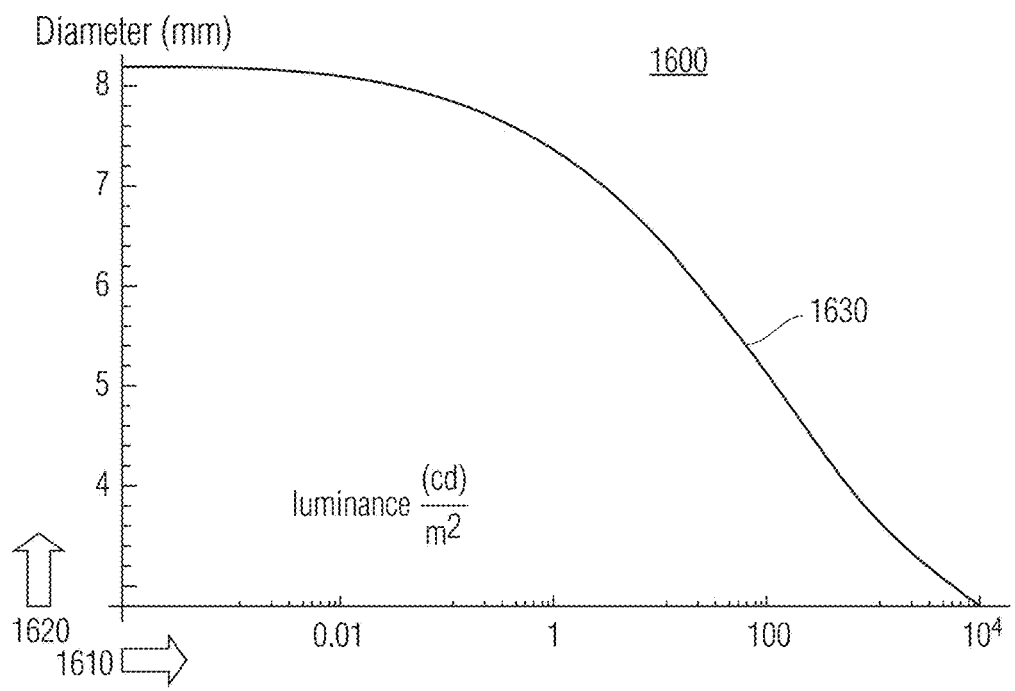
FIG. 16 is a graphical view of pupil diameter response to luminance.
Figure 17:
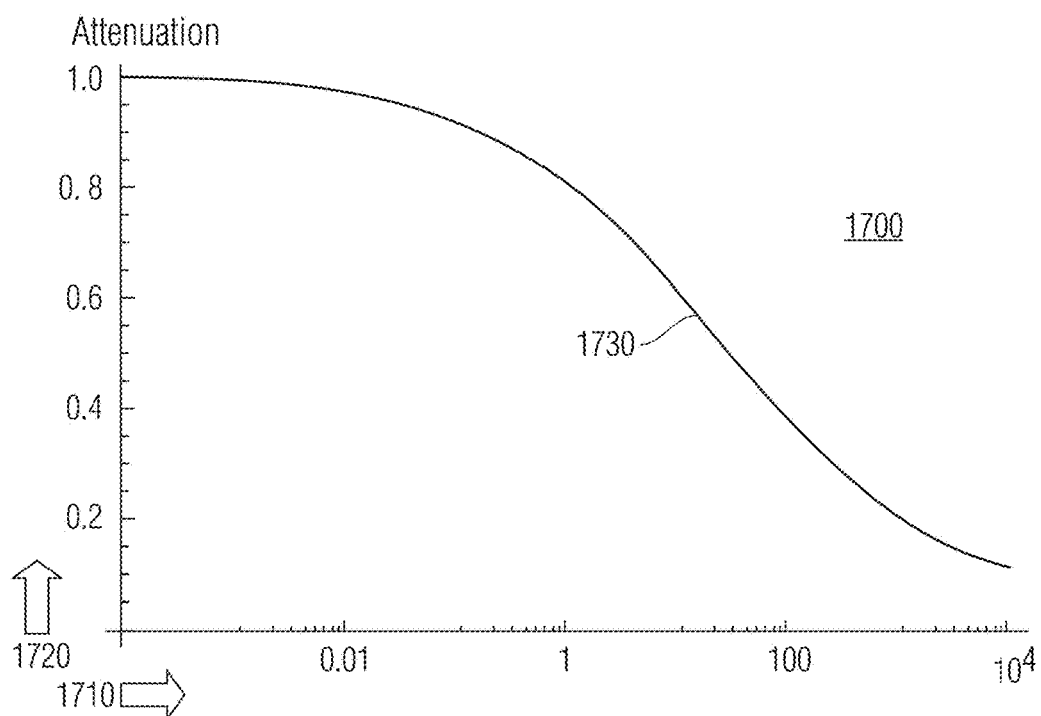
FIG. 17 is a graphical view of attenuation from pupil dilation to luminance.

Further pupil dilation information is available from A. B. Watson et al., "A unified formula for light-adapted pupil size", *J. of Vision* 12(10) (2012). The Watson unified formulation has recently been constructed to account for age, monocular versus binocular vision, luminance and field of view, with effects observable in FIGS. 16 and 17 to be subsequently described in more detail. This is primarily based off of a formula by P. A. Stanley et al., "The effect of field of view size on steady-state pupil diameter", *Ophthalmic & Physiological Optics* 15(6) 601-603 (1995). FIG. 16 shows a graphical view 1600 for predicted pupil dilation for a 21-year old utilizing monocular vision within a ten-field of view. Luminance 1610 in candela-per-square-meter (or lux) denotes the abscissa, and pupil diameter 1620 in millimeters denotes the ordinate. The curve response 1630 denotes diameter logarithmically diminishing with increasing luminance. FIG. 17 shows a similar graphical view 1300 for attenuation from the pupil dilation with attenuation 1710 as the abscissa and diameter 1720 as the ordinate, and the relationship curve 1730 plotted with similar trend as for view 1600. At the brightness the pupil reduce the light that enters one's retina by nearly 80%.

Light passes through the pupil, lens and vitreous body before reaching the retina where the incident light reflects off a pigmented layer of cells before being absorbed by the photoreceptors. The human retina has two forms of receptors, rods and cones. Rods are sensitive to low light and are responsible for vision from twilight to very dark. Cones are less sensitive and are responsible for vision in daylight to moonlight. The neural receptors for rods are intermingled with its neighboring rods reducing the ability to discriminate detail, but increasing their sensitivity. D. H. Hubel and T. N. Wiesel published their seminal work *Brain and Visual Perception* (2005) on horizontal cells in our eyes acting as difference operators in ch. 12 (193-230). D. Marr in *Vision: A Computational Investigation* (2010), shows how their response very closely resembles the output of difference of Gaussian filters of varying standard deviations in § 2.2 (54-79).

There are estimated to be about 125 million rod cells in the human eye and encompass the majority of our vision. There are about six-million cones in the human eye primarily in the fovea, as reported by G. Osterberg, "Topography of the layer of rods and cones in the human retina", *Acta Ophthalmol. Suppl.* 13(6), 1-102 (1935). Cones compose of three different lengths, long "L", medium "M", and short "S", tuned to absorb light of 564-580 nm, 534-545 nm, and 420-440 nm. These photoreceptors are activated in different visual ranges, the ranges are the photopic and scotopic range, and the region where they overlap is the mesopic range.

Figure 18:
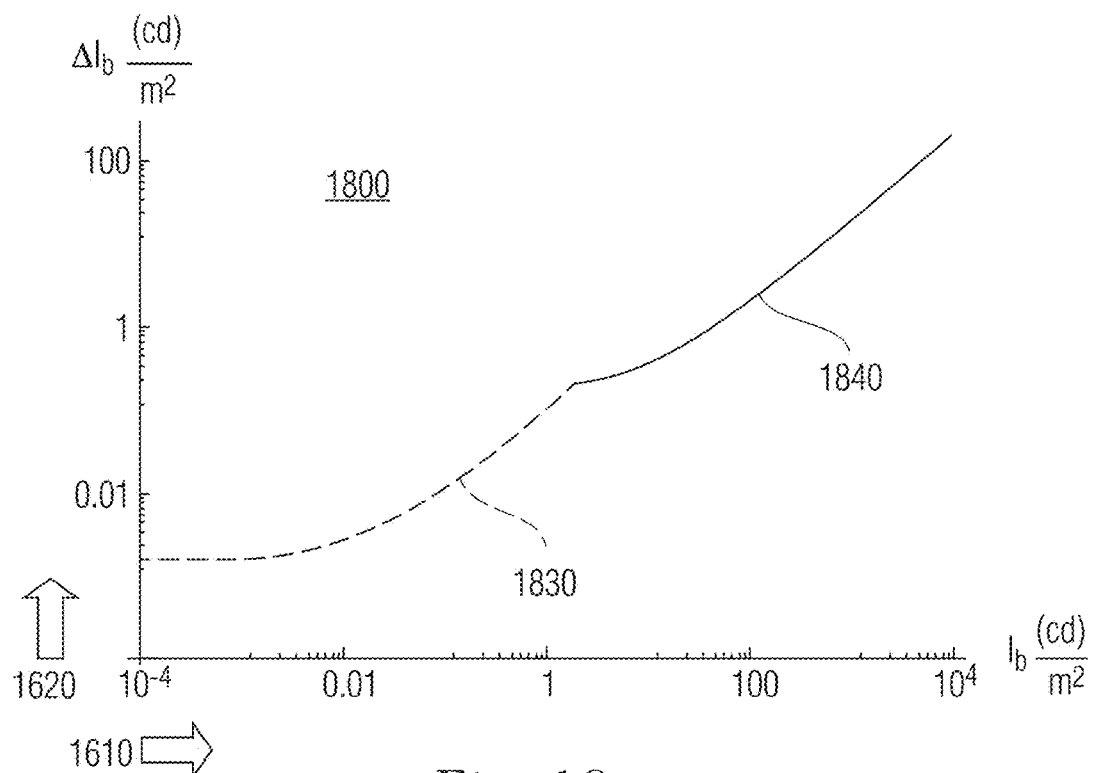
FIG. 18 is a graphical view of a response plot of retinal cells.

FIG. 18 shows a graphical view 1800 of a response plot of retinal cells featuring the range overlap. Irradiance 1810 in lux denotes the abscissa and difference in irradiance 1820 denotes the ordinate. Photosensitive responses include rods 1830 and cones 1840 with a small change in the background intensity, scotopic ranges from $10^{-4}$ cd/m$^2$ to 1.0 cd/m$^2$, mesopic $0.02 \cdot 10^{-1}$ cd/m$^2$, photopic $0.02 \cdot 10^6$ cd/m$^2$. Light is absorbed by the rods and cones photoreceptors through a photochemical reaction. Light interacts with rhodoposin passes through a cascading chemical process, which ultimately inhibits the flow of sodium ions Na$^+$, hyperpolarizing the rod toward the potassium ionic charge K$^+$, and depolarizes the neural inhibitors. This causes the bipolar cell to depolarize and cause in increase in neuro-transmitter sent to the ganglion cells, observed as an increase in potential in an electroretinogram. The reaction breaks down photosensitive pigments and temporarily renders them insensitive, a process called "bleaching", as described by D. G. Birch et al., "Quantitative Electroretinogram Measures of Phototransduction in Cone and Rod Photoreceptors", *Arch. Ophthalmol.* 120 1045-1051 (2002).

Therefore light adaptation can be thought of as a depletion and regeneration of the photo-pigments that is proportional to the incident light. W. A. H. Rushton, "Increment threshold and dark adaptation", *JOSA* 53(1), 104-109 (1963), describes light sensitivity. This was first modeled by the Naka-Rushton equation:

$$\frac{R}{R_{max}} = \frac{I_b^n}{I_b^n + \sigma^n}, \quad (65)$$

where $R/R_{max}$ is the normalized cellular response, I is the light intensity, and a is the semi-saturation constant, n is a correlation constant to fit the sigmoidal operator and is typical reported by Rushton as 0.74. A proper description of this process is reviewed by L. S. Evans et al., "Comparison of three methods of estimating the parameters of the Naka-Rushton equation," *Documenta Opthalmologica* 84, 19-30 (1993). The Naka-Rushton relation in eqn. (65) indicates the photoreceptor response given some quanta of light for a given previous background state, which determines the semi-saturation constant, being defined as when the background intensity is zero, or the minimum threshold. J. M. Valeton et al., "Light adaptation of Primate Cones", *Vision Research* 23(12), 1539-1547 (1983), modeled the light adaptation of primate's cones.

Figure 19:
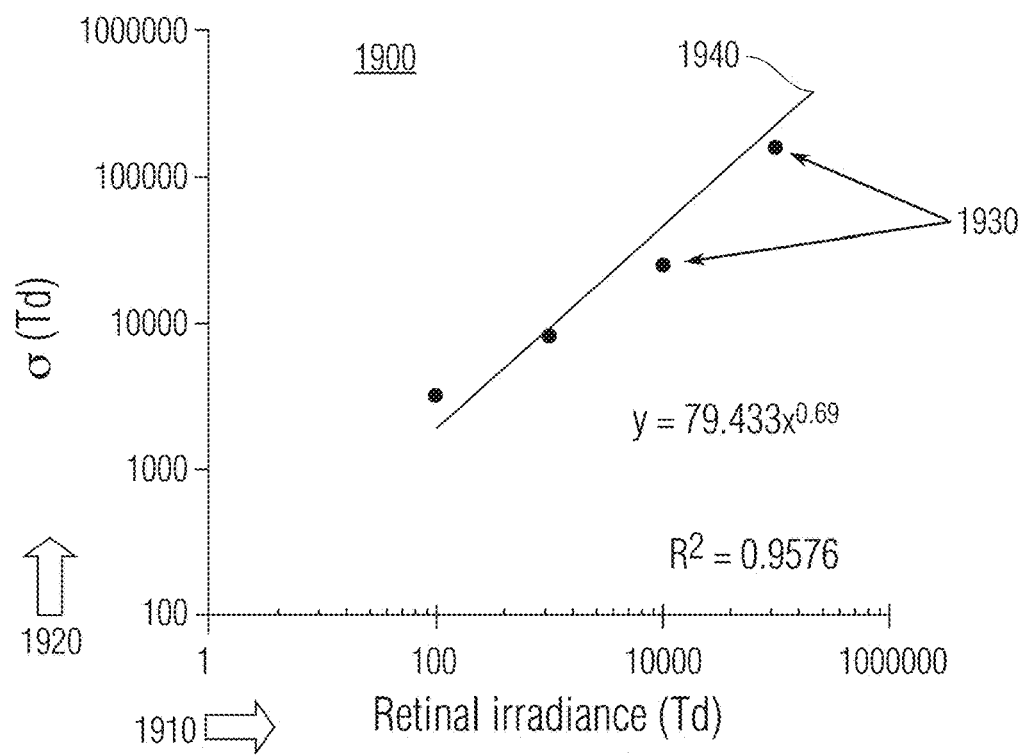
FIG. 19 is a graphical view of a power curve-fit for retinal irradiance.
Figure 20:
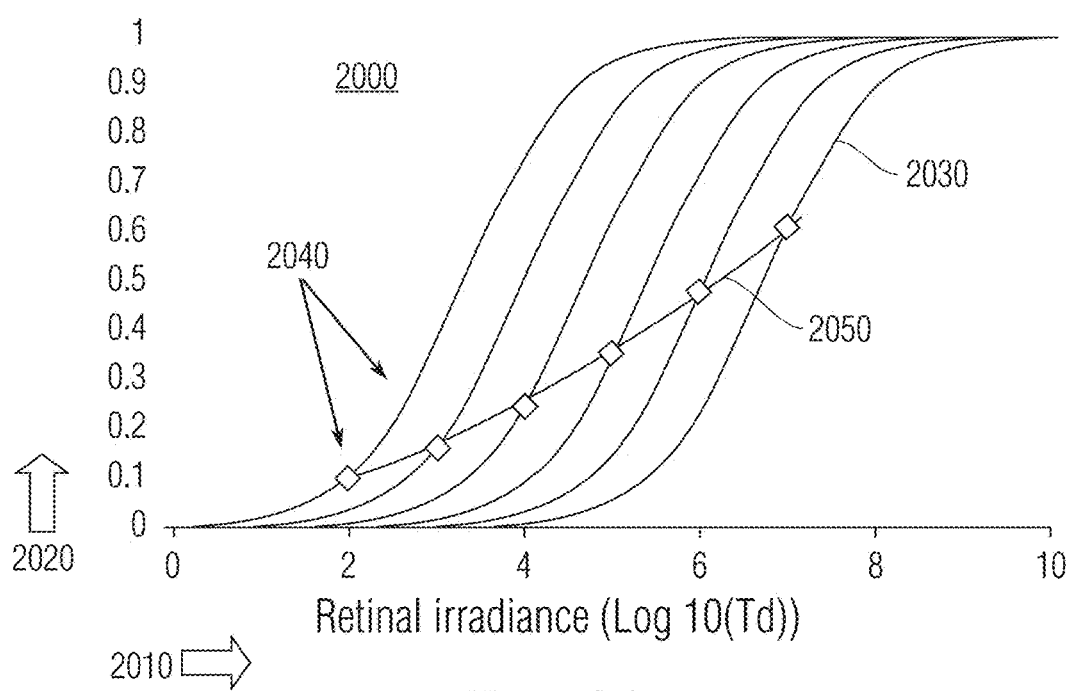
FIG. 20 is a graphical view of a relation for mapping the logarithm of retinal irradiance to the non-dimensional perceived response.

Valeton found the maximum response voltage and the minimum response above varying background intensities. This experiment was performed by dilating the primate's eye and inserting an electrode to measure the response from the retina caused by varying visual stimulus. Valeton modeled the light adaptation of primate's photoreceptors because they closely mimic those of humans. R. M. Boynton et al., "Visual adaptation in monkey cones: recordings of the late receptor potentials," *Science* 170(3965), 1423-1426 (1970) provides further saturation information. For dark adaptation, Valeton reports the semi-saturation constant as 3.1 log through 3.4 log Trolands by Valeton, and Boynton reports 4 log Trolands. Valeton showed that despite the background illumination, there was a consistent 700 µV range that the eye would respond within. Valeton's data were fit to the Naka-Rushton relation in eqn. (64) to solve for the parameters of the semi-saturation and correlation constants σ and n. Because the semi-saturation value is a measure of the bleaching effect, that value should vary as a function of the background irradiance rather than behave as a static number as previously reported. The single parameter that remains unsolved is how the semi-saturation constant changes as a function of background irradiance. Valeton's data were interpreted to produce a modified version of the Naka-Rushton eqn. (64) to include a parameter regarding retinal irradiance:

$$\frac{R}{R_{max}} = \frac{I_r^n}{I_r^n + 79.43 I_r^{0.69n}}, \quad (66)$$

where $I_r$ is the retinal irradiance, which enables the mapping of photopic vision equivalents at any background luminosity, seen in FIGS. 19 and 20.

FIG. 19 shows a graphical view 1900 of semi-saturation constant as a function of retinal irradiance in power curve-fit. Retinal irradiance 1910 in Trolands (Td) denotes the abscissa and semi-saturation constant 1920 (dimensionless) denotes the ordinate. The data points 1930 can be fit with power line 1940 to provide an approximation to predicted response. FIG. 20 shows a graphical view 2000 of numeric recreation using the exemplary modified Naka-Rushton relation to map Valeton's data. Radial irradiance in common logarithm of Td denotes the abscissa and the non-dimensional response 2020 denotes the ordinate. A series of curves 2030 with varying background irradiance denote the normalized response to an irradiance value greater or less than the background value. The points 1930 and the line 1940 can be replotted as points 2040 and curve 2050 to more clearly illustrate the relationship with the response curve 2030. In view 1900, semi-saturation constant as a function of retinal irradiance. In view 2000, numeric recreation uses the modified Naka-Rushton relation in eqn. (65) to map Valeton's data.

Figure 21:
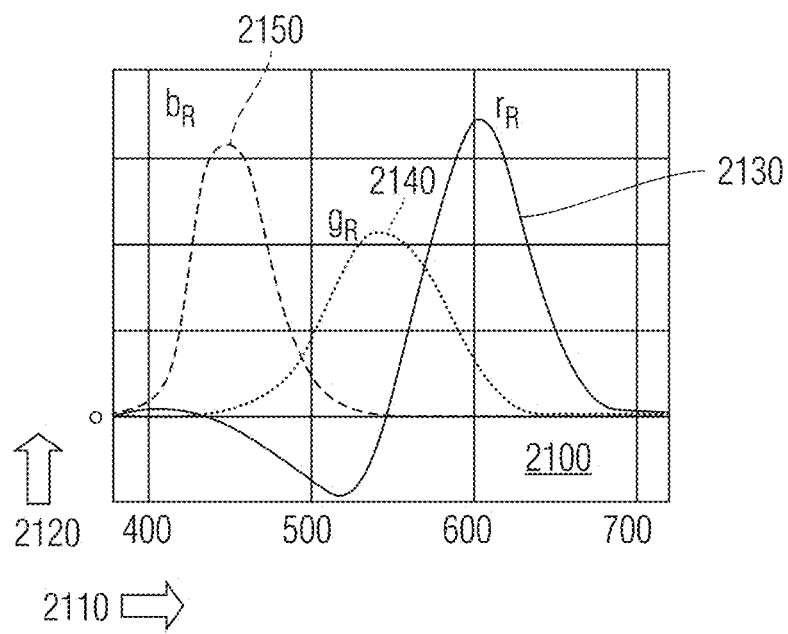
FIG. 21 is a graphical view of the CIE 1931 in response to wavelength.
Figure 22:
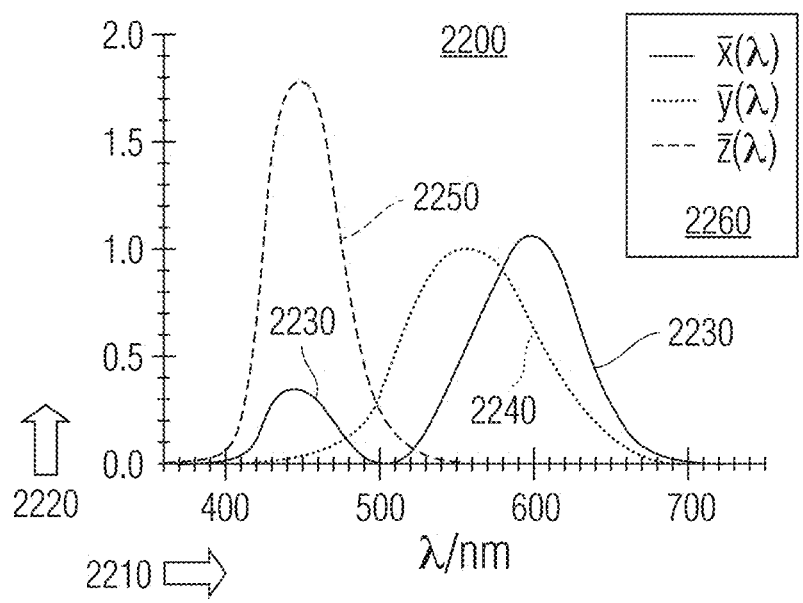
FIG. 22 is a graphical view of the CIE 1931 color matching function in response to wavelength.

FIG. 21 shows a graphical view 2100 of the CIE 1931. Wavelength 2110 in nanometers (nm) denotes the abscissa and normalized absorbance amplitude 2120 denotes the ordinate. Responses by color (by ascending frequency) include red 2130, green 2140 and blue 2150. Color vision response has an additive quality, and FIG. 22 shows a graphical view 2200 of the CIE 1931 color matching function where all colors are additive. Wavelength 2210 in nm denotes the abscissa and normalized absorbance amplitude 2220 denotes the ordinate. Responses by color (by ascending frequency) include red 2230, green 2240 and blue 2250. These can be designated by corresponding color-chart vectors being functions of wavelength as provided in legend 2260. For example, a negative red would be added in order to fully recreate our vision systems color acquisition ability utilizing the equivalent red green blue (RGB).

Figure 23:
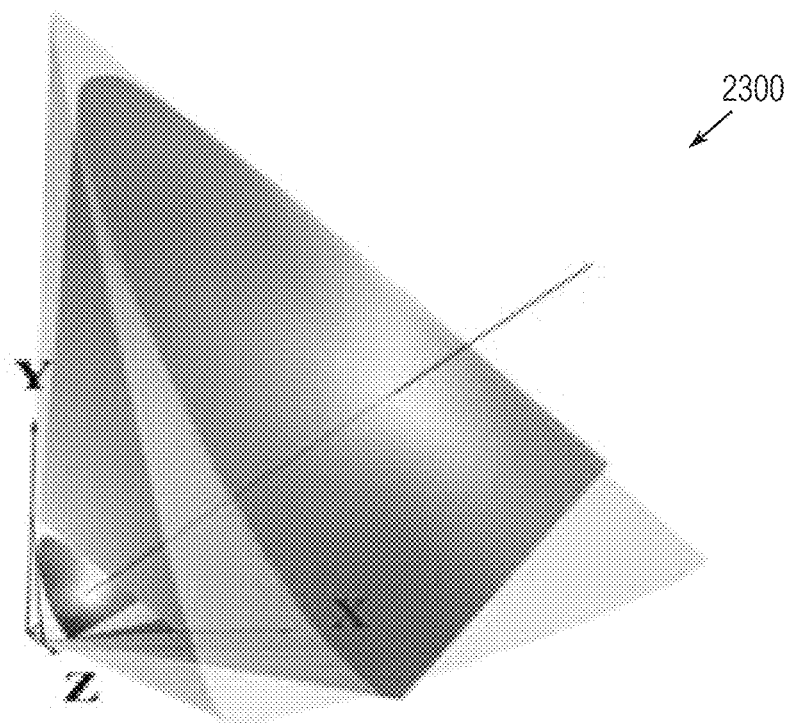
FIG. 23 is a diagramic view of a color chart in the XYZ coordinate system.
Figure 24:
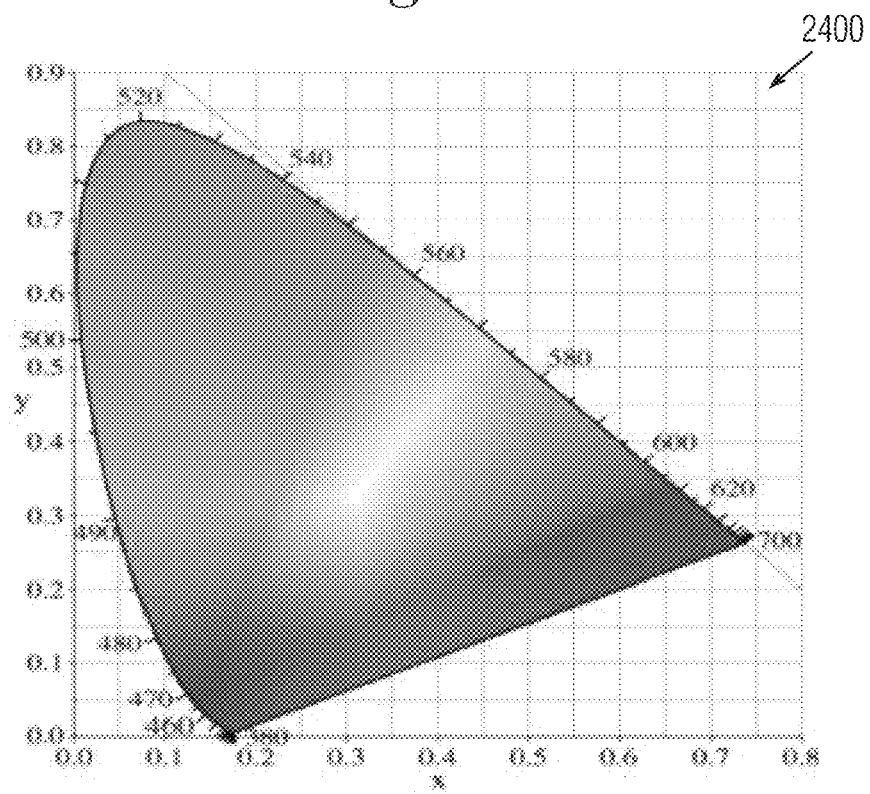
FIG. 24 is a graphical view of a color chart mapped from a plane in the xyY coordinate system.
Figure 25:
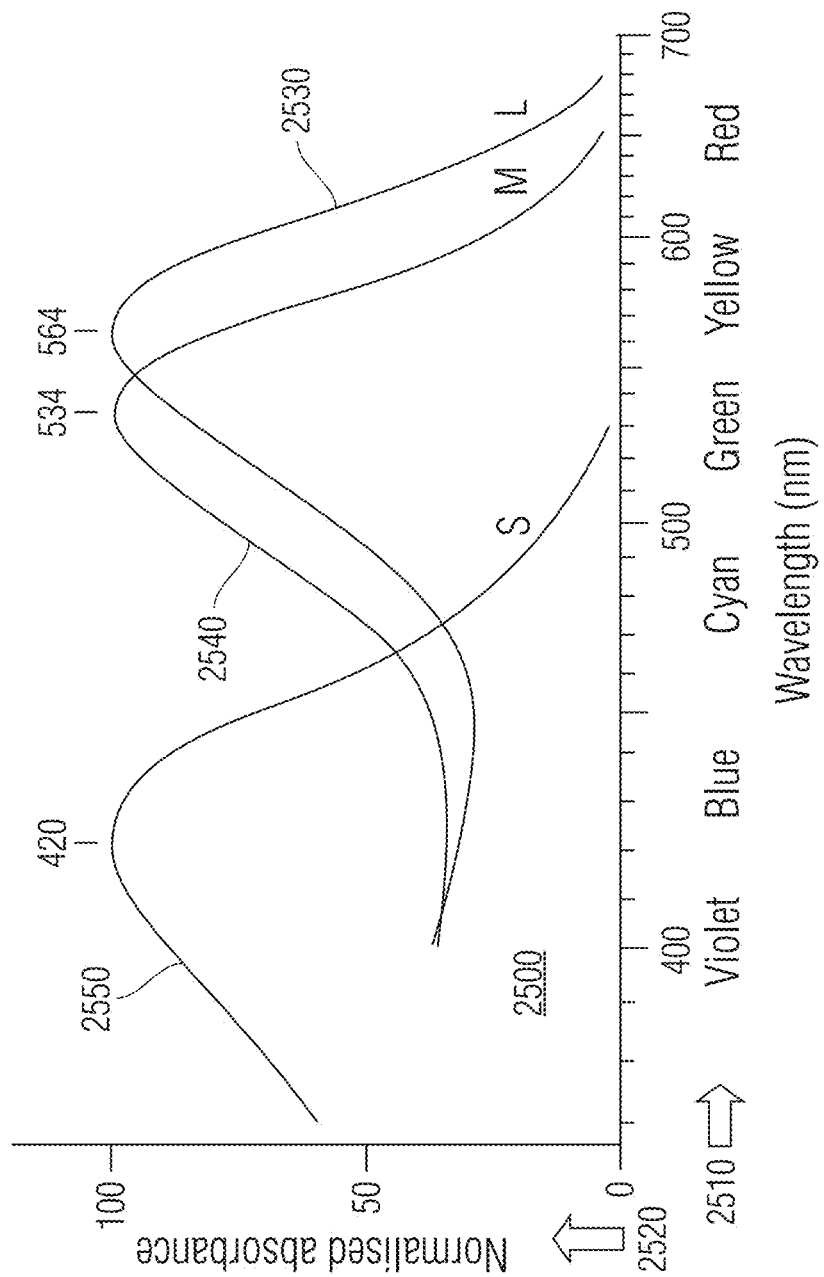
FIG. 25 is a graphical view of normalized tri-stimulus absorbance response to wavelength.

The CIE 1931 RGB color matching function was mapped to a triangular prism called the XYZ color space (as functions of wavelength) being visible in FIG. 23 as view 2300. A normalized slice from this scale in the XY plane can be seen in FIG. 24 as view 2400 from the lower left corner of view 2400 for a specified luminosity. The Y scale is the photopic luminance to map the acquired scene radiance into luminance. Each rod is tuned to a specific wavelength with provides human visual tri-stimulus interpretation of the surrounding electromagnetic environment. FIG. 25 shows a graphical view 2500 of tri-stimulus response of the human eye. Wavelength 2510 in nanometers (nm) denotes the abscissa and normalized absorbance 2520 (dimensionless) denotes the ordinate. Responses by color (by decreasing wavelength) include long (red, 564 nm) 2530, medium (green, 534 nm) 2540 and short (blue 420 nm) 2550, corresponding to their wavelengths. The long cones are tuned to 564 nm, the medium are turned to 534 nm and the short are tuned to 420 nm, while rods are tuned to 500 nm. In 1931, the *Commission internationale de l'Eclairage* (CIE) derived color matching functions from data developed by W. D. Wright (1929) and J. Guild (1931). See H. S. Fairman et al., "How the CIE 1931 Color-Matching Functions were Derived from Wright-Guild Data", *Color Research & Application* 22(1), 11-23 (1997), 23(4), 259 (1998). These experiments mapped out the tri-stimulus response by showing people an array of colors and asking them to match the color to another. From these data utilizing metamerism, the different tri-stimulus inputs were determined to result in the appearance of the same color the CIE equivalents.

Exemplary embodiments can be used to explain the scene radiance in RGB space to the perceptual luminance, then after calibration get a physical measure of the scene luminance. With the scene luminance one of the pupil dilation models can be used to predict the retinal irradiance. Once the retinal irradiance is known and the background irradiance, the perceptual brightness of the remaining pixels can be scaled by the modified Naka-Rushton relation eqn. (62). A flow chart of the process from acquisition to the final rendered output image is discussed subsequently. The full system includes the physical setup that enables the acquisition of the full scene radiance with COTS parts for video, the measurement of the scene luminance within a video, and a perceptual reproduction of the scene on a display media that mimic how a human would perceive the scene and scales that information into the display space of the display media. This enables the display of very large dynamic range scenes to be displayed on a screen or printed with little loss of information. This further enables the simulation of how a human would perceive a scene if the background illumination were to change.

The described architecture purposely takes advantage of COTS equipment with expectation that further applications of the technology will be developed. Through the incorporation of COTS, partnering is facilitated between individuals, organizations and academia that do not have or otherwise cannot afford the resources for development of application specific equipment or applications. For consistency with system acquisition policies in the Department of Defense (DoD), the exemplary architecture developed, to the maximum extent possible, constitutes open source and open platform. This architecture therefore provides the maximum value on a needed technology that can evolve to fulfill future mission needs and can take advantage of commercial developments as they become available and affordable.

Figure 26:
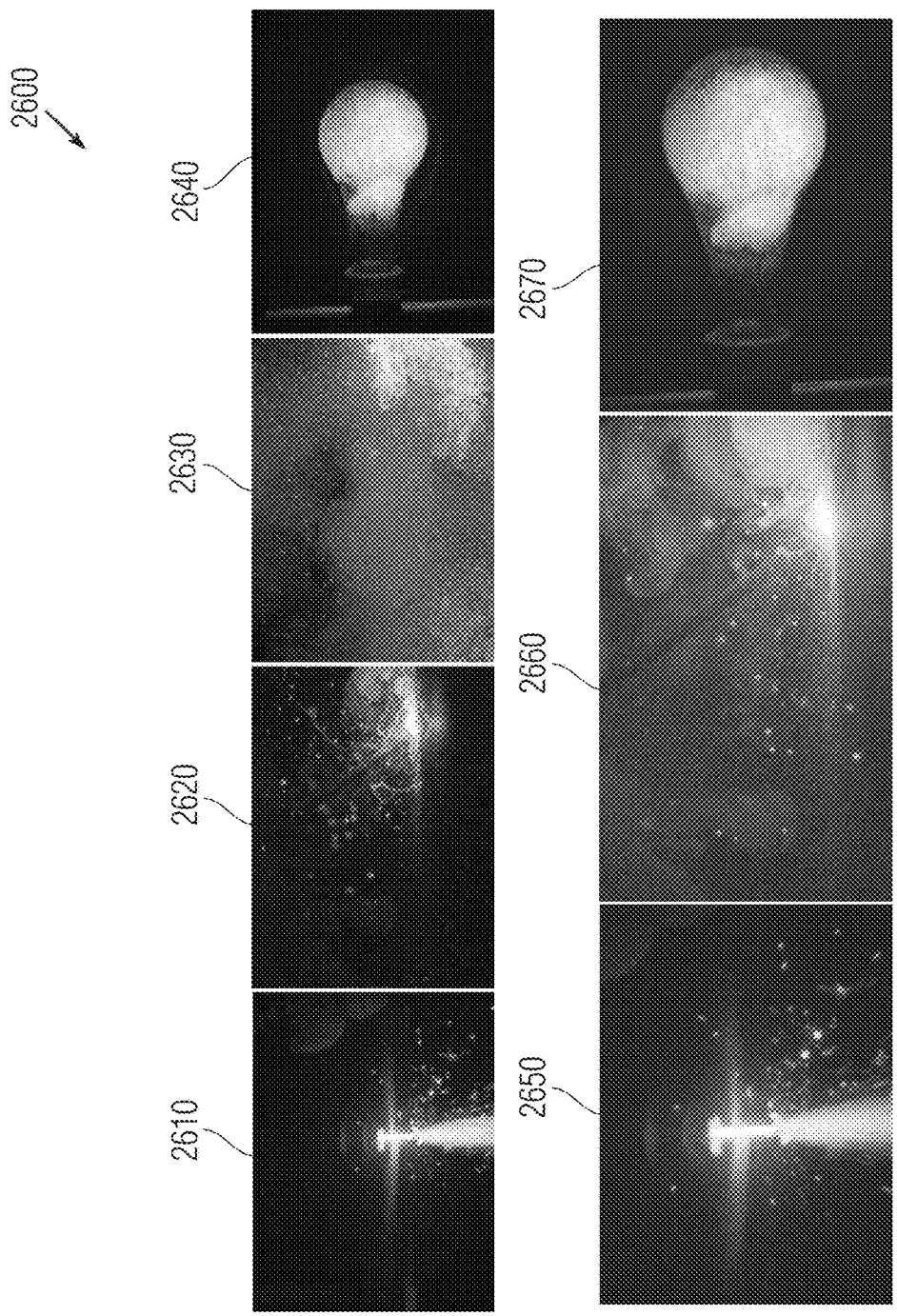
FIG. 26 is a series of tone-mapped HDR image views of various light sources.

FIG. 26 shows a photographic series view 2600 of imaged frames for an exemplary system that has been demonstrated utilizing COTS Phantom cameras in view 340. The images include first image 2610 for a plasma cutter filmed at 1,000 fps, dynamic range $1 \times 10^6$; second image 2620 for arc welder filmed at 5,000 fps, dynamic range $1 \times 10^7$; third image 2630 for flash Bang Grenade filmed at 8,000 fps; and fourth image 2640 flash bulb peak output filmed at 10,000 fps, dynamic range $1 \times 10^8$, 27-stops. With this system several HDR videos have taken ranging from 1,000 fps to 100,000 fps spanning over 28-stops in dynamic range. This capability has never before been observed in high-speed videography. Additional comparison images for Tone-mapped frame from a plasma cutter include fifth image 2650 for 22-stops, sixth image 2660 for 24-stops and seventh image 2670 for 26-stops, subsequently described in more detail.

Particular advantages provided by exemplary embodiments include:

(1) The modified Debevec formula from eqn. (46) that enables HDR video to be captured with a constant integration time;

(2) A parallax free physical setup where COTS cameras can be used with dissimilar optical paths to capture the information required to recreation of the HDR scene;

(3) A movie frame formation methodology that mitigates frame formation errors due to non-symmetrically distributed errors such as veiling glare, lens flare, and misalignment and symmetrically distributed error such as shot noise, read noise, dark current noise and quantization error; and (4) A new tone-mapping method to scale the acquired radiance information into a perceptual brightness for display on low dynamic range media formats such as a monitor.

Conventionally, there appears to be only one alternative that can be purchased. This is not a production camera, but an on-demand fabrication. There have been other attempts in academia where multiple cameras located in close proximity have been demonstrated. However, these suffer from ghosting from the varying integration times and parallax error due to the slightly dissimilar viewpoints. NASA showed a similar capability in 2011 filming the STS-134 launch of Endeavour, but this also had parallax error had to be accounted for. High-speed digital video is a common measurement tool used in the analysis of explosive or energetic events. The dynamic range above 0 dB of a digital camera is defined as the ratio of the deep well capacity to noise floor, typically around 60 dB. The dynamic range of an explosive event can exceed the cameras' ability by many orders of magnitude, often in excess of 150 dB. Various exemplary embodiments were developed to utilize COTS synchronized high-speed cameras to film events having extremely high dynamic ranges.

A key development in this technology is an intensity scaling method that enables the mapping of the extremely high dynamic range scene information into the luminance display space exhibited by most modern displays. The exemplary process enables greater retention of detail necessary to ensure the authenticity of the final image and explains operations to implement a system composed of N number of cameras. The exemplary process also articulates the capabilities of the system to capture a video that has more than a 170 dB range at 79,000 fps and for viewing on common display media.

Video Recording and Noise:

The first high-speed video was of a galloping horse in 1887 to settle a wager whether or not all four of the horse's hooves were ever off the ground simultaneously. From that historical time onward high-speed videography has been used to capture event information that happens too fast for humans to readily observe. In the 1980's the development of the CCD marked the beginning of digital high-speed videography which advanced with the development of active pixel sensors. As memory capacity, speed, sensitivity and noise suppression continue to advance, high-speed digital cameras are rapidly replacing the use of film due to their ease of use and satisfactory imagining ability throughout the defense, automotive, industrial and research applications. Optical noise remains a difficult challenge that high-speed camera manufacturers face. Optical noise is a persistent environmental factor that adversely affects the performance of an optical sensing system similarly to the manner in which thermal noise disrupts the operation of electrical systems. This thermal noise is statistical in nature and highly dependent on the particular technology employed. The dynamic range acquisition capability for a camera is the ratio of the deep well capacity to the noise floor of the camera. High-speed cameras must have high sensor gains, large fill factors, and large pixels to account for the very short exposure times required in high-speed videography. This limits the total dynamic range that most high-speed digital cameras can acquire with typical dynamic range values of 60 dB. Some manufacturers have used per pixel changes in exposure time to increase the dynamic range up to 80 dB, but this range is insufficient for the recording of most explosive events.

Over the past seventeen years researchers have developed ways to capture a large dynamic range image by acquiring multiple images of a given scene and varying integration times, as described by Holladay, Crawford, Moon and deGroot. The resulting images are then combined statistically with knowledge of the exposure time for each image and the camera's image response function, to form a scene radiance map. The radiance map is a matrix of linearly related values for all the pixels within the image representing the relative brightness of one pixel to the rest of the pixels within the image. This process works very well for static scenes, however for dynamic scenes more image processing is required to account for the objects in motion.

One assumption of this type of process is the scene is invariant to change such as movement of objects within the frame. Changes that occur lead to ghosting within the image due to the differences in the image series. If there are enough exposures to statistically define the static objects, the objects in motion can be statistically removed, as described by S. Silk et al., "High dynamic range image deghosting by fast approximate background modeling", *Computers & Graphics* 36, 1060-1071 (2012). However, this conventional noise reduction method fails for necessary capture of an object in motion due to its importance. This leads to significant challenges in the development of HDR video. Several researchers have formed different solutions such as rapid bracketing by S. B. Kang et al., "High Dynamic Range Video", *ACM Trans.* (2003); split aperture imaging by M. Aggarwal et al., "Split Aperture Imaging for High Dynamic Range", *Int'l Conf. on Computer Vision* 2 (2011); and Fresnel-based imaging with multiple imagers by Tocci. To create a rapid bracketed HDR video that was recorded at 90 frames per second, the camera would have a burst of three images taken within the $\frac{1}{30}^{th}$ of a second all at varying integration times for each frame interval.

Kang's frame bracketing is an effective method to capture HDR video; however the method requires that a camera runs at least three times faster than the desired output videos playback. The camera must also be able to modify the integration time rapidly to capture every sequence. Kang's method also assumes that objects in motion do not create a significant amount of blurring over the course of any of the bursts, and therefore this method only works for objects that move slowly relative to the longest integration time. Tocci's Fresnel-based system also utilizes multiple images through the use of a Fresnel beam-splitter that parses the light to the various sensors. This system showed significant promise, but does not work for polarized sources of light to be viewed. Tocci showed how a system comprised of an FPGA and a pair of cameras can be used for the creation of real time tone-mapped HDR video. By having the cameras observe the same field and selecting which related pixels from the camera pairs had the most accurate information an aggregate of the selections could be used to display a final image to the welder. That method enables for the direct visualization of the weld, melt pool, and materials being welded. That same year NASA used six high-speed cameras to record the STS-134 launch (May 16, 2011), and five high-speed cameras and one thermal camera to visualize the STS-135 launch (Jul. 8, 2011). NASA had a camera shelter with six high-speed cameras running at 200 fps set at six different exposure times. The cameras disposed to form a 3×2 grid. The cameras were sufficiently close and the subjects being filmed were sufficiently far that parallax error was not a problem, and the first high-speed HDR video developed (to the inventor's knowledge). Exemplary embodiments describe a process that uses a generic set of cameras, lens's, and filters, to capture and reproduce a tone-mapped HDR video using any array of cameras or imagers. This process can view several different phenomena from a rail gun launch, welding, flash bang grenade detonation, 6" gun muzzle blast at 25,000 frames per second (fps), and the burning of a flash bulb at over 10,000 fps spanning over 150 dB dynamic range.

Construction of a High-Speed HDR Video:

There are several methods to create a high dynamic range image. The most common methods are described by A. O. Akyüz et al., "A reality check for radiometric camera responce recovery algorithms," *Computers and Graphics* 37 935-943 (2013). These methods derive from sources that include Debevec, as well as:

T. Mitsunaga et al., "Radiometric Self Calibration", *Computer Vision and Pattern Recognition* 1 374-380 (1999);

M. A. Robertson et al., "Estimation-theoretic approach to dynamic range enhancement using multiple exposures," *Journal of Electronic Imaging* 12 (2), 219-228 (2003); and M. D. Grossberg et al., "Modeling the Space of Camera Response Functions", *IEEE Transactions on Pattern Analysis and Machine Intelligence* 26(10) 1272-1282 (2004).

Akyüz found that the Grossberg method tended to recreate the most accurate images, Mitsunaga tended to show the least amount of variance between results from different scenes, and the algorithms from Debevec were the most robust to noise within the calibration images. The one commonality among the varying methods is calibration via a change in exposure time. Debevec originally provided the frame work on accomplishing this by deriving the method to find the image response function.

Debevec started by stating that the exposure of the sensor $D_{xy}$ is proportional to the irradiance and exposure time as provided in eqn. (47). This can be simplified by stating the pixel digital value $Z_{ij}$ must be a function of the sensor irradiance and the integration time yielding:

$$Z_{ij}=f(E_{film}\Delta t), \quad (67)$$

for the $i^{th}$ pixel in the $j^{th}$ image. Assuming that the process is monotonic and reversible the equation can be further modified to:

$$g(Z_{ij})=\ln(E_i)+\ln(\Delta t_j), \quad (68)$$

where $g(Z_{ij})$ is the image response function of the stored pixels Z. A series of points can be assembled from different images of the same scene taken at different exposures. Then a function can be fit using a linear optimization to find a smooth curve that minimizes the mean square error of the derived response function.

The objective function for this linear optimization $\vartheta$ is:

$$\vartheta = \sum_{i=1}^{N}\sum_{j=1}^{P}\{w(Z_{ij})[g(Z_{ij})-\ln E_i - \ln \Delta t_j]\}^2 + \lambda \sum_{z=Z_{min}}^{Z_{max}-1}[w(z)g''(z)]^2, \quad (69)$$

where $w(Z_{ij})$ is a weighting function, typically a triangular function to give priority to the pixels that are not either over or under exposed, and $\lambda$ is a scaling term for smoothing the derived response function. The first term in this equation is the fitting term and the second term is a smoothing term that forces the data to a logarithmic shape. An example plot can be seen in view 1400. Debevec derived the foundational eqn. (31) to characterize the cameras imager, storage method and compression, however being based on a change in integration time. With the overall objective of having a video feed, the inclusion of other optical components must be made and the exposure time held constant. Reviewing Debevec's method, the exposure time is modified between pictures so as to alter the charge accumulation at each site. A variation to the Debevec method would be to have multiple cameras simultaneously capture the same scene utilizing the same integration time, non-polarizing optics, and band-pass filters. In order to account for all the different sources of attenuation the optical path must be molded.

The optical path begins at the front face of the beam-splitter. The beam-splitter should have a reflectance transmittance ratio heavily biased to reflectance so long as the wavelengths in the pass band are not drastically altered. This ensures the lead camera in the system has adequate light level available for acquisition. Polychromatic light passes through the beam-splitter where some percentage of the light can be transmitted and some reflected shown in view 600 featuring an optical flow path for the exemplary HDR camera system. The light continues to be further attenuated as the light passes through the ND filter 1530, being considered necessary for at least two cameras or for greater equivalent exposure setting. The light can be further attenuated with the len's aperture 1540. However doing so filters the non-collimated light differently and alters the depth of field for that particular camera. Ideally, the aperture settings can be held constant for all cameras in the system to maintain a similar depth of field. Finally there must be another term to model, the gain on the imager's amplifier 1550. Care must also be taken to ensure the optical path length is equal for all imagers. When the optics train is put together the optical length from the front of the first beam-splitter to the imager must be the same for each camera in order to ensure every camera is equidistant from the object being viewed. Optical flow path for the HDR camera system.

The total attenuation of light can then be modeled by multiplying the following terms. The attenuation from the beam-splitter $A_{bs}$ can be defined as:

$$A_{bs} = R|T(i), \tag{70}$$

where R is the percentage of reflected light, and T is the percentage of transmitted light. The neutral density filter can be modeled as $A_{nd}$:

$$A_{nd} = 10^{-I/I_0}, \tag{71}$$

where $I/I_0$ is the ratio of the attenuated light, and is typically given as the value of the ND filter 1530, typical of the ND filter value given as the $I/I_0$ ratio. The lens attenuation can be defined as $A_{lens}$ as:

$$A_{lens} = \frac{\pi}{4(f/\#)^2}, \tag{72}$$

where $f/\#$ is the aperture setting. Combining eqns. (70), (71) and (72), the total attenuation $A_{phy}$ can be modeled as eqn. (54).

Modifying Debevic's original eqn. (31) beyond the formula in eqn. (47), one obtains:

$$D_{xy} = E_{film} \Delta t A_{phy} g. \tag{73}$$

Plugging this into Debevec's eqn. (68), one obtains the natural log relation:

$$g(Z_{ij}) = \ln(E_{lens,i}) + \ln(\Delta t A_{phy} g), \tag{74}$$

This relation in eqn. (74) enables varying optics to alter the sensor irradiance.

Upon retrieving the camera response function using eqn. (74), the images can be formed into the HDR image, subsequently calibrated and converted to show a physical measurement in lumens. This is first accomplished by finding the lens irradiance for all three color channels $E_{lens,i}$ utilizing:

$$E_{lens,i} = \exp\left\{\frac{\sum_{j=1}^{P} w(Z_{ij})[g(Z_{ij}) - \ln\{A_{phy,j}\Delta t_j g_j\}]}{\sum_{j=1}^{P} w(Z_{ij})}\right\}. \tag{75}$$

The resulting matrices are the HDR image, which can now be calibrated into physical units of lumens which will be needed for the tone-mapping. First the three-channel input, assuming a color camera, must be converted from a red-green-blue (RGB) color space into an XYZ color space. The Y channel in this color space approximates the photopic-weighted absorption by the human eye. This conversion yields uncalibrated values of the photopic-weighted sensor irradiance. To calibrate this image multiply the Y values derived from $E_{ij}$ from the calibration source in your image, such as a NIST traceable white block, by the measured value of the irradiance by a light meter divided by the projected value. This process will transform the unit less values into unitary values. FIG. 27 shows irradiance scene views 2700, with an example of a calibration scene 2710, an extended Macbeth color chart 2720 and a calibration scale 2730. The irradiance is measured using a light meter with cosine correction from the white block with a 3σ error of 11 cd/m². The Macbeth color chart was used in combination with a NIST traceable white block to calculate and plot the estimated luminance of the scene.

As an alternative to the lens attenuation in eqn. (72), an aperture ratio $A_{f,open}/A_{f,actual}$ can be written as:

$$\frac{A_{f,open}}{A_{f,actual}} = \frac{\pi\left(\frac{f_0}{2N_0}\right)^2}{\pi\left(\frac{f}{2N}\right)^2} = \frac{f_0^2 N^2}{f^2 N_0^2}, \tag{76}$$

where $f_0/f$ is ratio of the most open aperture setting, smallest F number, to the actual setting, $N/N_0$ is the ratio of the calibration focal length to the actual focal length. Modifying Debevic's original eqn. (31) to become:

$$D_{xy} = E_{film} \Delta t A_{bs} A_{nd} g \frac{A_{f,open}}{A_{f,actual}}, \tag{77}$$

and plugging this back into Debevec's eqn. (68), one obtains:

$$g(Z_{ij}) = \ln[E_{lens,i}] + \ln\left[\left(\frac{f_o}{f}\right)^2 \left(\frac{N}{N_o}\right) 10^{\frac{g}{20}-d}(R|T(i))\Delta t_j\right], \tag{78}$$

where $f_0/f$ is the ratio of the most open aperture setting to the actual setting, $N/N_0$ is the ratio of the calibration focal length to the actual focal length, g is the sensor gain in common $\log_{10}$ units, assuming reported values in dB, d is the value of a neutral density filter, and R|T is attenuation from the beam-splitter. This new formulation enables varying optics to alter the amount of energy that affects a sensor over a constant integration time. An alternate formulation for eqn. (75) can be written as:

$$E_{lens,i} = \exp\left\{\frac{\sum_{j=1}^{P} w(Z_{ij})\left[g(Z_{ij}) - \ln\left\{\left(\frac{f_0}{f}\right)^2 \left(\frac{N}{N_0}\right)^2 10^{\frac{g}{20}-d}(R \mid T(i)\Delta t_j)\right\}\right]}{\sum_{j=1}^{P} w(Z_{ij})}\right\}. \quad (79)$$

Tone-Mapping a High-Speed HDR Video:

With creation of a high dynamic range image having been described from series of low dynamic range images from any set of images pulled from video camera captures, tone-mapping can be addressed. With acquisition and conversion of the data into a high dynamic range image, along with calculation of the luminance values, the high dynamic range information can be scaled in a logical manner, commonly referred to as tone-mapping, for display. The tone-mapping process is preferably able to handle series of images changing in both temporal and spatial dimensions. The tone-mapping process is also preferably able to accommodate the dynamic range of an explosive event which can range easily exceed 25-stops.

One conventional model, such as by S. N. Pattanaik et al., "Time-Dependent Visual Adaptation for Realistic Real-Time Image Display", *ACM Trans.* (2000) uses a multi-scale observer model. Another model, such as D. C. Hood et al., "Sensitivity to Light", ch. 5, *Basic Sensory Processes* (1986), indicates a sigmoidal compression in either spatial variant or invariant forms. E. Reinhardt et al., *High dynamic range imaging* (2010) in §§ 7.2.7 and 7.3.6 (258-266, 305-313), and E. Reinhard and K. Devlin, "Dynamic Range Reduction inspired by Photoreceptor Physiology", *IEEE transaction on visual and computer graphics* (2005), used a modified sigmoidal operator that includes chromic adaptation.

There are other versions such as R. Mantiuk et al., "Display Adaptive Tone-mapping", *ACM Trans.* 27(3) #8 (2008), that adapt the visual output based on the expected perceived contrast of the viewing media such as a projector or liquid crystal diode (LCD). Three additional methods include iCAM, CIECAM02, and CIECAM06 used to tone-map the information into a typical view space based on the human vision systems chromic adaptation. J. Kuang et al., "iCAM06: A refined image appearance model for HDR imaging rendering", *J. Vis. Commun. Image Rep.* 18, 406-414 (2007), describes CIECAM06. By contrast, the Tumblin-Rushmeier method modifies the luminance map to remap the information, as described by J. Tublin and H. Rushmeier, "Tone Reproduction for Realistic Images", *IEEE Comp. Graphics and Applic.* 13(6) 42-48 (1993).

Exemplary procedures are introduced that change dynamically with the scene background luminance, by using a sigmoidal operator to directly modify the luminance map. The sigmoidal operator changes automatically as the background irradiance enabling bright and dark scenes to be tone-mapped differently. Utilizing the human vision system as a model for perception of large time varying dynamic range scenes, two exemplary methods have been develop to tone-map the high dynamic range images. These exemplary methods separately involve a spatially invariant methodology and a spatially varying methodology. The spatially invariant method operates on the luminance channel to remap the relative brightness. The spatially variant method operates on a region of the luminance channel to remap the center pixel based on the relative brightness of the surrounding pixels for all pixels within the image. An exemplary sigmoidal operator is described herein based on Watson's pupil dynamic model, the Naka-Rushton formula in eqn. (65), and Valeton's retinal response data to develop a scaling metric that mimics the cellular response of the human vision system. Watson incorporated historic models to include a person's age, monocular vs binocular vision, and field of view into a single unifying formula to model the response of a pupil under a given retinal irradiance.

Previous assumptions indicated irradiance to be static at the dark adaptation state. Observing the Naka-Rushton formula in eqn. (65) and Valeton's data leads to the conclusion that the semi-saturation value should change as a function of the background retinal irradiance. Otherwise the sigmodal response waveform would not shift on the horizontal axis as demonstrated in Valeton's data to populate an exemplary graph of background retinal irradiance. This is shown in view 1900 converted from Troland units to lumen units for estimating change in the value of the semi-saturation parameter for that series of tests.

A power function was fit to the value of what the semi-saturation parameter should be for each level of retinal irradiance seen in view 1900. Using this fit function and substituting back into the Naka-Rushton formula in eqn. (65) for the value of the semi-saturation parameter and altering units, only the knowledge of the retinal irradiance would be needed to predicate the total retinal response. The exemplary modified Naka-Rushton formula in eqn. (66) enables mapping of phototrophic vision equivalents at any background luminosity, seen in view 2000. With the modified Naka-Rushton relation in eqn. (66), the scaled response from the human vision system can be found with knowledge of the incident light field. The incandescent light field is the luminance map that has been previously found from the high dynamic range information. A region of the image can then be selected, typically what would encompass the 2° field of view for the adaptation field. In this region the average luminance can be calculated. Once the average luminance is calculated the pupil dilation can be predicted from Watson's formulation. Once the pupil dilation is predicted an attenuation of light can be calculated that is caused by pupil dilation, which yields retinal irradiance.

After establishing values for retinal radiance and the background irradiance, all the pixels within the scene can be scaled according to the modified Naka-Rushton relation in eqn. (66), yielding a relative brightness for all pixels within the image relative to the background measurement. The data can be scaled into an 8-bit intensity space for display purposes. For an image with large regions of very high intensity and other large regions of very low intensity beyond the range of the typical human vision system, the spatial variant method may provide more detail in the final recreated image. A sliding window facilitates the calculation of the background irradiance at different regions within the image. The center pixel can be scaled relative to its immediate surroundings. This is a spatial variant method to improve the contrast of different portions of a scene that may be very bright or very dark relative to its surroundings, simulating what looking at different regions of the image would look like and having your eye adapt to that region of the image alone. With this in mind, and knowing the fovea spatial distribution is about a 2° field of view, the window size is ideally set to a blocks of pixels that would encompass that field of view. However, this can be modified depending on the scale of the features in the image and the size of the viewing media.

System Application and Results Demonstration:

A prototype camera assembly was constructed on an optical bread board that consists of mounts to adjust the beam-splitters radial orientation, and several three-axis gimbal mounts for small adjustments to the high-speed cameras. Two variations of this setup were assembled for Vision Research Phantom 7.1 in view 340, and 7.3 and 641 cameras in view 350. All cameras 150 were adjusted such that the center point of each imager was aligned with a common point in all the cameras field of view. Beam-splitters 140 were covered except for the entrance and exits for each lens to prevent stray light from causing lens flares. In each test the exposure times for all cameras were held constant. The apertures 1540 were set to slightly different, and values for the ND filter 1530 were modified in order to gain adequate spacing between each cameras intensity range uptake capability.

Figures 28, 29:
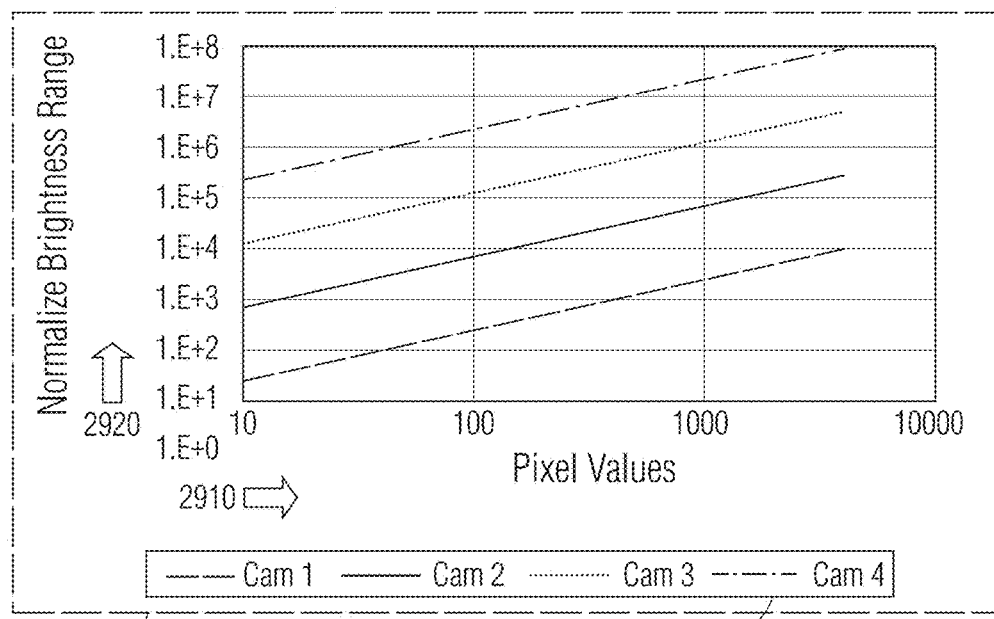
FIG. 28 is a tabular view of exemplary camera settings.
FIG. 29 is a graphical view of a normalized brightness in response to camera pixels.

FIG. 28 shows a tabular view 2800 of the experimental settings for the PF300 flash bulb visualization. Values for parameters are separately provided in the setting row 2810 for each camera in the inventory column 2820. FIG. 29 shows a plot view 2900 of the estimated intensity range covered by each camera after finding the image response function of the high-speed camera and the full system. Logarithmic pixel value 2910 represents the abscissa while normalized brightness range 2920 represents the ordinate. Cameras one through four are identified in the legend 2930, listed in ascending brightness ranges. With gradual increases in brightness sensitivity with increasing pixel numbers, image tonal clarity can be captured across the brightness extent with minimal gaps.

Figure 30:
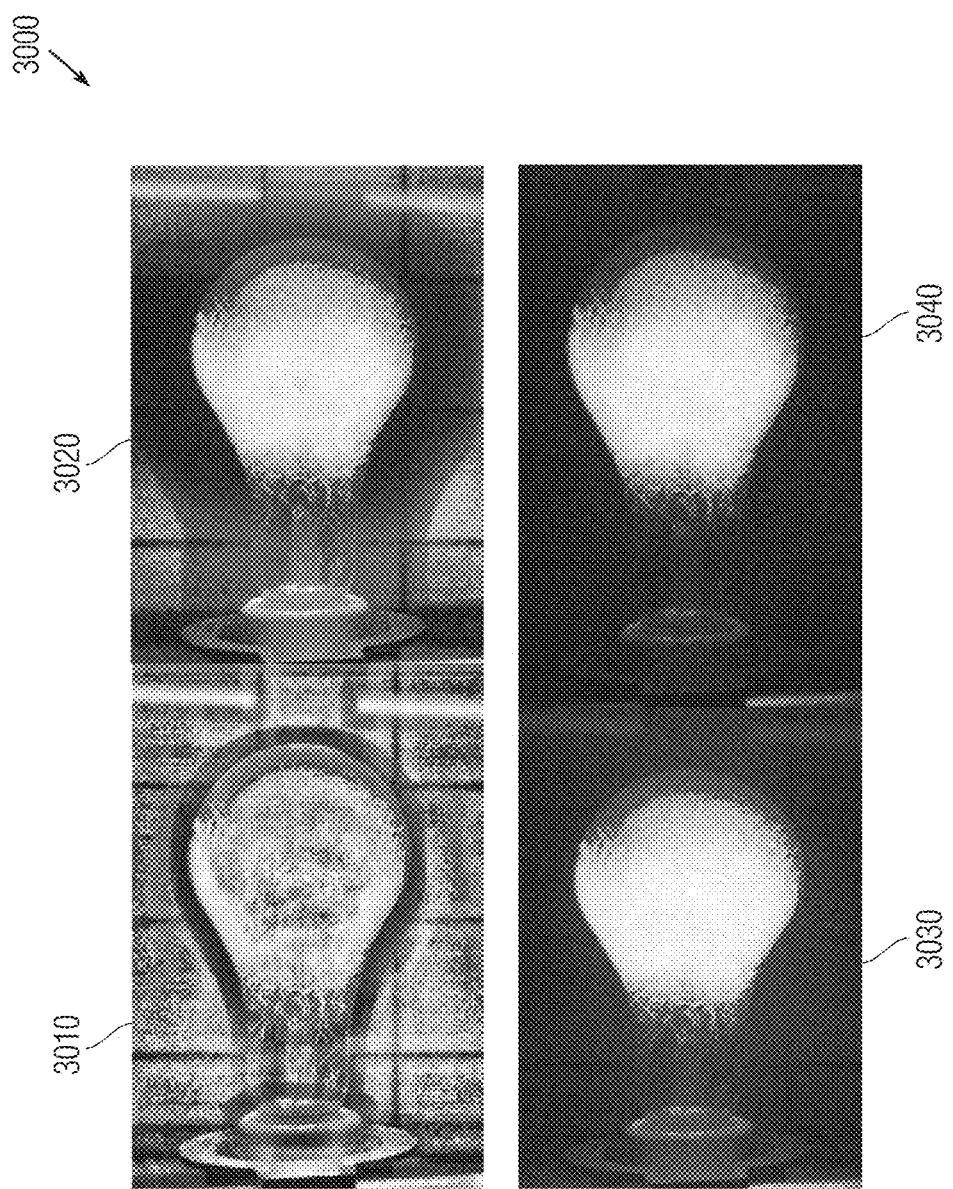
FIG. 30 is a PF300 flashbulb under varying windowing sizes for the spatially varying tone-map methodology.

The two orientations were used to view several different transient scenes ranging in dynamic range of three orders of magnitude to more than seven. Several videos have been composed utilizing the prototype assembly such as a plasma cutter at 1,000 fps, an arc weld and MiG weld at 5,000 fps, a 6" gun shot at 25,000 fps, flash bang grenade detonation at 8,000 fps, and two different forms of flash bulbs burning directly watching the filaments burn at 10,000 fps, a few examples of the tone-mapped HDR images from the videos can be seen in FIG. 26 in images 2610, 2620 and 2640. Additionally, Tone-mapped frame from a plasma cutter is shown in image 2650 with 22-stops dynamic range, in image 2660 with 24-stops dynamic range in image 2660, and in image 2670 with 26-stops dynamic range. FIG. 30 shows a multi-frame view 3000 of a PF300 flashbulb discharge video. The burning components inside the PF300 flashbulb reached a maximum recorded luminance of about $10^8$ lumens while the beginning background of the scene was in the 100's of lumens spanning a total dynamic range of over seven orders of magnitude. In addition, some frames had more than 25-stops of dynamic range-per-frame.

Figure 31:
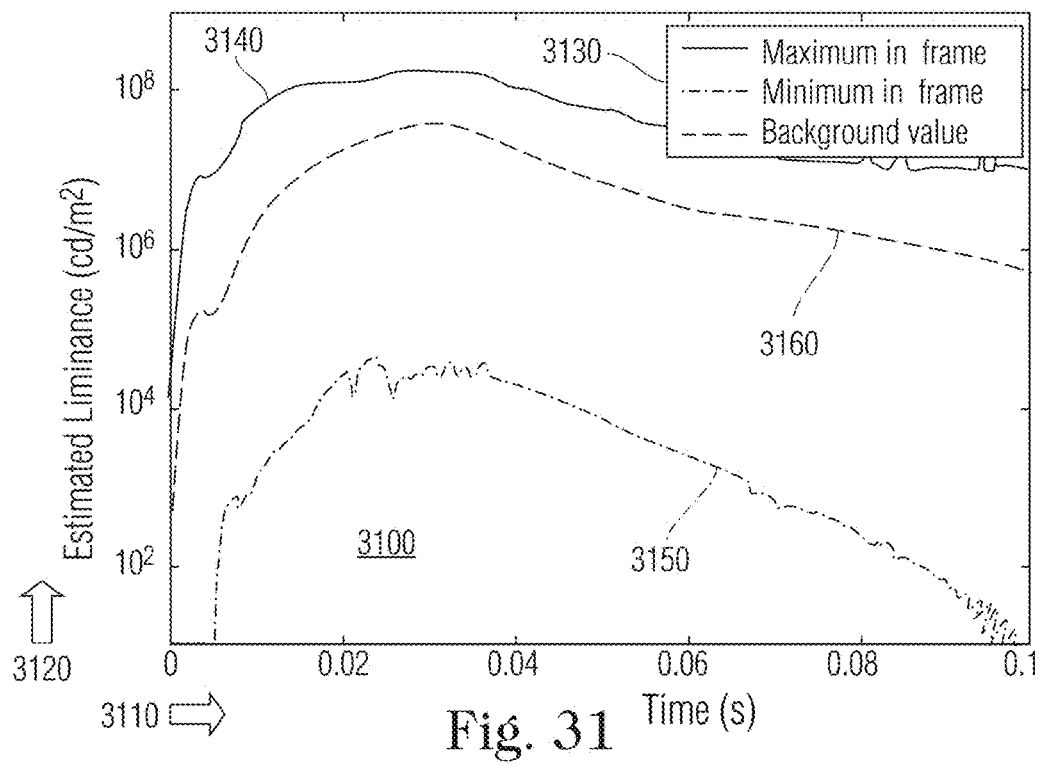
FIG. 31 is a graphical view of a luminance plot.
Figure 32:
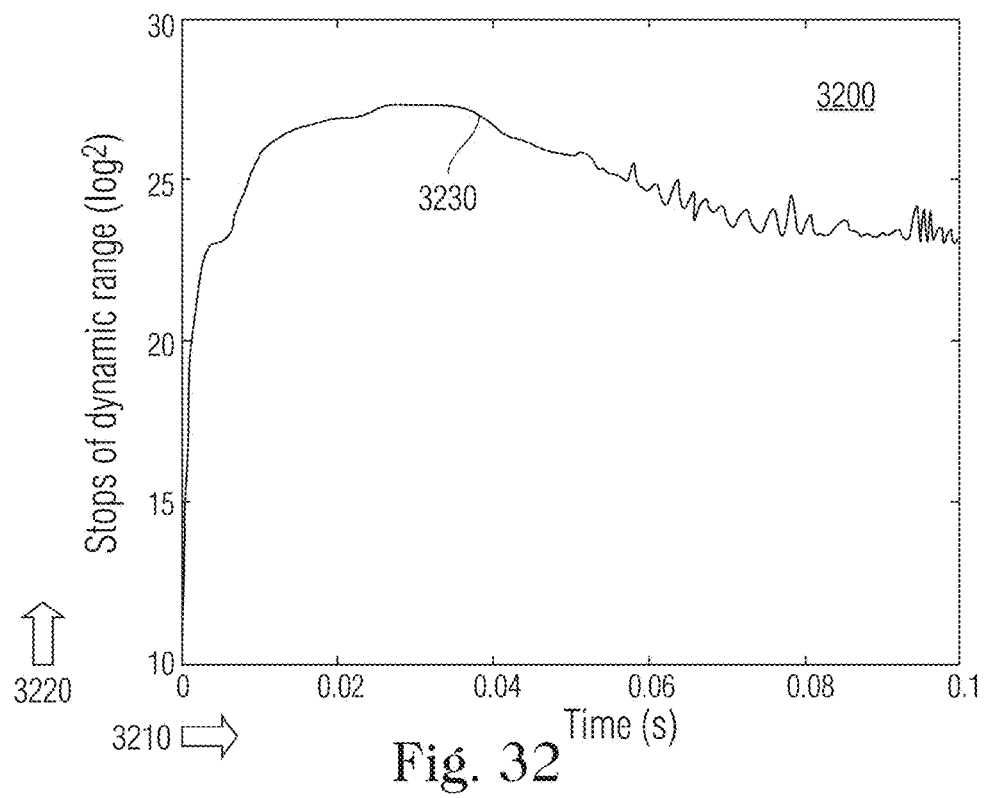
FIG. 32 is a graphical view of a stops-range plot.

FIG. 31 shows a plot view 3100 of luminance range of the PF300 video. Time 3110 in seconds represents the abscissa while estimated luminance 3120 in lux represents the ordinate. A legend 3130 identifies curves for frame maximum 3140, minimum 3150 and background 3160. These plotted curves peak to maximum values at about 0.02 seconds, decreasing gradually thereafter. FIG. 32 shows a graphical view 3200 of dynamic range displayed in each video frame. Time 3210 in seconds represents the abscissa while stops of dynamic range 3220 in steps of $\log_2$ represents the ordinate. A response curve 3230 increases its values in time from a minimum of about ten to a transient maximum of twenty-seven before asymptotically leveling at twenty-three, indicating the stops dynamic range that the encompassed video supporting the asserted range the camera system can acquire.

The PF300 presented challenges in utilizing the spatially varying tone-mapping method. One advantage to this method is the increase in contrast across the entire image. The result is more observable detail in the regions that are large and of a similar luminance. One problem that arises from the spatially variant tone-mapping method occurs in regions of extreme contrast. A haloing effect tends to be observed because the scaling vectors are adding contrast to dark region by varying the intensity of the background. This effect is illustrated in view 3000: image 3010: 33-pixel window; 3020: 121-pixel window; 3030: 901-pixel window; 3040: spatial invariant method. Window sizes were varied to investigate these phenomena. One option to mitigate the haloing effect is a commonly used method that conditions the luminance image by convolving that image with a Gaussian kernel. Then the sliding window operation can be performed on the low pass filtered luminance information for the calculation of the scaling of the pixels based on the smoothed background irradiance image.

This disclosure presents an exemplary process whereby any series of digital (COTS) cameras can be utilized to create a high dynamic range video. This exemplary system can be used to develop a single camera with a single lens and multiple imagers, or use multiple COTS standalone systems. The exemplary process described covers the image formation, which is an expansion of Debevec's previous research. The experimental setup and the tone-mapping of the series of images provide an authentic looking final image correct for viewing on modern low dynamic range media. The tone-mapping method was derived from utilizing the physiological response of the human vision system to compress the irradiance information into the perceptual brightness information. The method described within has been fielded and used to video scenes whose dynamic range exceeds 170 dB or 28-stops at frame rates ranging from 30 fps to 100,000 fps. This method has been used to capture dynamic events without the typical oversaturation that occur in close proximity to explosive events as well as the optical enhancement of events occurring in low light surroundings.

Figure 33:
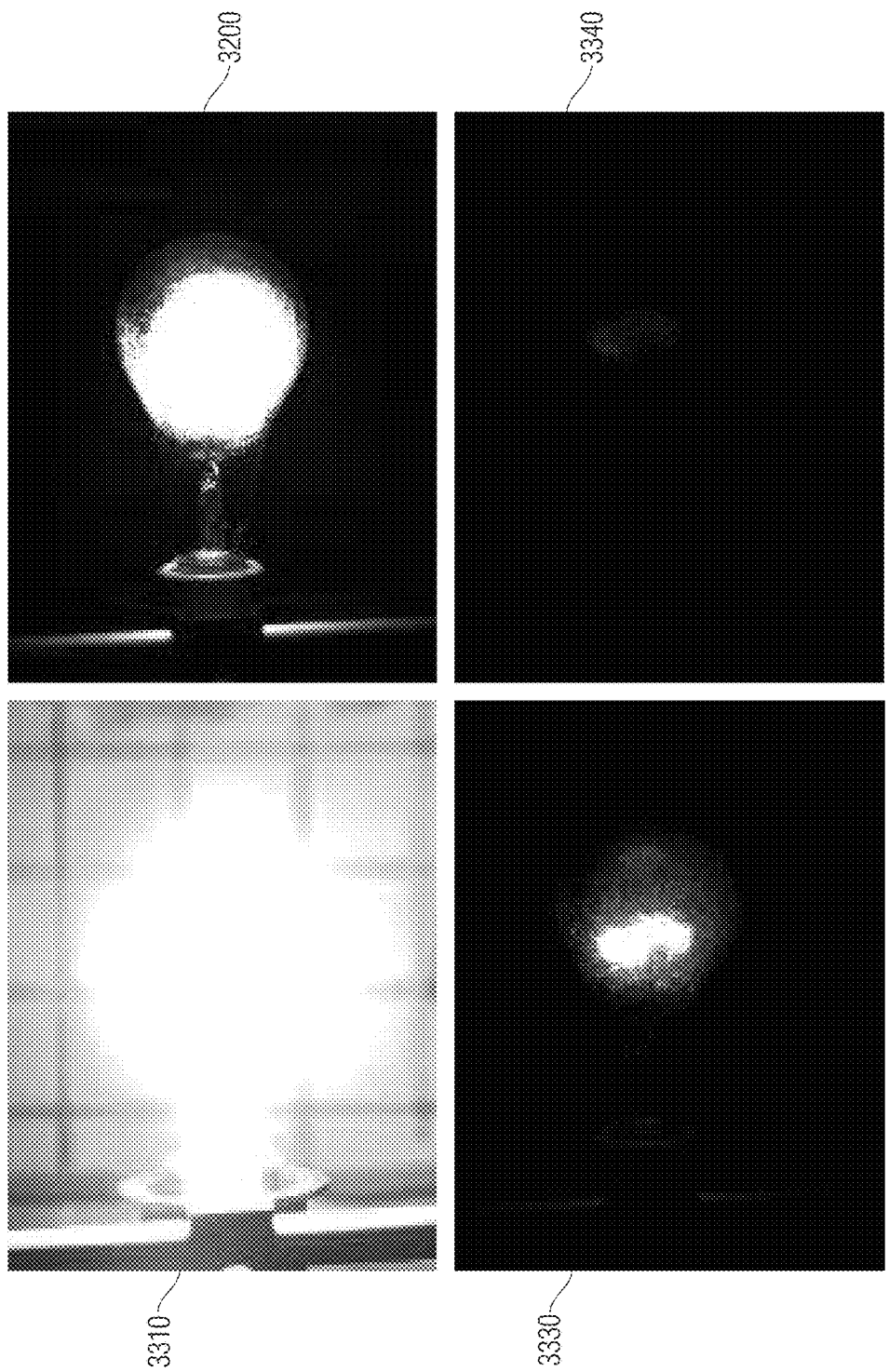
FIG. 33 is a series of image views of a flashbulb simultaneously acquired using various attenuation levels.

FIG. 33 shows a first series 3300 of flash bulb images. These include first maximum exposure 3310 with the bulb obscured by the flash, second lower exposure 3320 in which the bulb outline can be seen but absent the background, third lower exposure 3330 in which the filament can be seen, and fourth minimum exposure being completely dark. Each exposure demonstrates the capability of a conventional high speed camera. The conventional state of the art is being demonstrated on a scene where the dynamic range to be acquired is beyond conventional capabilities.

Figure 34E:
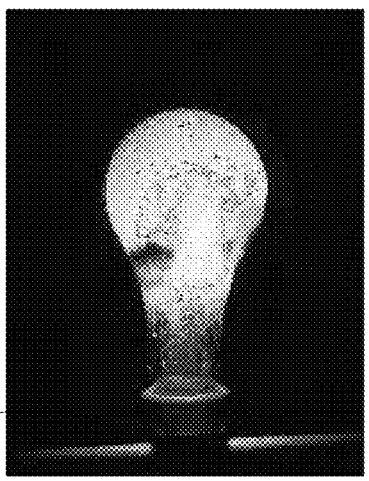
FIG. 34E is the tone-mapped version of the flash bulb HDR image.
Figure 34D:
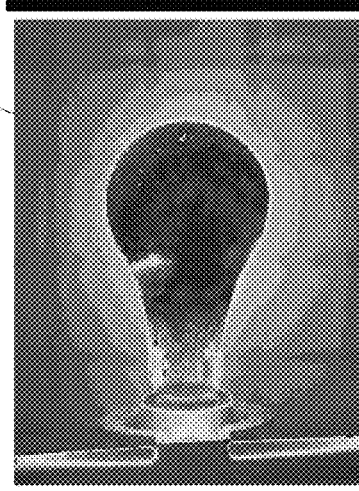
FIG. 34D is a pseudo color image of the calibrated lumins image via the modified Naka-Rushton equation.
Figure 34C:
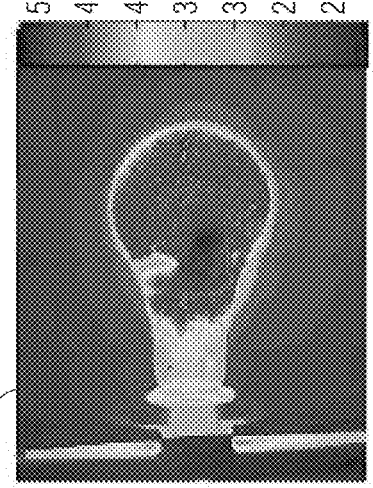
FIG. 34C is a pseudo color image of the Y channel image scaled to unit of lumens through calibration.

FIGS. 34A through 34E show a second series 3400 of flash bulb images. FIG. 34A is the first image 3410 showing the HDR video frame in grayscale. FIG. 34B is the second image with an example exposure 3420 showing the bulb (similar to image 3320). FIG. 34C is the third image 3430 shown log base ten of the estimated luminance in false color. FIG. 34D is the fourth image 3440 being the rescaled luminance by the exemplary global tone-map function, also shown in false color. FIG. 34E is the fifth image 3450, revealing structural detail of the flash within the bulb using the color version of the exemplary tome-map methodology used to display image 3410. FIG. 35 shows a color map view 3500 of luminosity 3510, saturation 3520 and hue 3520 commonly called the hue saturation lightness color map. Luminosity 3510 and saturation 3520 range from zero to one-hundred, while hue extends in a circle by degrees.

Figure 36:
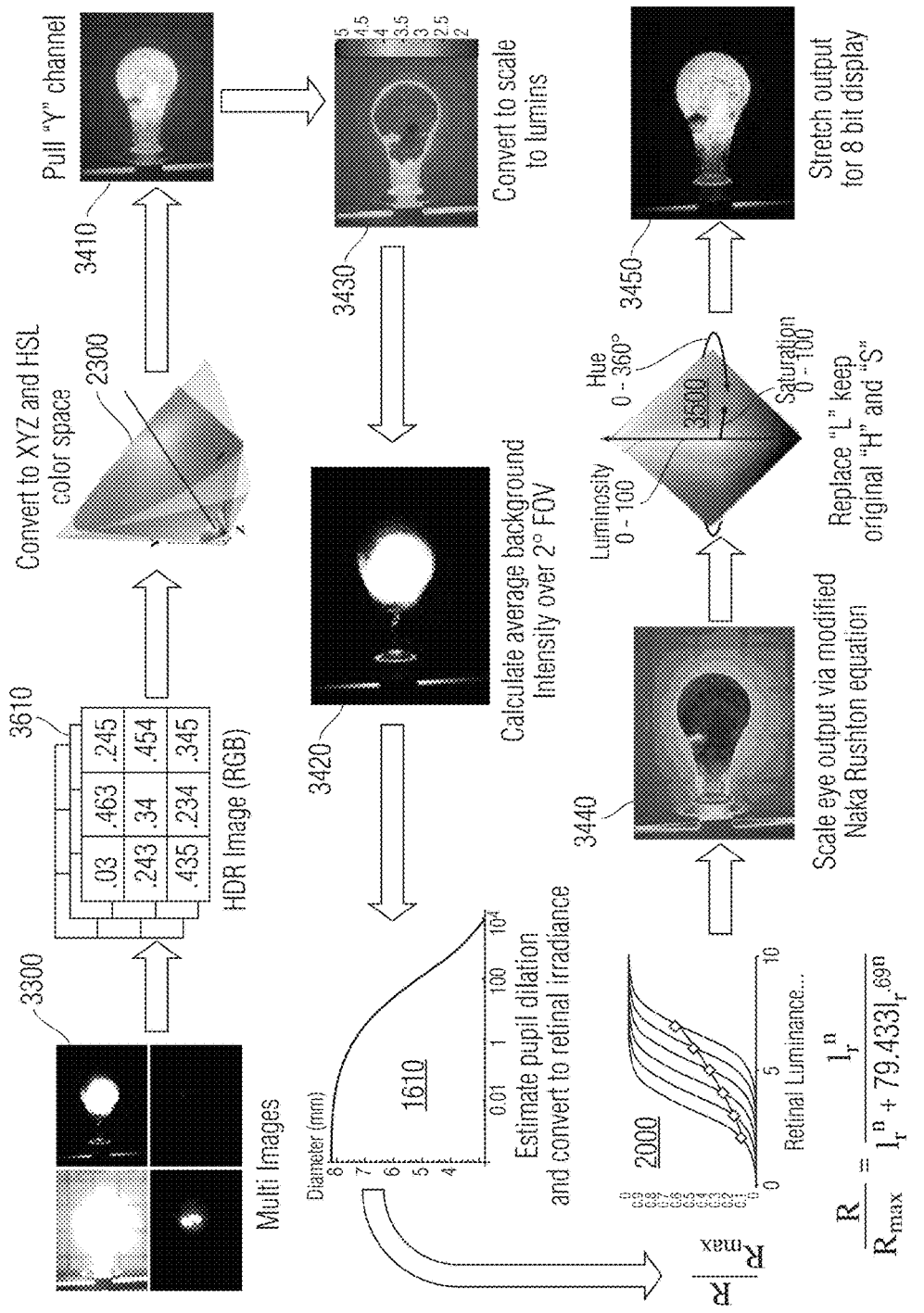
FIG. 36 is a diagram view of a tone-mapping methodology enhancing flowchart.

FIG. 36 shows a process view 3600 of the operations to achieve high dynamic range video imaging. Multiple images 3300 are digitized from a HDR image to RGB values 3610 and converted to XYZ and HSL color spaces 2300. The process stretches the Y channel 3410, converts the scaling to lumens 2530, calculates average background intensity 3420, estimates pupil dilation 1600, determines retinal luminance 2900, scales Naka-Rushton eye output based on eqn. (65) 3440, replaces lightness channel and retains hue and saturation channels 3500, and stretches output for 8-bit display 3450.

Figure 37:
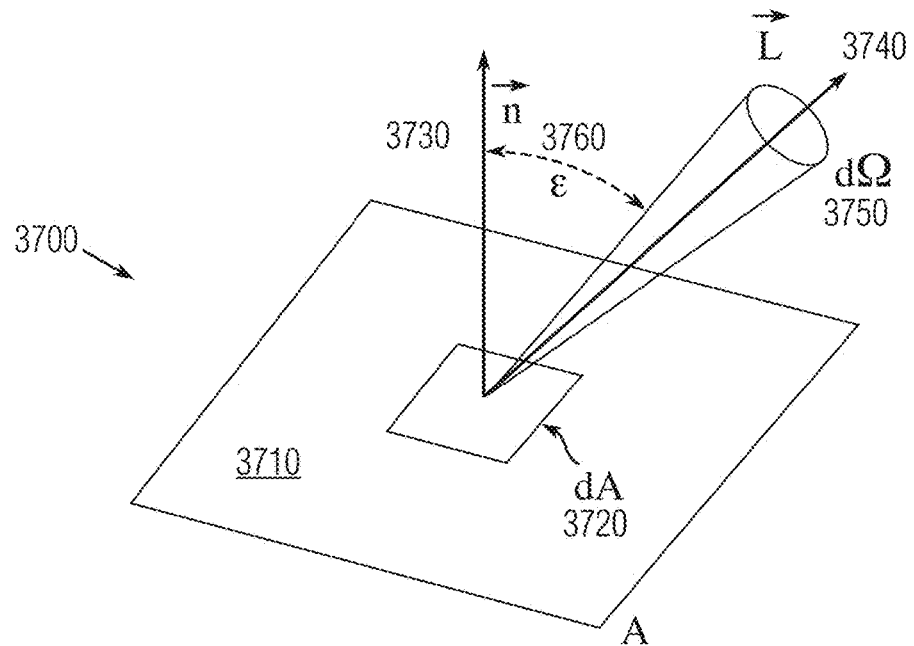
FIG. 37 is a vector diagram demonstrating the concept or the radiometric unit radiance, watts per steridian per square meter.

FIG. 37 shows a vector diagram view 3700 to explain the concept of radiance as power flux over a unit arc in watts-per-square-meter-per-steridian. A plane 3710 represents a reflective surface A on which a small area dA as a shaded region 3720 corresponding to a point source. A normal vector 3730 extends as $\vec{n}$ from the region 3720. A radiance vector 3740 denoted as $\vec{L}$ projects with conic spread 3750 as dΩ and offset from the normal vector 3730 by angle 3760 as error ε.

Figure 38E:
Figure 38F:
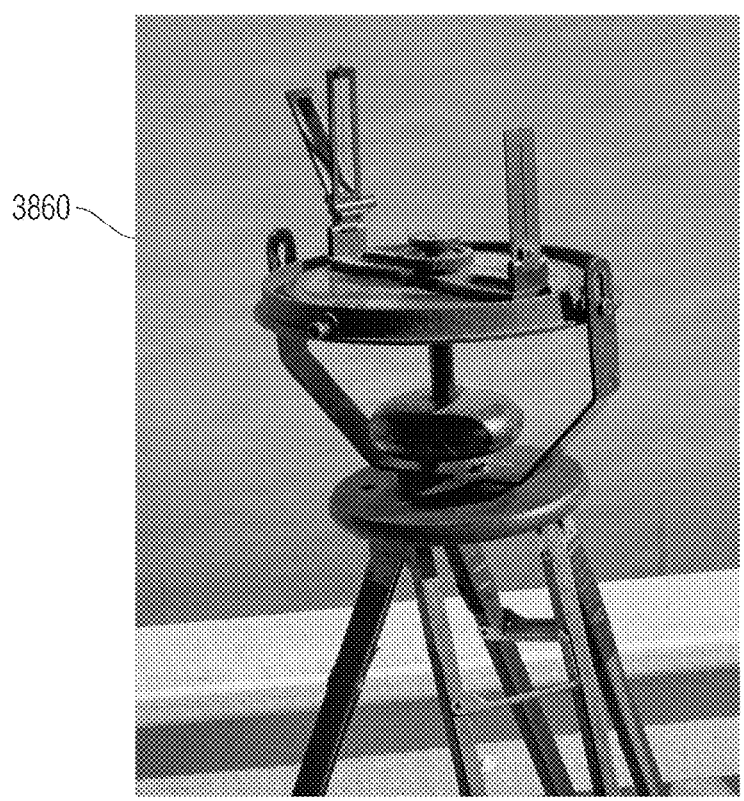

FIGS. 38A through 38D show a second series 3800 of theodolite images at different exposures. FIG. 38A is the first image 3810 showing the theodolite well defined but background washed out. FIG. 38B is the second image 3820 showing more background but with less contrast for the theodolite. FIG. 38C is the third image 3830 with both theodolite and background underexposed. FIG. 38D is the fourth image 3840 with both theodolite and background overexposed. FIG. 38E is the fifth image 3850 as an HDR image of the theodolite scaled to lumens. FIG. 38F is the sixth image 3860 with both theodolite and background in maximum contrast, created by using the exemplary tone-mapping routine on the HDR information created from the exposures seen in images 3810, 3820, 3830 and 3840 and then redacted in image 3850.

Figure 39:
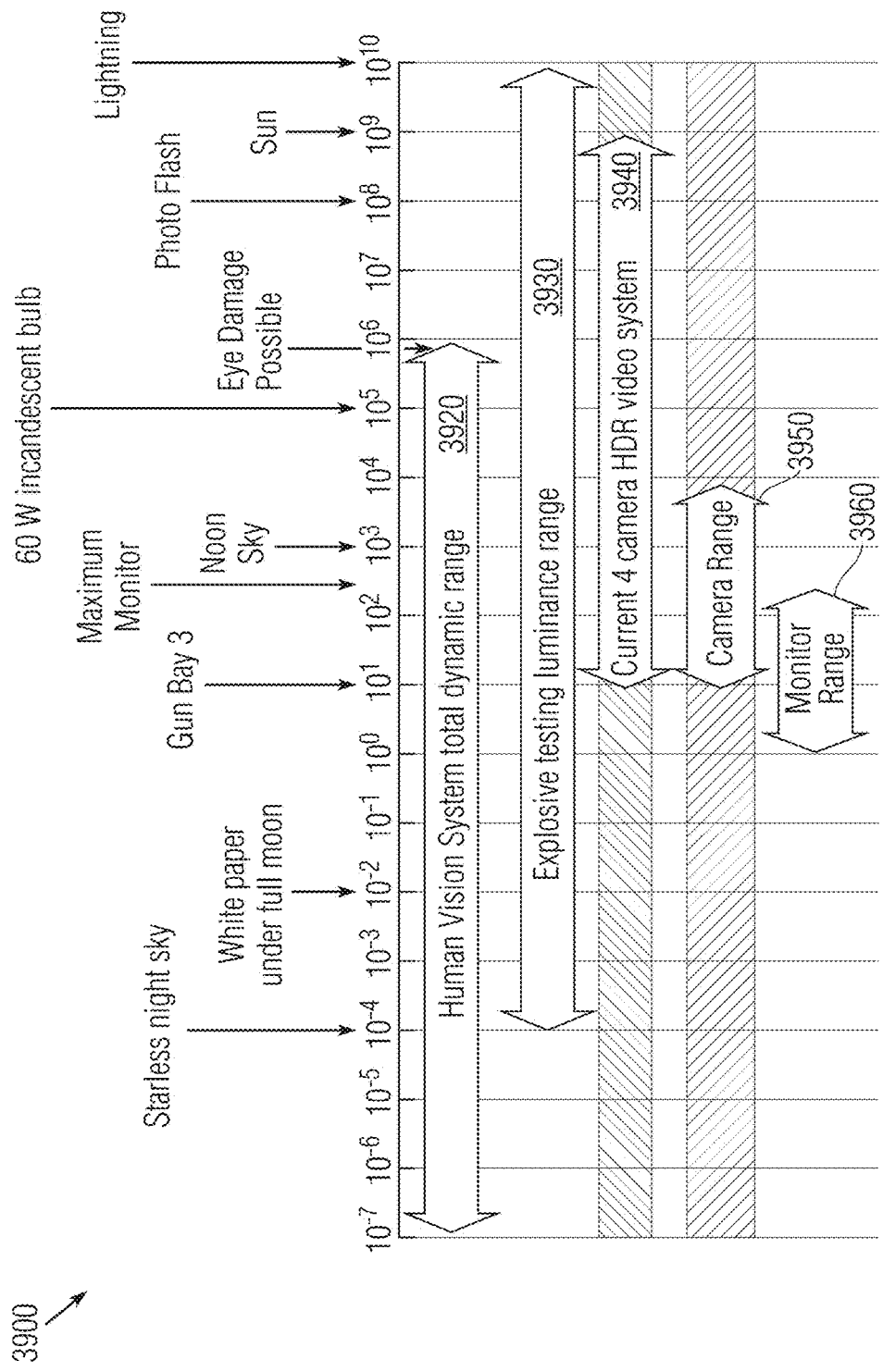
FIG. 39 is a linear diagram of typical luminance magnitudes for various events and the brightness ranges in which test, acquisition, and replay occur.

FIG. 39 shows an electromagnetic sensitivity diagram view 3900. A logarithmic luminance line 3910 provides a scale for photon emission intensity. Human vision dynamic range 3920 from darkened room to beyond a 60 watt incandescent bulb stretches across thirteen orders of magnitude. Explosive testing luminescence 3930 ranges in controlled emission from a starless night sky to lightening over fourteen orders of magnitude. The exemplary four-camera HDR video system 3940 extends over eight orders of magnitude and beyond the upper range of human vision. Conventional intensity ranges include cameras and monitoring equipment that exhibit about three orders of magnitude. This viewgraph shows the acquirable dynamic range of a typical camera, the purple arrow. The HDR video system arrow 3940 indicates the range the exemplary technique has been demonstrated to acquire. The other ranges are for comparison.

Figure 40:
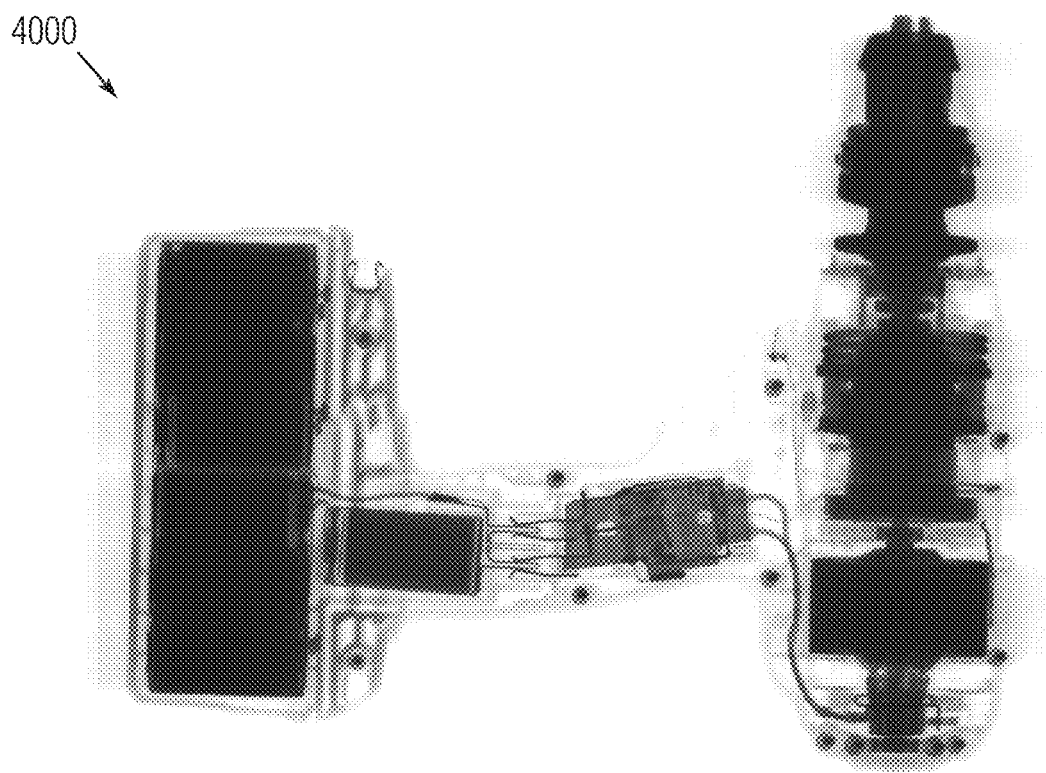
FIGS. 40, 41, 42 and 43 are elevation see-through views of an electric drill from scanned X-ray film with differing emission strength of duration for varying exposure.
Figure 41:
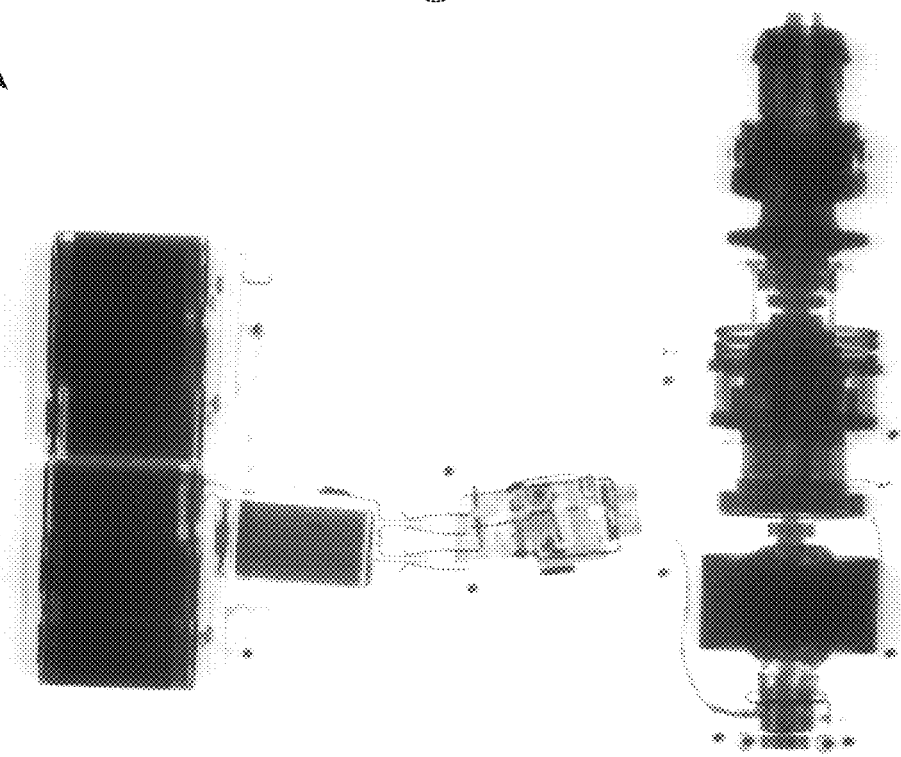
Figure 42:
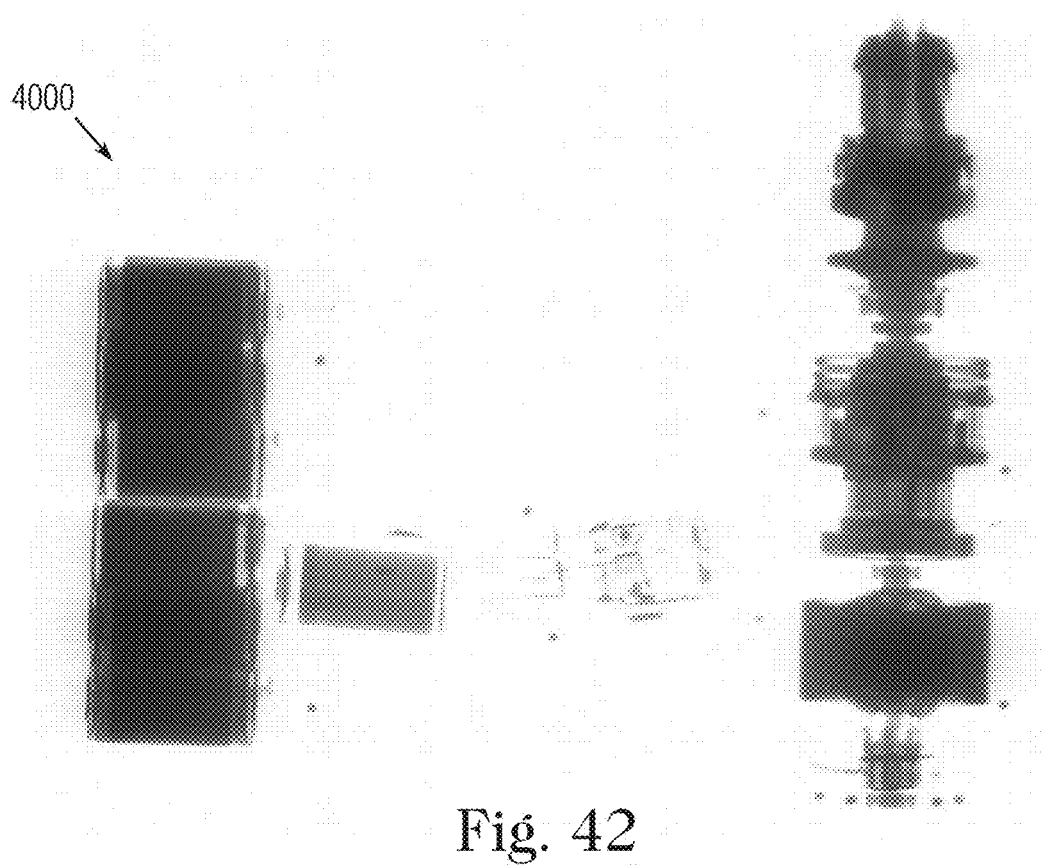
Figure 43:
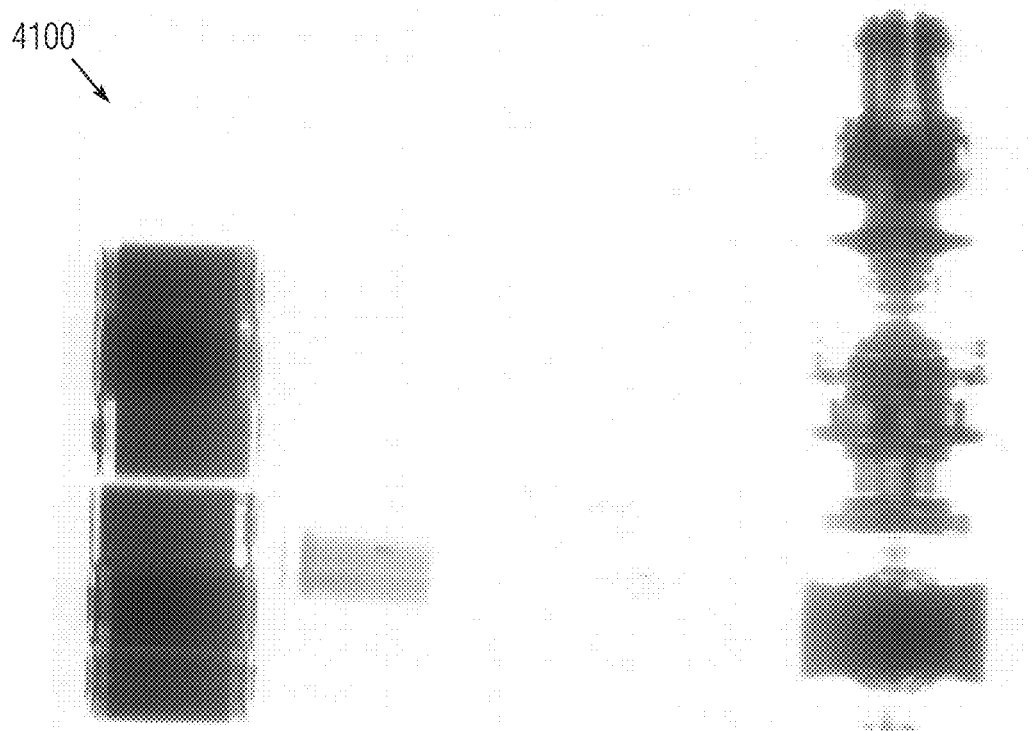

FIGS. 40 through 43 show elevation X-ray penetration views of a cordless electric drill for various exposures. FIG. 40 shows an X-ray image view 4000 at minimum exposure. This image reveals details of switching components in the grip handle can be discerned, while obscuring the denser gearing components in the housing and batteries in the base. FIG. 41 shows an X-ray image view 4100 at a first intermediate exposure. FIG. 42 shows an X-ray image view 4200 at a second intermediate exposure. These intermediate images highlight somewhat more texture for the gears while washing out components in the handle. FIG. 43 shows an X-ray image view 4300 at maximum exposure, revealing some structures for the housing and base. One can observe that the handle is not visible in this view.

Figure 44:
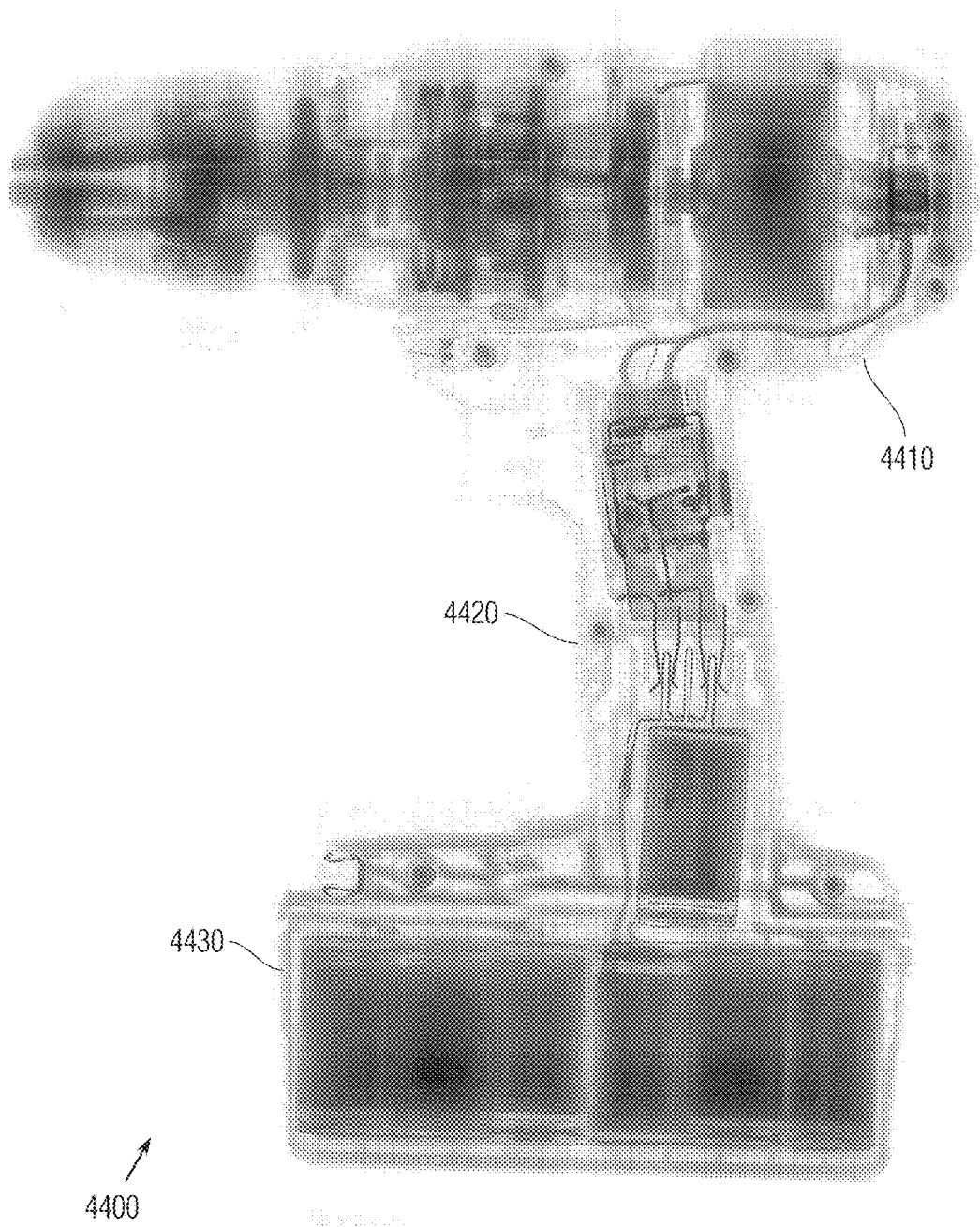
FIG. 44 is an elevation see-through amalgam view of the electric drill reconstruction.

FIG. 44 shows an X-ray view 4400 of the tone-mapped HDR drill image created using the exemplary tone-mapped method and image combination technique, thereby demonstrating that the HDR image formation and mapping extends to film and multiple spectrums, including X-ray. Various details for the housing and internal components can be observed for the motor housing 4410, handle 4420 and battery-containing stand 4430. The tone-mapped HDR X-ray image enables the discrimination of components with a very wide range of absorbance, such as for example the copper windings on the motor and permanent magnet surrounding it simultaneously with the low absorption material such as the plastic housing and fiber circuit board, both of with are not discernable in any one of the exposure seen in FIGS. 40 through 43.

Figure 45:
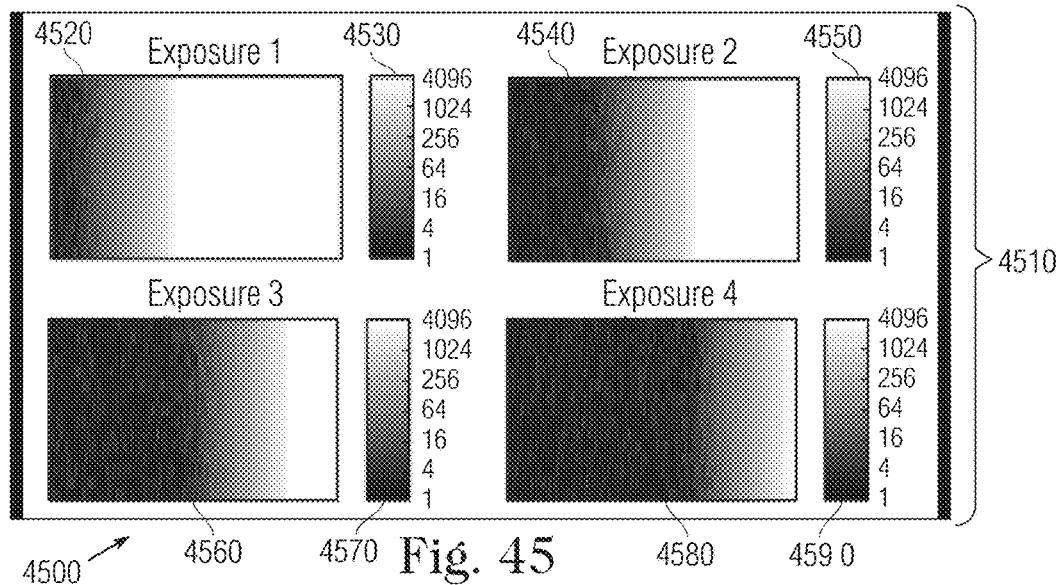
FIG. 45 is a diagram view of simulated different exposures.
Figure 46:
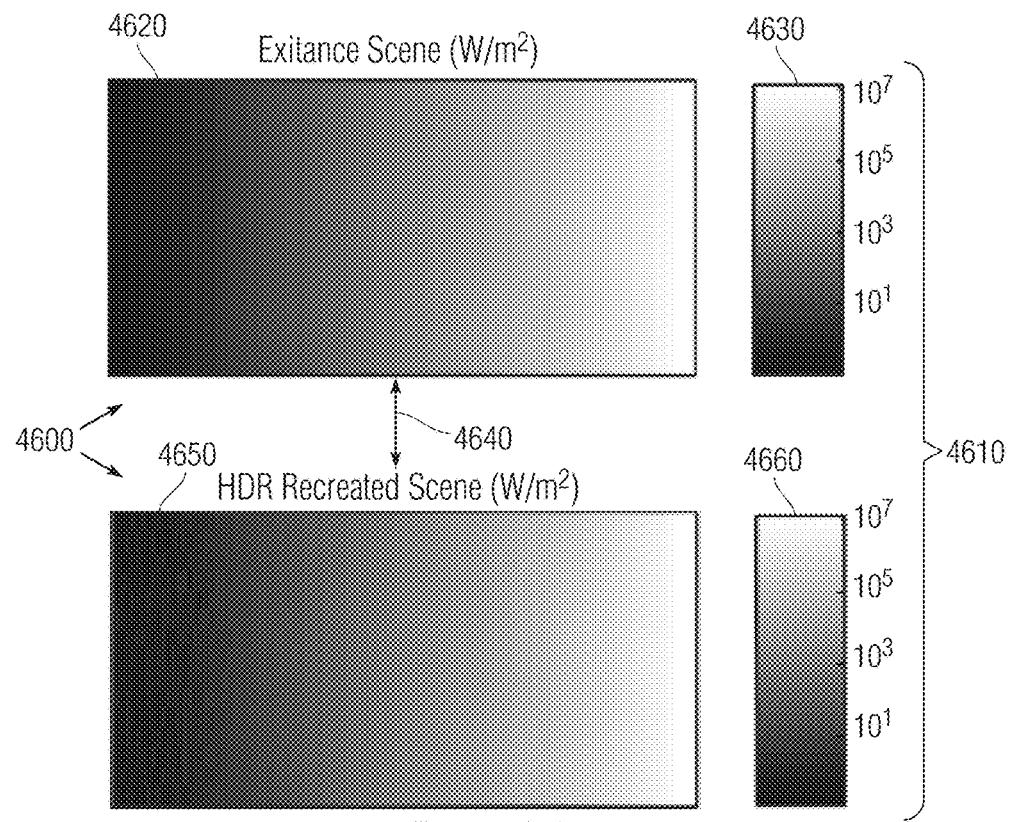
FIG. 46 is a diagram view of scene transition from simulated mean radiant exitance to radiant exitance with additive shot noise.

FIG. 45 shows an image simulation view 4500 of varying exposures with a set of exposures 4510. These include first exposure 4520 with associated scale 4530, second exposure 4540 with associated scale 4550, third exposure 4560 with associated scale 4570 and fourth exposure 4580 with associated scale 4590. The exposures 4520, 4540, 4560 and 4580 transition from lighter (more exposure) to darker (less exposure). The scales 4530, 4550, 4570 and 4590 range from $2^0$ (=1) to $2^{12}$ (=4096). FIG. 46 shows an exitance contrast scale view 4600 with a set of scenes 4610. The first as an exitance scene 4620 (in watts-per-square-meter) with associated scale 4630 transitions as 4640 to the second as HDR recreated scene (same units) with associated scale 4660. The scenes 4620 and 4650 render darker-to-lighter gray shift to become broader and smoother across the transition 4640. The scales 4630 and 4660 range from zero to $10^7$.

Figure 47:
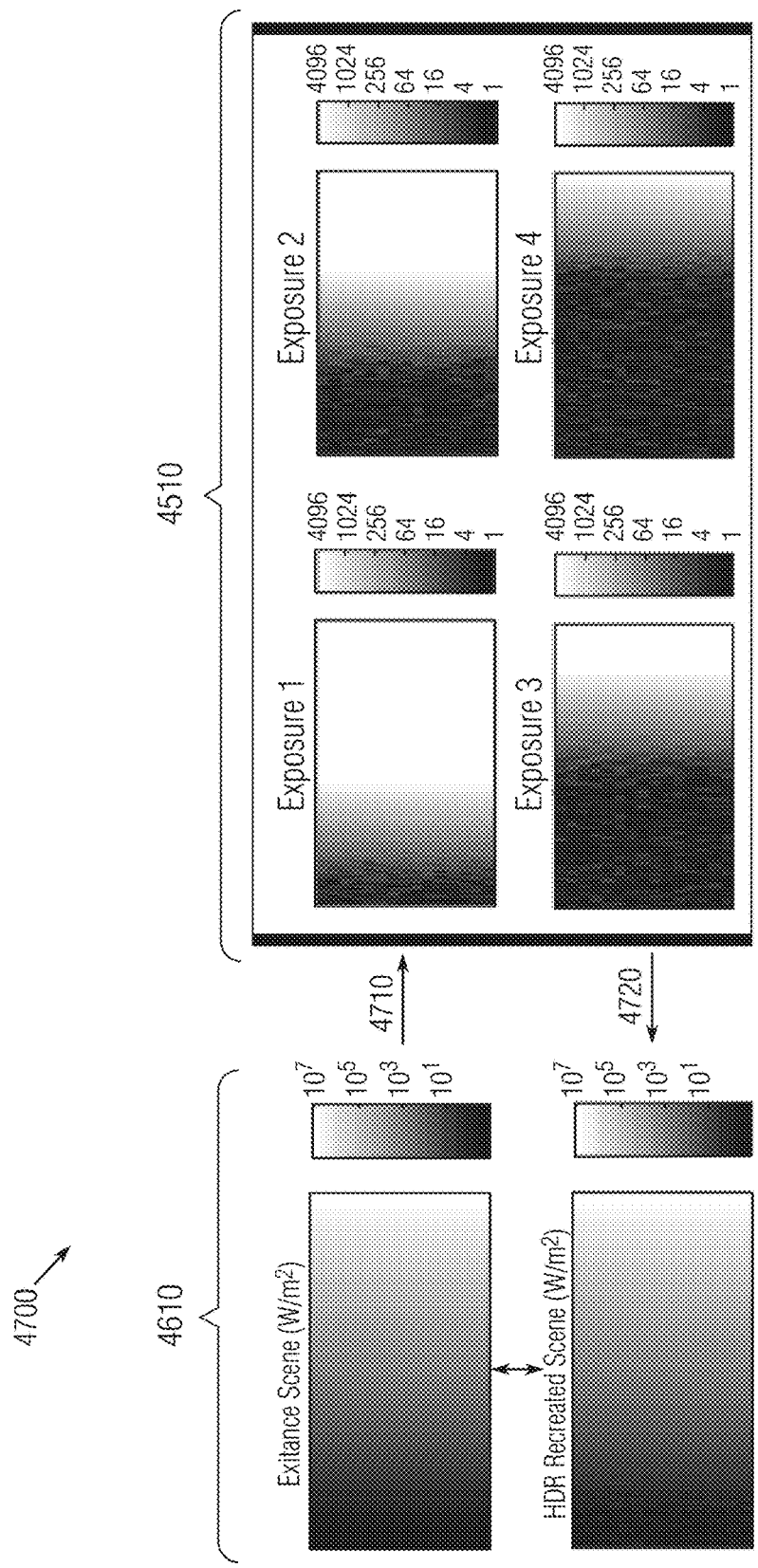
FIG. 47 is a diagram view of transition from simulated mean radiant exitance to estimate HDR output.

FIG. 47 shows a transition process view 4700 from the scene set 4610 to the exposure set 4510 and back by respective first and second transitions 4710 and 4720. In scene 4620, the scene radiance exitance is generated, then shot noise added. In exposure set 4510, the sensor charge accumulation is calculated and read and dark current noise added. The data is discretized to form individual exposures and induce quantization error. In scene 4650, the individual exposures are used to form an HDR image. The HDR image can be compared to the original scene exitance to find the error associated with the formation process.

FIG. 48 shows an exitance estimate view 4800 as an estimate set 4810 containing an estimate image 4820 and associated scale 4830. The image 4820 provides graduated gray scales darkening (reducing) from zero to about a hundred along the left portion, and lightening through the one-million along the right portion. The scale 4830 ranges from zero to $10^6$. View 4800 illustrates the recreated radiant exitance constructed from the four simulated images seen view 4500, each four stops apart using the Debevec weighting function. FIG. 49 shows a percent error view 4900 as an error set 4910 containing an error image 4920 and associated scale 4930. The image 4920 corresponds to maximum error along the left from zero to about twenty, reducing to minimal error at about two-hundred, reversing to increase again until about eight-hundred, after which minimizing through the remainder of the panel's right portion. The scale 4930 ranges from zero to one-hundred as percentages. View 4900 illustrates the percent error associated with each pixel with respect to the actual value.

Figure 50A:
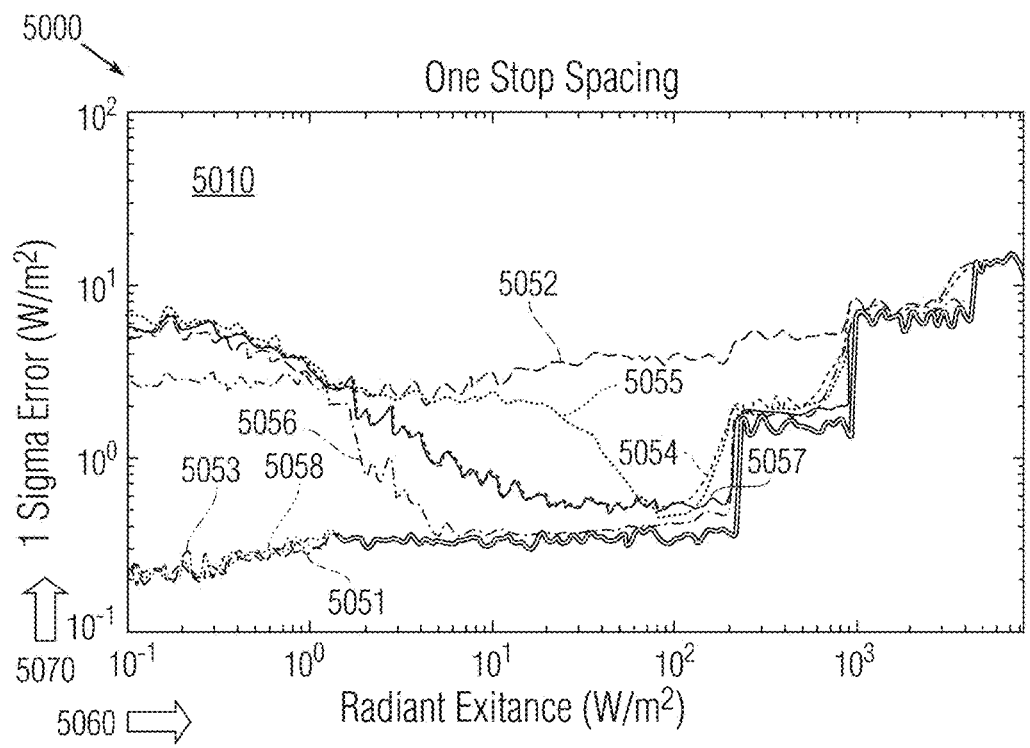
FIGS. 50A, 50B, 50C and 50D are graphical views of error variation with radiant exitance for different spacing stops.
Figure 50B:
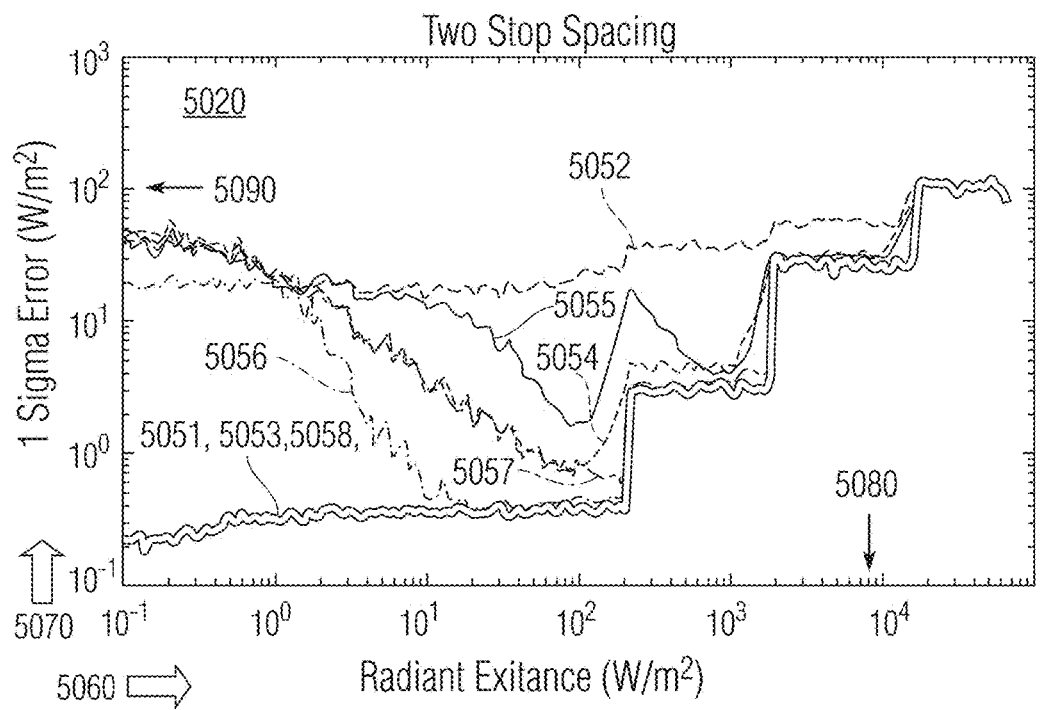
Figure 50C:
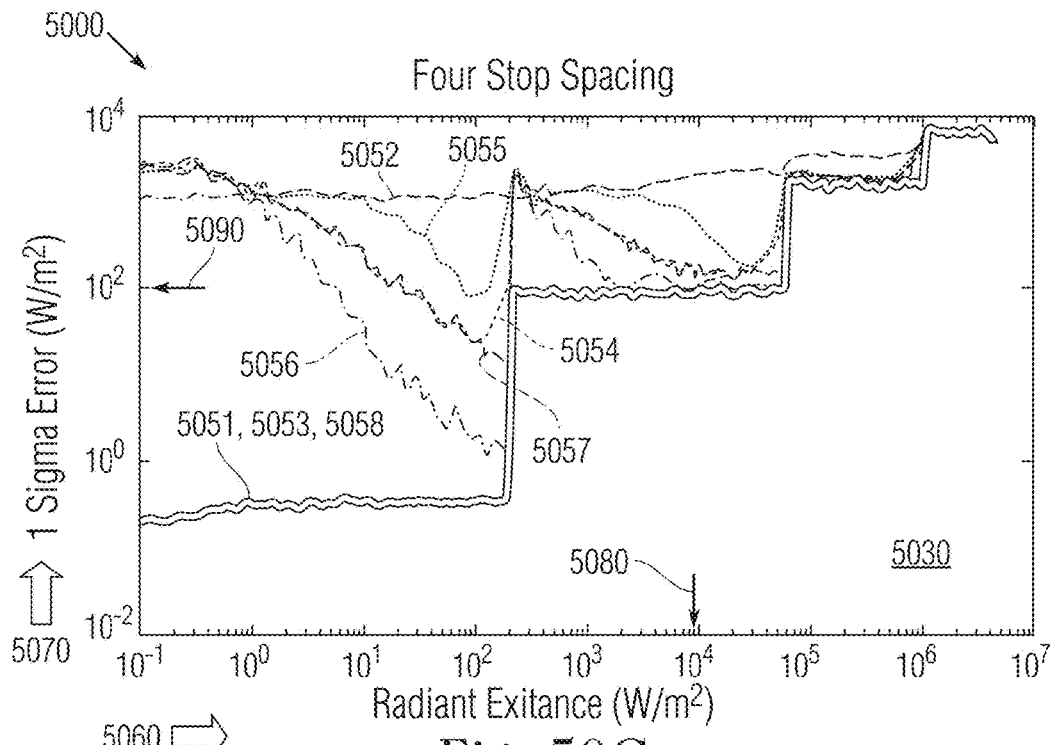
Figure 50D:
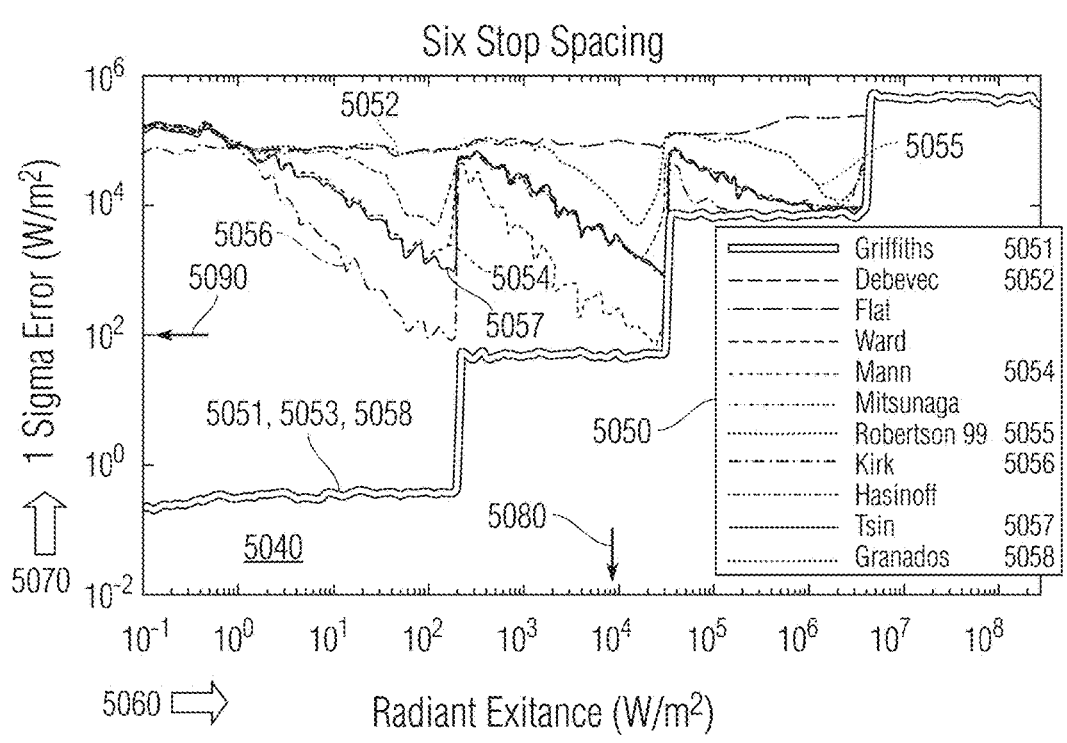

FIGS. 50A through 50D illustrate graphical views 5000 of mean signal errors for a given radiant exitance value. FIG. 50A shows a first plot 5010 of sigma error response to radiant exitance for one-stop spacing. FIG. 50B shows a second plot 5020 of signal error response to radiant exitance for two-stop spacing. FIG. 50C shows a third plot 5030 of sigma error response to radiant exitance for four-stop spacing. FIG. 50D shows a fourth plot 5040 of standard deviation error response to radiant exitance for six-stop spacing. For each of these graphs, a legend 5050 identifies the weighting sources, radiant exitance 5060 in watts-per-square-meter (W/m²) denotes the abscissa, and one-sigma error 5070 also in watts-per-square-meter denotes the ordinate. The exitance 5060 and error 5070 scales expand as stop spacing increases. This is demonstrated by the scale boundaries for the first stop 5010 for the abscissa 5080 and ordinate 5090 in the multi-stop plots 5020, 5030 and 5040. In all cases the simplified weighting function performed nearly identically to the recursive methods. For at least some of the sources in the legend 5050, the respective errors increase discontinuously with existence.

Figure 51:
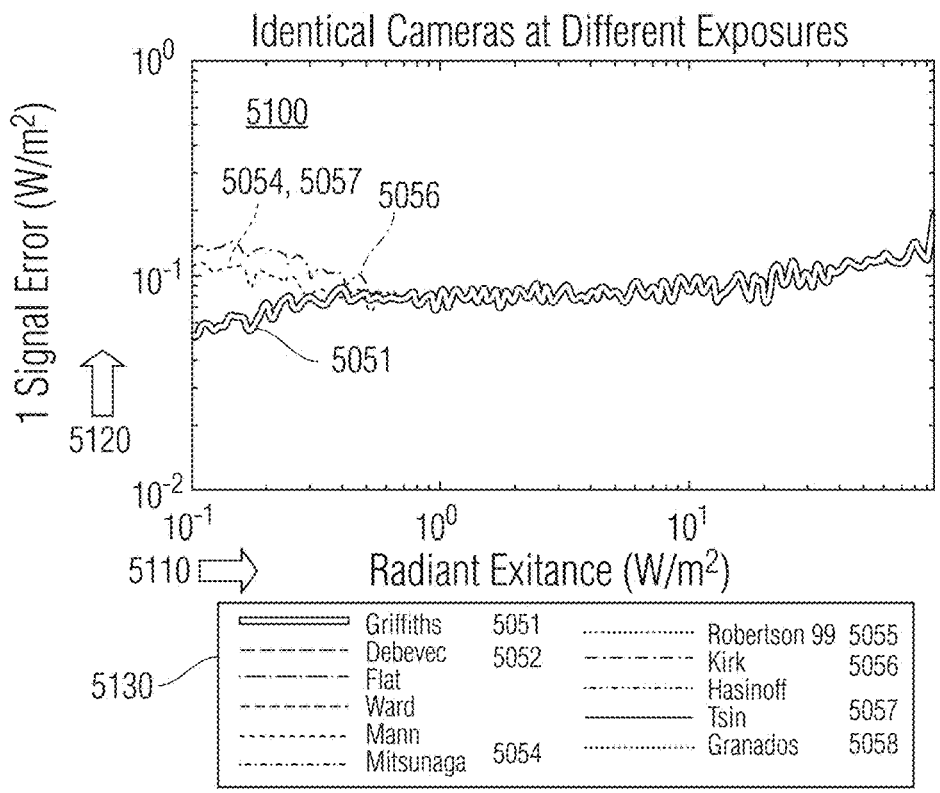
FIG. 51 is a graphical view of error variation with radiant exitance for identical camera settings at different exposures.
Figure 52A:
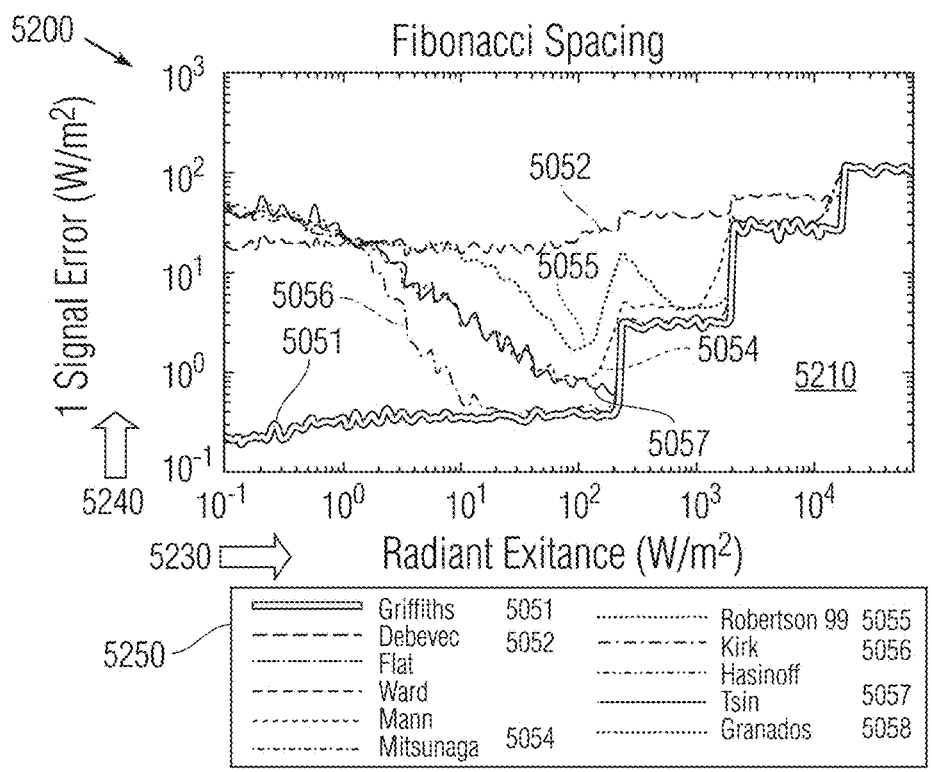
FIGS. 52A and 52B are graphical views of error variation with radiant exitance for different spacing measures.
Figure 52B:
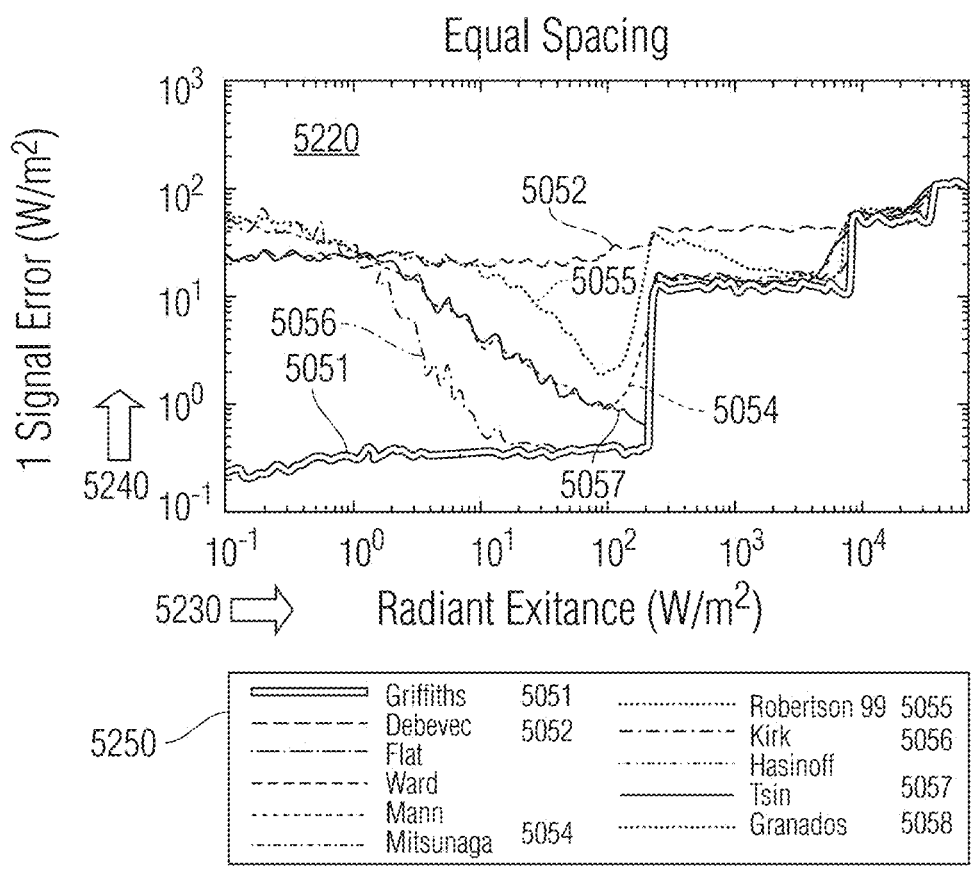

FIG. 51 shows a graphical view 5100 of one-sigma error using identical camera settings for all four exposures. Radiant exitance 5110 denotes the abscissa while one-sigma error 5120 represents the ordinate, while the sources are identified by corresponding lines in the legend 5130. With modest divergence at low exitance values, the lines from all sources substantially remain within an error range between 0.06 and 0.2 across exitance values to about one-hundred. FIGS. 52A and 52B show graphical views 5200 of one-sigma error variation with radiant exitance for different spacing measures. FIG. 52A shows a first plot 5210 of two-stop spacing of the mean square error, created using a Fibonacci exposure spacing. FIG. 52B illustrates a second plot 5220 of an estimated error if the four cameras had equal attenuation levels but spanned the same range. For both graphs, radiant exitance 5230 denotes the abscissa, one-sigma error 5240 denotes the ordinate, and a legend 5250 identifies the weighting sources. The units for views 5100 and 5200 are the same as provided in view 5000.

The exemplary camera simulation model also enables investigating the effect of varying camera attenuation spacing. One such exposure time spacing proposed by Gupta is a Fibonacci spacing. Gupta indicated the Fibonacci spacing can be used for the reduction of error in the overall image formation. Utilizing the simulation methodology this claim can be tested and compared to others. Plots 5020 and 5210 show the error associated with a Fibonacci spacing of [1 4 16 64] times attenuation, and plot 5220 shows the error on formation utilizing an even spacing of [1 16 32 64] times attenuation. FIGS. 52A and B validate the reduction of error in some cases, while in others the error is increased. One such example can be seen in the radiant exitance range of 200 W/m² through 10⁴ W/m². The range from 200 W/m² through 2 kW/m² has nearly a 72% reduction in error in the Fibonacci spacing when compared to the equally spaced camera settings. However, in the range of 2 kW/m² to just below 10⁴ W/m², there is nearly a 50% increase in error for the Fibonacci spacing when compared to equal spacing.

Architecture Optimization:

FIG. 53 shows a diagram view 5300 of signal processing in the exemplary system. A photon emission source produces an incident flux 5310 that is attenuated by a filter 5320. The passing photons are captured 5330 in a charge accumulator and amplified 5340 in an amplifier, followed by digital quantization 5350. The HDR camera system can be modeled according to the process depicted in view 5300, with the incident photon flux 5310 attenuated, converted to charge, amplified, discretized and stored. The HDR camera system can be modeled according to the process depicted in view 5300. First, the incident photon flux φ defined by eqn. (2) enters the leading beam-splitter. Some of the light will be reflected, transmitted or scattered by each beam splitter multiplicatively. The light is further attenuated by a neutral density filter and collimated by the physical aperture of the lens on the camera, reducing the overall photon flux to the imager. The attenuation for the camera system $A_{phy}$ can be defined by eqn. (54). Under the assumption the object being viewed is significantly further than the focal length the ratio $s_2/s_1$ tends to zero and can be omitted from eqn. (54). Applying eqn. (54) to the camera model proposed by Fiete, the charge accumulation for a camera s can be defined as $$s = \frac{A_{phy} \Delta t A}{hc} \int_{\lambda_{min}}^{\lambda_{max}} \eta(\lambda) L_{scene}(\lambda) \lambda d\lambda, \quad (80)$$

where A is the active area of the pixel, $\Delta t$ is the exposure time, $\eta$ is the quantum efficiency of the sensor at a given wavelength, $L_{scene}$ is the spectral radiance of the scene, and $\lambda$ is the wavelength of light.

The next process in FIG. 53 is amplification 5340. Simplifying eqn. (80) by assuming monochromatic light, and adding in the sensor gain, the charge accumulation for a camera J and pixel i can be defined as:

$$s_{ij} = \frac{\Delta t_{ij} A_{phy,j} g_j A \eta \lambda}{hc} \Phi_i. \quad (81)$$

The charge is then discretized 5350 using:

$$s_{ij} = \frac{q_s \Delta t_{ij} A_{phy,j} g_j A \eta \lambda}{N_{well} hc} \Phi_i. \quad (82)$$

where $N_{well}$ is the deep well capacity of the sensor and $q_s$ is the number of discretization steps from the camera's analog-to-digital (A/D) converter. Rearranging eqn. (81) enables estimation of the radiant exitance from a digital value $Z_{ij}$ given by eqn. (6).

The maximum radiant exitance that can be acquired can be defined when the digital value is equal to the number of quantization levels, the minimum of the physical attenuation, exposure time and gain, defined as:

$$\Phi_{max} = \frac{N_{well} hc}{\min(\Delta t A_{phy} g) A \eta \lambda}, \quad (83)$$

where min(•) is the minimum of the set. A weighted average is the maximum likelihood estimator used to find the radiant exitance estimate of the scene from the various Wycoff layers. The HDR estimate $\Phi_{HDR,i}$ can be found using:

$$\Phi_{HDR,i} = \frac{N_{well} hc}{q_s A \eta \lambda} \sum_{j=1}^{J} w_{ij} \frac{Z_{ij}}{\Delta t_j A_{phy,j} g_j} \left( \sum_{j=1}^{J} w_{ij} \right)^{-1}, \quad (84)$$

where J is the number of cameras used in the system. When a nonlinear camera is being used, eqn. (84) can be modified according to Debevec. However, almost all sensors have a linear response before software compression, therefore eqn. (84) is valid when utilizing the raw camera output. Shot noise arises from the light traveling in energy quanta and is therefore modeled by a Poisson distribution. With large arrival numbers, this can modeled as a Gaussian distribution. The shot noise can be defined as eqn. (49). Attenuation 5320 of the radiant exitance occurs before reaching the sensor for charge accumulation 5330. Therefore the shot noise, being proportional to the mean of the radiant exitance, will also be reduced. The shot noise at the sensor sight can be defined as:

$$\sigma_{ss,ij} = \sqrt{\frac{hc}{A_{phy,j}\Delta t_j A \lambda}\Phi_i}, \qquad (85)$$

and the read and dark current noise can be estimated by eqn. (51). The weighting function that has been found to minimize the error on formation is proportional to the reciprocal of the total variance in the system. A simplified version of these weighting functions has been found to be $$w_{ij} = (\sigma_{ss,ij}^2 + \sigma_{ADJ,ij}^2)^{-1}. \qquad (86)$$

Non-Dimensionalizing the Governing Equations:

In order to have a generalized analysis of a camera system, the governing equations need to be non-dimensionalized, as indicated by an asterisk (*) superscript. FIG. 54 shows a tabular view 5400 of parameters 5410 and description 5420 in two columns. The non-dimensional equations can be used to generate non-dimensional images that can later be recombined to form a non-dimensional HDR image. Then through an analysis of experiments, the ideal attenuation settings can be found by maximizing an objective function. A listing of all the parameters used to non-dimensionalize the characteristic equations can be found in FIG. 54 as Table IV. Parameters that have units of ADU are normalized by the number of quantization steps. Parameters that have units of W/m² are normalized by the maximum radiant exitance the camera system can measure. Terms that are in units of charge were normalized by the deep well capacity of the sensor. Other terms such as exposure time, gain and physical attenuation were normalized by the reciprocal of the minimum value they can acquire. The radiant exitance must be modeled as a non-dimensional parameter and can be defined as:

$$\Phi_i^* = Z_{ij}^* A_{phy,j}^* g_j^* t_j^*, \qquad (87)$$

and acquires a value in the interval:

$$\Phi_i^* \in \left[10^{\frac{DR}{20}}, 1\right], \qquad (88)$$

where DR is the dynamic range of the camera system in units of decibels and is defined by:

$$DR = 20\log_{10}\left(\frac{\Phi_{max}}{\min(\Phi)}\right) = 20\log(q_s). \qquad (89)$$

The shot noise from eqn. (85) can be modeled using $$\sigma_{sw,ij}^* = \sqrt{\frac{\Phi_i^* t_j^*}{\eta^*}\min(A_{phy})\min(g)}, \qquad (90)$$

where $\min(A_{phy})$ is the minimum value of physical attenuator vector and can be found from:

$$\min(A_{phy}) = \frac{q_s \max(A_{phy}tg)}{\min(tg)10^{\frac{DR}{20}}}. \qquad (91)$$

For the high speed HDR video system, the gain and the exposure time is held constant across all cameras, therefore eqn. (91) can be reduced to $$\min(A_{phy}) = \frac{q_s \max(A_{phy})}{10^{\frac{DR}{20}}}, \qquad (92)$$

where $\max(A_{phy})$ is the physical constraint of the architecture from the reflectance of the first beam splitter and smallest f/# lens that can be used. Note that eqn. (90) indicates the shot noise will decrease as the exposure time increases. Preferably, one would increase the exposure time as much as possible to reduce this source of noise. After attenuation, the mean radiant exitance is reduced, therefore reducing the shot noise at the sensor site. The non-dimensional shot noise at the sensor site is defined as $$\sigma_{sw,ij}^* = \sqrt{\frac{\Phi_i^* A_{phy,j}^* t_j^*}{\eta^*}\min(g)}. \qquad (93)$$

The incident energy is converted to charge via eqn. (82). The non-dimensional charge accumulation can be defined by:

$$s_{ij}^* = \frac{\Phi_i^*}{A_{phy,j}^* g^* t_j^*}. \qquad (94)$$

The read noise and dark current standard deviation is defined by eqn. (86) and can be shown in non-dimensional form as:

$$\sigma_{ADU,ij}^* = A_{phy,j}^* g^* t_j^* \sqrt{\mu_{rd,j}^{*2} + \mu_{dc,j}^{*2}}. \qquad (95)$$

Optimization:

A steered analysis of experiments optimization will be used to find the ideal camera settings in an efficient way. The total dynamic range, number of cameras, and the camera's dynamic range needs to be known for the analysis. A random guess of the ideal attenuation factors is produced with a random number generator. The max and minimum values are fixed by the desired dynamic range and minimum attenuation level. The middle cameras must be confined to the range:

$$A_{phy,j+1} \ldots A_{phy,J-1} \in \{\min(A_{phy}), \max(A_{phy})\}, \qquad (96)$$

to enable any value including a repeated $\max(A_{phy}^*)$ and $\min(A_{phy}^*)$ for the experiment using $A_{phy}^*$. A non-dimensional radiant exitance field is created using eqns. (87) and (88) logarithmically spaced. The shot noise can be added to the radiant exitance field utilizing eqn. (93) by:

$$\Phi_{s,ij}^* = \Phi_i^* + \sigma_{sw,ij}^* \text{rand}[\bullet], \qquad (97)$$

where rand[•] represents a uniformly distributed random number. The read noise and dark current noise contributions are added to the non-dimensionalized charge accumulation, found in eqn. (94), is defined by:

$$e_{ij}^* = \frac{\Phi_i^*}{A_{phy,j}^* g^* t_j^*} + \sqrt{\mu_{rd,j}^{*2} + \mu_{dc,j}^{*2}} \, rand[\cdot]. \quad (98)$$

Because e* is a ratio of the charge accumulation to the deep well capacity, the simulated non-dimensional digital value can be defined as $$Z_{ij} = \frac{\lfloor q_s e_{ij}^* \rfloor}{q_s}, \quad (99)$$

where $\lfloor \cdot \rfloor$ denotes rounding to nearest integer function. The rounding is needed to simulate the quantization error inherent to the discretization of the data. An indicator value $\Psi$ is used to clamp the digital value from zero to unity by:

$$\Psi(Z_{ij}^*) = \begin{cases} 0, & Z_{ij}^* < 0 \\ 1, & 0 \geq Z_{ij}^* \geq 1 \\ 0, & Z_{ij}^* > 1 \end{cases} \quad (100)$$

Values greater than unity indicate oversaturation of the sensor, so an indicator value of zero is given. Values less than zero arise from the symmetrically distributed eqn. (98) when Z* approaches zero, and are non-physical, therefore they will be given an indicator value of zero. The HDR image in dimensional form is defined by eqn. (84). The non-dimensional HDR image can be formed and is defined as:

$$\Phi_{HDR,i}^* = \frac{\sum_{j=1}^{J} \Psi(Z_{ij}^*) w_{ij}^* Z_{ij}^* A_{phy,j}^* t_j^* g_j^*}{\sum_{j=1}^{J} w_{ij}^*}, \quad (101)$$

where the non-dimensional weighting function w* can be defined similarly as eqn. (86) by $$w_{ij}^* = \sigma_{ss,ij}^{*2} + \sigma_{ADJ,ij}^{*2})^{-1}, \quad (102)$$

with $\sigma_{ss}^*$ and $\sigma_{ADJ}^*$ respectively defined in eqns. (93) and (95). In order to optimize the camera system, one preferably arranges the maximum radiance range possible to be above a threshold to accurately be able to reproduce the scene. The objective function $\mathcal{O}^k$ for a particular iteration k to maximize can be defined as $$O^k = \frac{1}{p} \sum_{i=1}^{p} \left| 20 \log_{10} \left( \frac{\Phi_i^*}{|\Phi_i^* - \Phi_{HDR,i}^*|} \right) > \frac{J\zeta - DR}{J-1} \right|, \quad (103)$$

where $\zeta$ is the base dynamic range in dB, J is the number of cameras being simulated, p is the number of points used to span $\Phi^*$ and DR is dynamic range. The total coverage is calculated for the initial values of $A_{phy}^*$.

The process is iterated several times, typically thirty iterations, to build a baseline of guesses and the associated values of $\mathcal{O}$. The pool is then sorted in descending order, so the maximum of eqn. (103) is indexed first. A search bound that narrows as the error is reduced can then be defined. The range of the new guess is defined by:

$$\iota = \frac{J(DR - \zeta)}{DR(J-1)}, \quad (104)$$

with the upper bound for the guess range to be $$g_u = (\iota - \max[\mathcal{O}]) A_{phy,j} + A_{phy,j}. \quad (105)$$

and the lower bound as $$g_l = A_{phy,j} + A_{phy,j}(\iota - \max[\mathcal{O}]). \quad (106)$$

The next new guess of the optimal $A_{phy}^*$ still with the maximum and minimum values set, is formed by $$A_{phy,j}^{k+1} = (g_u^k - g_l^k) rand[\cdot] + g_l^k, \quad (107)$$

where k is a placeholder to indicate the current iteration number and rand is a uniformly distributed random number. An example of a four-camera setup for optimization spanned 170 dB range can be seen in FIG. 3C for high speed HDR video recording. Each camera 150 is a Vision Research Phantom 711 camera coupled with Cannon 400 mm lenses with covers removed for clarity.

Figure 56:
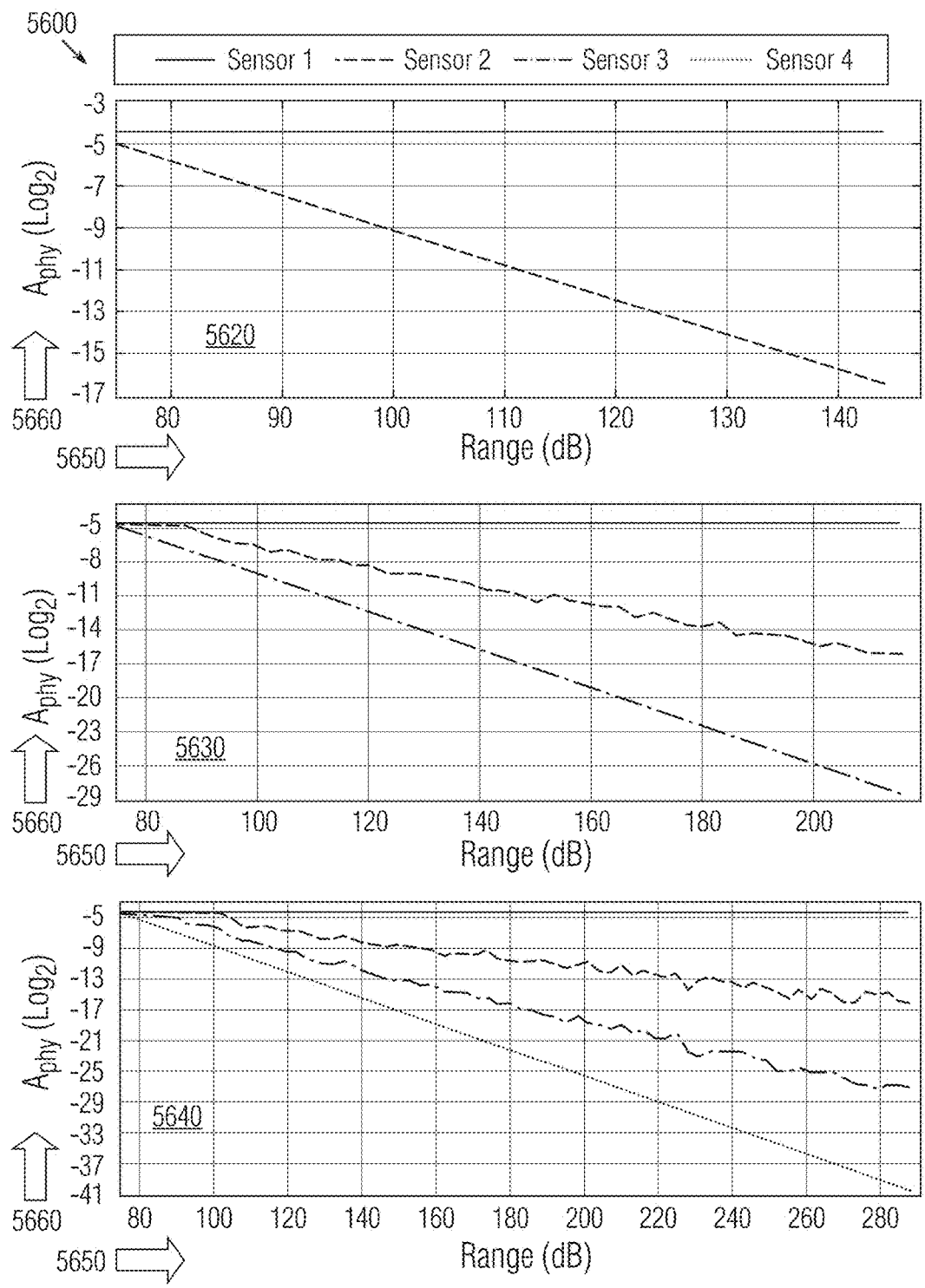
FIG. 56 is a set of graphical views of attenuation variation with range.

Optimal Design of an n-Camera High Speed Video System:

The optimization routine was performed for three different camera configurations utilizing two, three, and four cameras. Vision Research Phantom 711 cameras were modeled due to their availability. The setup of the four-camera system can be seen in FIG. 3C. The value of max($A_{phy}$) was defined by the physical constraints of imposed by the optics on hand. The first beam splitter's reflectance value of 0.45, and the smallest f/# the 200 mm Cannon lens could accept of 2.8, defined max($A_{phy}$) as 0.0451. The Vision Research Phantom 711 cameras utilize a 12-bit A/D, giving $q_s$ a value of 4096. The optimization routine was sequenced to find the optimal camera spacing for ranges spanning from the base dynamic range, 20 log(q), or 72 dB, every 3 dB, to the maximum, n. 20 log($q_s$), where n is the number of cameras in use, the results can be seen in FIG. 56. Due to the bit depth of the high speed cameras, at least three cameras will be needed to span the full 170 dB design envelope. FIG. 56 indicates the camera attenuation spacing that minimizes the overall error on formation in all cases $A_{Opt}$ can be defined by $$A_{Opt} = \frac{1}{n-1} \log_2 \left( \frac{q_s}{10^{\frac{DR}{20}}} \right), \quad (108)$$

where n is the number of cameras to be used. Utilizing eqn. (108) and knowing DR and $q_s$, an error optimal system can be designed for any range scene with and set of camera sensors.

Design of a 170 dB Camera System:

An optimized camera system was constructed to view a Photogenic C4-19 flash bulb initiated by a Photogenic 2500 DR set to maximum output. The C4-19 flash bulb reaches peak brightness in 10 μs and spans a range greater than 160 dB at peak output when viewing the flash bulb directly. With a greater than 140 dB range three or more cameras must be used to view the full scene. The camera system must be able to sample the event adequately to measure the rise time. A sample rate of 79,000 pps was utilized for a 256×256 spatial resolution. With this acquisition rate, eight frames will be captured on the rise of the bulb initiation. With a 170 dB dynamic range, a min($A_{phy}$) value of 5.83×10$^{-7}$ or 21-stops attenuation will be needed to span the full range. Using eqn. (108), $A_{Opt}$ for a three-camera system will be −8.1-stops attenuation-per-camera and −5.4 stops for the four-camera system. The signal-to-noise ratio (SNR) can be seen in FIG. 57 for the three-camera and four-camera setup and indicates what percentage of the acquirable range has an SNR greater than the value listed on the horizontal axis. This indicates the four-camera system has a greater than 24 dB SNR for 80% of the acquirable range, and the three-camera system has 70% of the acquirable range greater than 24 dB. Therefore the expectation is to have less noise in the four-camera system when compared to the three-camera system. FIGS. 58A and 58B show the actual non-dimensional radiance compared to the reconstructed non-dimensional HDR radiant exitance. The four-camera and three-camera systems have an error under 6 dB for the acquirable range, aside from the initial 10 dB. This is caused by the base noise floor of the cameras. The three-camera system has a region of error around −50 dB and −100 dB created by the base noise floor of the higher attenuation cameras. In all cases this produces an over estimation of the actual radiant exitance value. Therefore one can expect to observe some regions in the final image that are unrealistically bright when the video traverses this radiant exitance range. The four-camera system does not exhibit this same characteristic and therefore should produce an accurate video, but at the expense of added equipment.

FIG. 55 shows a set of graphical views 5500 of physical attenuation and order variation with number of iterations, with a legend 5510 identifying by sensor. The optimization method converging for a simulation run of four cameras, seeded with thirty random guesses, until the change in the objective function is less than 0.1% over the prior twenty iterations. The graphs include attenuation plot 5520 and order plot 5530. The number of iterations 5540 denotes the abscissa. The total attenuation 5550 represents the ordinate for the upper plot 5520, while order 5560 represents the ordinate for the lower plot 5530. Sensor-1 shows the lowest attenuation 5450, while Sensor-4 shows the highest attenuation, and Sensors-2 and -3 illustrate erratic values until past thirty iterations. Similarly order 5560 fluctuates between 0.33 and 0.6 until past thirty iterations.

FIG. 56 shows a set of graphical views 5600 of physical attenuation variation with range. A legend 5610 identifies sensors by number, similar to legend 5510. Optimal attenuation settings are shown in terms of stops for each camera in the series. View 5620 represents a two-camera configuration. View 5630 represents a three-camera configuration. View 5640 represents a four-camera configuration. The range 5650 in dB denotes the abscissa, while attenuation of the camera system 5660 denotes the ordinate. Sensor-1 shows steady value at about −5 attenuation, while Sensor-2 for the two-camera configuration logarithmically decreases attenuation with increasing range reaching −16 attenuation at the range of 140 dB. Similarly, Sensor-3 for the three-camera system logarithmically decreases attenuation reaching −26 at the range of 200 dB. Also similarly, Sensor-4 for the four-camera system logarithmically decreases attenuation, reaching −40 at the range of 280 dB.

Figure 57:
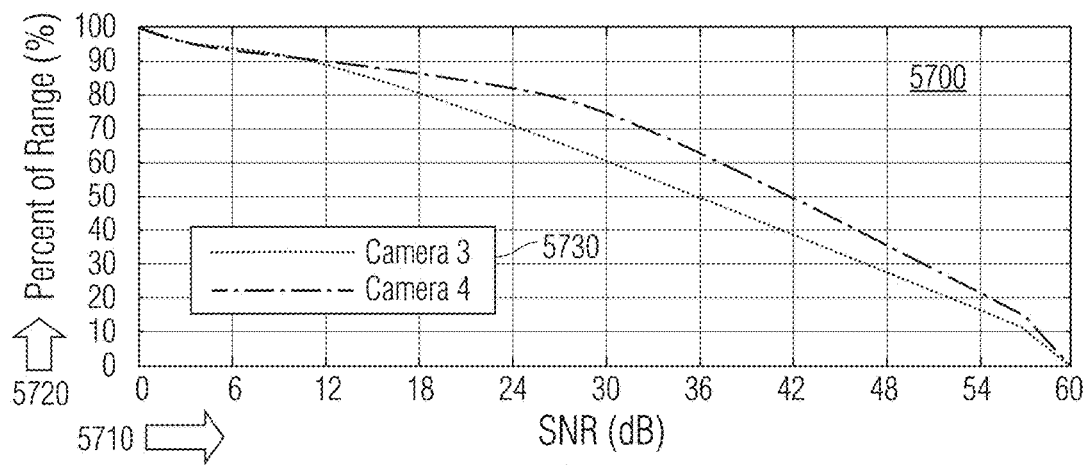
FIG. 57 is a graphical view of range percent variation with SNR.
Figure 58A:
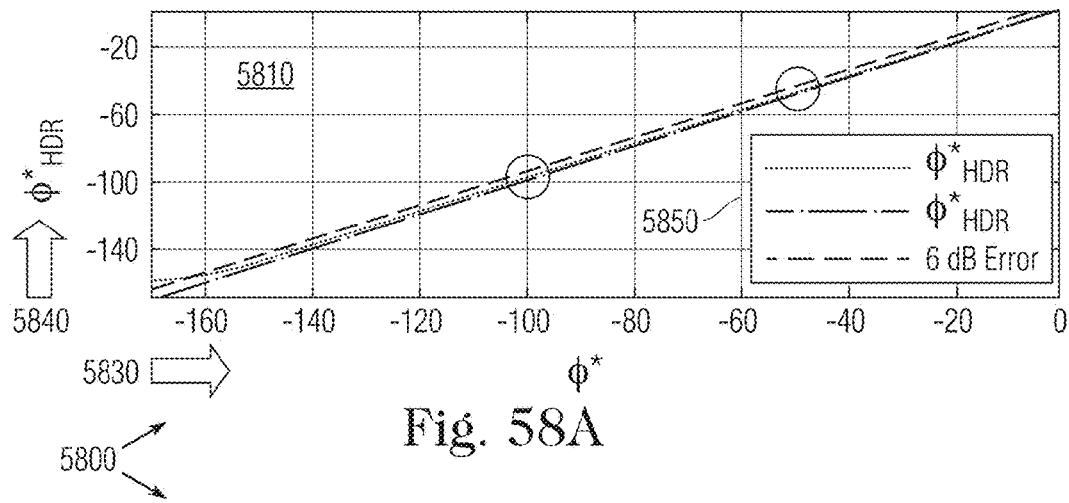
FIGS. 58A and 58B are graphical views of exitance estimate variation with HDR exitance.
Figure 58B:
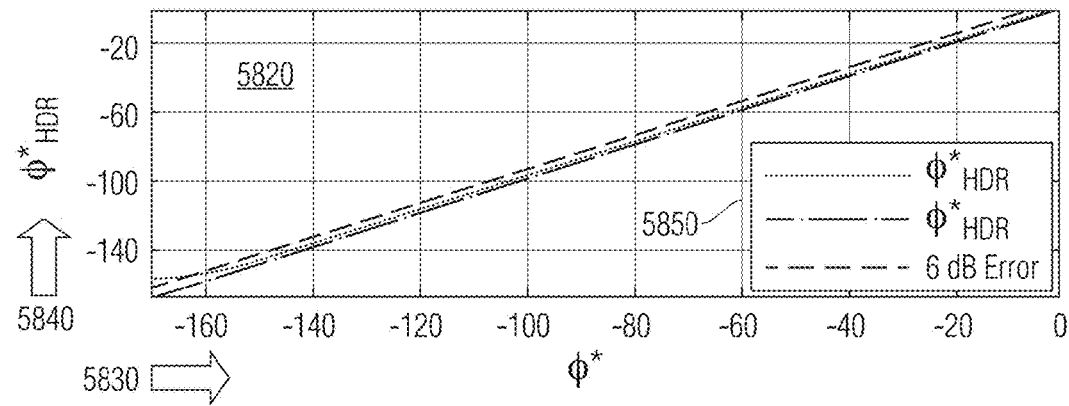

FIG. 57 shows a graphical view 5700 of range percent variation with simulated signal-to-noise ratio (SNR) coverage for the acquisition system. The simulated SNR 5710 in dB denotes the abscissa, while percent of range 5720 denotes the ordinate. A legend 5730 distinguishes between the three-camera system and the four-camera system. In both examples, the range percentage decreases from 100% at 0 dB SNR, albeit more gradually with the four-camera system down to 0% at 60 dB. FIGS. 58A and 58B show graphical views 5800 of non-dimensional exitance HDR variation with non-dimensional expected exitance value for the respective three-camera system as plot 5810 and the four-camera system as plot 5820. The expected exitance 5830 denotes the abscissa, while HDR existence 5840 denotes the ordinate. A legend 5850 distinguishes the exitance values along with a 6 dB error bound.

Figure 59A:
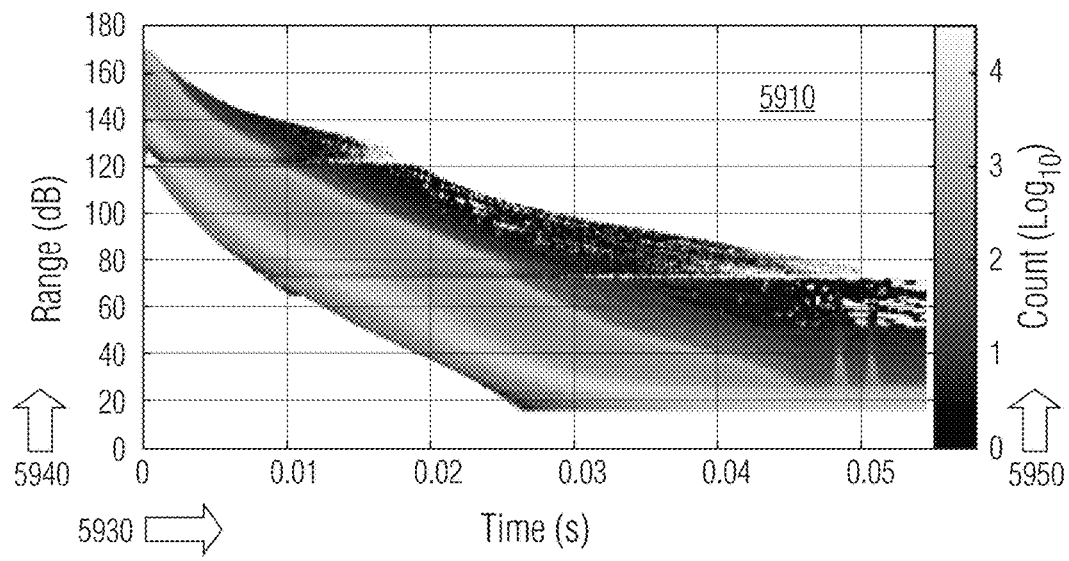
FIGS. 59A and 59B are graphical views of transitory range variation for three- and four-camera system tests.
Figure 59B:
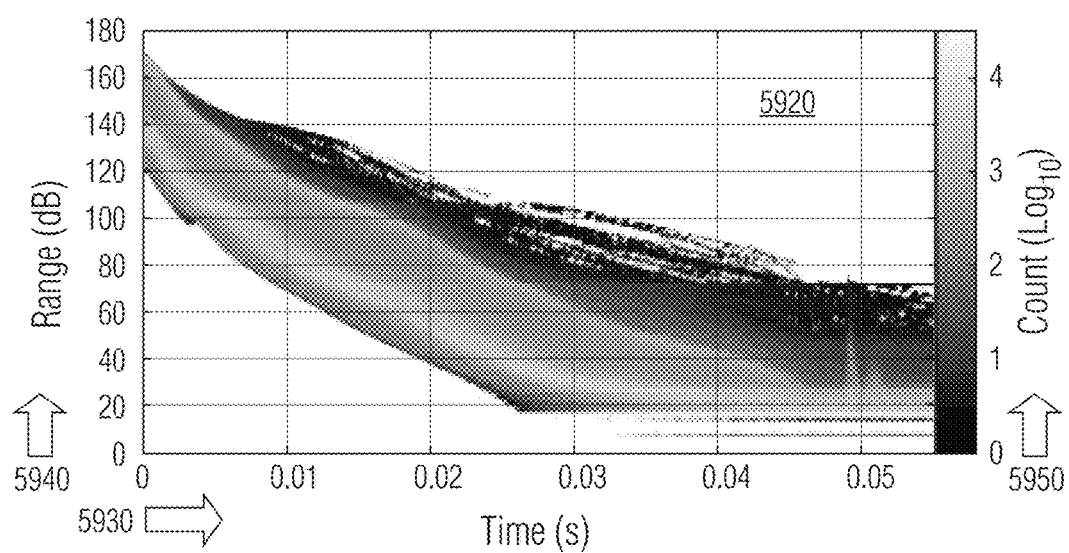
Figure 60:
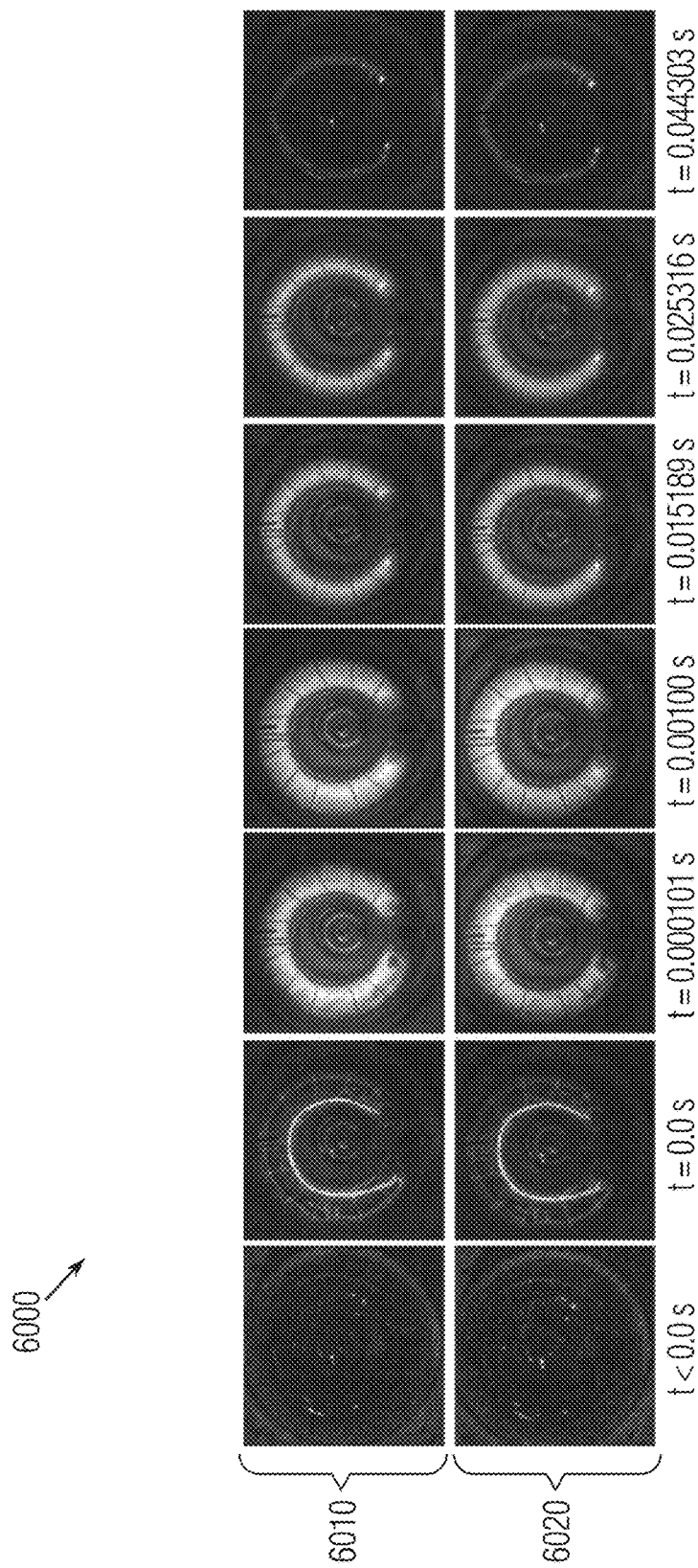
FIG. 60 is a set of image views of a flash bulb for the three-and-four camera system tests.

FIGS. 59A and 59B show graphical views 5900 of transitory range variation for comparing three- and four-camera system histograms for time amplitude and range of a flash bulb. The three- and four-camera histograms are shown as respective plots 5910 and 5920. Time 5930 in seconds is the abscissa while range 5940 in dB is the ordinate for both plots. A variance chart 5950 showing photon counts is provided to the right of both plots. FIG. 60 shows select frame views 6000 from multiple camera captures of the flash bulb. The top row 6010 shows frames from a three-camera capture, while the bottom row 6020 shows frames from a four-camera capture.

Results:

The tested camera system was designed to have a 170 dB dynamic range. The cameras were synchronously triggered on the rising edge of a 5 V TTL signal generated by an Arduino Uno. The same trigger signal was used to trigger the flash bulb in the Photogenic 2500 DR. The cameras were time- and frame-synchronized to IRIG-B GPS timing providing a temporal accuracy of 10 ns. The maximum exposure time that could be used due to the acquisition rate of 79,000 pps was 12.2 µs. The exposure time was found to be oversaturated the 170 dB range, therefore the exposure time was reduced to 3.2 µs to maintain the event within the designed for dynamic range. Additional lighting was provided by a halogen source focused by a Fresnel lens. The halogen light source amplitude was reduced until the bulb structure was resolvable. The data were recorded for 54 ms. The time amplitude histogram can be seen in FIGS. 59A and 59B. The maximum amplitude was achieved in 8 µs for both three- and four-camera tests. Half brightness occurred after 89 µs for both tests. The amplitude reduced to 1% the maximum after 14.6 ms for the four-camera system and 15.4 ms during the three-camera test. The maximum amplitudes were estimated at $3.7 \times 10^7$ W/m$^2$ for the four-camera test and $3.8 \times 10^7$ W/m$^2$ for the three-camera test. The estimated minimum resolvable radiant exitance was 0.119 W/m$^2$ for this camera configuration and exposure time. Seven frames were tone-mapped utilizing the Fattel tone-map operator for the purpose of display within an 8-bit intensity space, seen in FIG. 60.

There are several differences between the three and four-camera system as predicted by FIGS. 58A and 58B and readily observed in FIGS. 59A and 59B along with images in FIG. 60 in the three-camera row 5910 and four-camera row 5920. There is a discontinuous gap in the intensity information in the three-camera system around 120 dB and 70 dB, corresponding to the errors predicted at −50 dB and −100 dB. The errors can be seen in the tone-mapped images in the space surrounding the center illumination bulb. In the fifth column, t=0.015189 s, a bright region can be observed disproportionally in the three-camera system, but not in the four-camera system. In the sixth column another amplitude error can be seen in the flash bulb. There is a bright concentric ring in the three-camera recreated image that is not present in the four-camera recreated image. Other than the predicted image error the videos have similar visual attributes, only with slightly more noise in the three-camera system compared to the four-camera system. The exemplary procedure to achieve HDR video images is described in FIGS. 61A through 61D as view 6100.

Advantages:

An exemplary high speed high dynamic range video system has been introduced utilizing a minimal number of cameras. A methodology to optimize the camera settings in a multi imager based video system has been derived. The optimized camera spacing can be determined with only knowledge of the number of quantization steps of each sensor and the dynamic range requirement. The maximum dynamic range a camera system with multiple sensors can accurately reproduce is limited to the number of quantization steps in the A/D converter. An extended dynamic range can be created beyond the base SNR, although there will be bright discontinuous regions in the tone-mapped video. Depending on the application, the reduction in assets may outweigh the need for added accuracy. A camera system was introduced and a high speed HDR video was produced using both three and four Vision research Phantom 711 cameras. The scene spanned a maximum of 169 dB dynamic range and was filmed at 79,000 pps, thereby demonstrating the concept of high speed HDR video with a reduced number of cameras. With the three-camera system the added noise created from the read and dark current noises appeared in the recreated video was predicted and visualized in FIGS. 58A and 58B.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A photographic device for producing a high dynamic range (HDR) image of an object in a scene across a range of light exposures, said scene emanating a light beam, said device comprising:
   a plurality of beam-splitters disposed along the light beam into a corresponding plurality of split beams, each split beam having a distinct intensity;
   a plurality of cameras, each camera having an aperture and an exitance sensor, said aperture disposed opposite a corresponding beam-splitter to receive a corresponding split beam therefrom, said exitance sensor acquiring said corresponding split beam as radiant exitance from said aperture;
   a plurality of neutral density filters, each filter attenuating a corresponding split beam prior to reception by the corresponding aperture;
   an exitance estimator for combining said radiant exitance from each said corresponding split beam, and estimating scene exitance of the light beam;
   an image error minimizer for employing a non-recursive weighting function to determine an image formation error in said radiant exitance;
   a combiner for adjusting said scene exitance by removing said image formation error from said radiant exitance of each said corresponding split beam; and
   an image re-constructor for rendering the HDR image from said scene exitance.

2. The device according to claim 1, wherein said weighting function can be retrieved from a look-up table.

3. The device according to claim 1, further including a non-symmetrical error minimizer for removing intraocular flare, misalignment and bloom.

4. The device according to claim 3, further including an error estimator for estimating said distributed error for an estimate of said radiant exitance being beyond prior established symmetric error bands.

5. The device according to claim 1, further including a memory for storing the HDR image.

6. The device according to claim 1, further including a viewing mechanism for displaying the HDR image.

7. A photographic process for producing a high dynamic range (HDR) image of an object in a scene across a range of light exposures, said process comprising:
   splitting the light beam into a corresponding plurality of split beams, each split beam having a distinct intensity;
   receiving a corresponding split beam and sensing said corresponding split beam as radiant exitance;
   attenuating a corresponding split beam prior to reception;
   combining said radiant exitance from each said corresponding split beam as a combined exitance;
   estimating scene exitance of the light beam from said combined exitance;
   applying a non-recursive weighting function for determining an image formation error in said radiant exitance;
   adjusting said scene exitance by removing said image formation error from said radiant exitance of each said corresponding split beam; and
   rendering the HDR image from said scene exitance.

8. The device according to claim 7, further including minimizing a non-symmetrical error for removing intraocular flare, misalignment and bloom.

* * * * *